US012737953B2

(12) United States Patent
Liu et al.

(10) Patent No.: US 12,737,953 B2
(45) Date of Patent: Sep. 15, 2026

(54) ANIMATION EFFECT DISPLAY METHOD AND ELECTRONIC DEVICE

(71) Applicant: HUAWEI TECHNOLOGIES CO., LTD., Shenzhen (CN)

(72) Inventors: Chao Liu, Shanghai (CN); Kun Cui, Shanghai (CN); Jian Chen, Shanghai (CN); Yuheng Chen, Shanghai (CN); Wei Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 18/697,447

(22) PCT Filed: Oct. 17, 2022

(86) PCT No.: PCT/CN2022/125591

§ 371 (c)(1),
(2) Date: Mar. 29, 2024

(87) PCT Pub. No.: WO2023/066177

PCT Pub. Date: Apr. 27, 2023

(65) Prior Publication Data

US 2024/0404157 A1 Dec. 5, 2024

(30) Foreign Application Priority Data

Oct. 18, 2021 (CN) ......................... 202111209898.X
Dec. 14, 2021 (CN) ......................... 202111526945.3

(51) Int. Cl.
*G06T 13/20* (2011.01)

(52) U.S. Cl.
CPC .......... *G06T 13/20* (2013.01); *G06T 2200/24* (2013.01); *G06T 2210/22* (2013.01)

(58) Field of Classification Search
CPC . G06T 13/20; G06T 2200/24; G06T 2210/22; G06T 13/00; G06T 13/80; G06T 15/00; G06F 9/451
See application file for complete search history.

(56) References Cited

U.S. PATENT DOCUMENTS

2004/0189669 A1 9/2004 David et al.
2007/0057943 A1 3/2007 Beda et al.
(Continued)

FOREIGN PATENT DOCUMENTS

CN 107729094 A 2/2018
CN 109828791 A 5/2019
(Continued)

OTHER PUBLICATIONS

Gaussian elimination, https://en.wikipedia.org/wiki/Gaussian_eliminaion, Feb. 11, 2025, total 10 pages.
(Continued)

*Primary Examiner* — Haixia Du

(57) ABSTRACT

Embodiments of this application provide an animation effect display method and an electronic device, and relate to the field of electronic technologies. According to the animation effect display method provided in an embodiment of this application, before an animation effect is displayed, a UI thread of an application, or a rendering thread of the application, or a rendering process determines controls whose properties change in duration of the animation effect, and determines properties of controls on an interface of each frame, and then the rendering thread of the application or the rendering process generates, based on the properties of the controls on the interface of each frame, a bitmap corresponding to the interface of the frame.

20 Claims, 36 Drawing Sheets

(56) References Cited

U.S. PATENT DOCUMENTS

| | | | | |
|---|---|---|---|---|
| 2012/0056889 | A1* | 3/2012 | Carter | G06T 13/00 345/473 |
| 2012/0188255 | A1 | 7/2012 | Brunner et al. | |
| 2013/0120401 | A1 | 5/2013 | Borysenko et al. | |
| 2019/0172181 | A1 | 6/2019 | Petersen et al. | |
| 2019/0370030 | A1* | 12/2019 | Xiao | G06F 3/04883 |

FOREIGN PATENT DOCUMENTS

| | | | |
|---|---|---|---|
| CN | 111443914 | A | 7/2020 |
| CN | 112070864 | A | 12/2020 |
| CN | 112136101 | A | 12/2020 |
| JP | 2003157443 | A | 5/2003 |
| JP | 2009501388 | A | 1/2009 |

OTHER PUBLICATIONS

Ambiguous Layouts, https://developer.apple.com/library/archive/documentation/UserExperience/Conceptual/AutolayoutPG/AmbiguousLayouts.html, Feb. 11, 2025, total 1 pages.

* cited by examiner

ANIMATION EFFECT DISPLAY METHOD AND ELECTRONIC DEVICE

CROSS-REFERENCE TO RELATED APPLICATIONS

This application is a national stage of International Application No. PCT/CN2022/125591, filed on Oct. 17, 2022, which claims priority to Chinese Patent Application No. 202111526945.3, filed on Dec. 14, 2021 and Chinese Patent Application No. 202111209898.X, filed on Oct. 18, 2021. All of the aforementioned applications are hereby incorporated by reference in their entireties.

TECHNICAL FIELD

This application relates to the field of electronic technologies, and in particular, to an animation effect display method and an electronic device.

BACKGROUND

With development of electronic technologies, more electronic devices are involved in daily life of users. In addition, as parameters such as a resolution and a size of a display of the electronic device become higher, more content can be displayed on the electronic device.

An application may display an animation effect to the user by adjusting properties such as a size, a width, a height, and transparency of a control displayed on an interface.

However, in the conventional technology, a UI thread needs to undertake a calculation amount and another task for displaying the animation effect. As a result, frame freezing or jank is likely to occur in the application on the electronic device, reducing user experience.

SUMMARY

Embodiments of this application provide an animation effect display method and an electronic device, and relate to the field of electronic technologies. According to the animation effect display method provided in an embodiment of this application, before an animation effect is displayed, a UI thread of an application, or a rendering thread of the application, or a rendering process determines controls whose properties change in duration of the animation effect, and determines properties of controls on an interface of each frame, and then the rendering thread of the application or the rendering process generates, based on the properties of the controls on the interface of each frame, a bitmap corresponding to the interface of the frame. Because the properties like sizes and locations of the controls on the interface of each frame are determined before the animation effect is displayed, the UI thread does not need to perform measurement, layout, and drawing and recording (recording) on the interface of each frame, so that display of the animation effect is not affected by UI thread blocking.

According to a first aspect, an embodiment of this application provides an animation effect display method. The method includes: A UI thread of an application determines based on information about a first animation effect of a first control group that is set by the application, duration of the first animation effect, start time of the first animation effect, and description information about an end frame of the first animation effect after receiving an animation trigger event, where the first control group includes one or more controls, and the animation trigger event is used to trigger display of the first animation effect; and determines description information about a target frame based on the start time of the first animation effect, the duration of the first animation effect, time corresponding to the target frame, and the description information about the end frame of the first animation effect when generating display data of the target frame in the duration of the first animation effect; and a rendering thread of the application or a rendering process generates the display data of the target frame based on the description information about the target frame.

In the foregoing embodiment, in the duration of the animation, the rendering thread of the application or the rendering process generates an interface based on the description information about the target frame, where the description information about the target frame is used to determine a property of a control in the target frame, like a size, a location, and transparency. In the duration of the animation, the rendering thread of the application or the rendering process generates the display data of the target frame, and the UI thread does not need to generate the display data of the target frame through measurement, layout, and drawing and recording. This further prevents frame freezing of the animation effect caused by UI thread blocking.

With reference to some embodiments of the first aspect, in some embodiments, the information about the first animation effect is configured by the application through an animation interface provided by a system.

In the foregoing embodiment, an application developer may configure the animation effect for any one or more controls through the animation interface, facilitating the application developer to perform configuration.

With reference to some embodiments of the first aspect, in some embodiments, the determining description information about a target frame based on the start time of the first animation effect, the duration of the first animation effect, time corresponding to the target frame, and the description information about the end frame of the first animation effect when generating display data of the target frame in the duration of the first animation effect specifically includes: The UI thread or the rendering thread or the rendering process determines the description information about the target frame based on the start time of the first animation effect, the duration of the first animation effect, the time corresponding to the target frame, and the description information about the end frame of the first animation effect.

In the foregoing embodiment, the description information about the target frame may be determined by the UI thread, or may be determined by the rendering thread or the rendering process. When the description information about the target frame is determined by the rendering thread or the rendering process, load of the UI thread may be further reduced, and a possibility of frame freezing of the animation effect may be reduced.

With reference to some embodiments of the first aspect, in some embodiments, the method further includes: The UI thread determines properties of controls in the end frame of the first animation effect based on the description information about the end frame of the first animation effect; and the UI thread or the rendering thread or the rendering process compares the properties of the controls in the end frame of the first animation effect with properties of controls shown before the first animation effect starts, to determine a second control group, where the second control group is controls whose properties change in the duration of the first animation effect, and the second control group includes the first control group; and the first control group is displayed through the first animation effect, a control in the second control other than the first control group is displayed through a second animation effect, and the animation trigger event is further used to trigger display of the second animation effect.

In the foregoing embodiment, the UI thread determines the controls whose properties change in the duration of the animation effect by comparing the properties of the controls in the end frame of the animation effect with the properties of the controls on an interface of one frame shown before the animation effect starts, determines properties of the controls on the interface of each frame in the duration of the animation effect, and then determines the display data of the target frame. Compared with determining properties of all controls on the interface of each frame in the duration of the animation effect, this may reduce a calculation amount.

With reference to some embodiments of the first aspect, in some embodiments, the description information about the target frame is further used to determine properties of the controls in the second control group in the target frame, where the property of the control includes at least one of a size of the control, a location of the control, and transparency of the control.

In the foregoing embodiment, the property of the control directly affects a display effect of the control. The description information about the target frame may be determined by determining the property of the control.

With reference to some embodiments of the first aspect, in some embodiments, that a rendering thread of the application or a rendering process generates the display data of the target frame based on the description information about the target frame specifically includes: The rendering thread or the rendering process updates a first render tree based on the description information about the target frame, and the rendering thread or the rendering process generates the display data of the target frame based on an updated first render tree.

In the foregoing embodiment, compared with a method in which the UI thread of the application synchronizes the render tree to the rendering thread of the application or the rendering process after updating the render tree, this method allows the rendering process or the rendering thread of the application to update the render tree based on the description information about the target frame and generate the display data of the target frame based on an updated render tree. In this case, if the UI thread is blocked, the animation effect can still be normally displayed.

With reference to some embodiments of the first aspect, in some embodiments, that the rendering thread or the rendering process updates a first render tree based on the description information about the target frame specifically includes: The rendering thread or the rendering process updates the first render tree based on the properties of the controls in the second control group in the target frame.

In the foregoing embodiment, the rendering process or the rendering thread of the application may update the render tree only based on property of the controls whose properties change in the target frame, to generate the display data of the target frame.

With reference to some embodiments of the first aspect, in some embodiments, the second control group includes a third control; and the rendering thread or the rendering process adjusts, based on a size of the third control and a preconfigured policy, a size of content carried in the third control, where the policy is used to crop or scale the carried content, and the carried content includes at least one of an image and a text.

In the foregoing embodiment, in the duration of the animation effect, if the size of the control changes, the electronic device may further crop or scale the content of the control.

With reference to some embodiments of the first aspect, in some embodiments, the third control is an image control ImageView, and the content carried in the third control is a first image. The policy includes: comparing the size of the third control with a size of the first image, and cropping or scaling the first image.

In the foregoing embodiment, in the duration of the animation effect, if the size of the control changes, the electronic device may further crop or scale the image on the control.

With reference to some embodiments of the first aspect, in some embodiments, the third control is a text control TextView, and the content carried in the third control is a first text. The policy includes: comparing a width of the third control with a width of the first text, and performing line division or line combination on the first text.

In the foregoing embodiment, in the duration of the animation effect, if the size of the control changes, the electronic device may further perform line division or line combination on the text on the control.

With reference to some embodiments of the first aspect, in some embodiments, the first render tree is a render tree corresponding to the end frame of the first animation effect; or the first render tree is a render tree corresponding to an interface shown before the first animation effect starts.

In the foregoing embodiment, the render tree that is updated by the rendering thread of the application or the rendering process based on the target frame description information may be a render tree corresponding to an end interface of the animation effect, or may be a render tree corresponding to an interface shown before the animation effect starts.

With reference to some embodiments of the first aspect, in some embodiments, after the UI thread of the application determines based on the information about the first animation effect of the first control group that is set by the application, the duration of the first animation effect, the start time of the first animation effect, and the description information about the end frame of the first animation effect after receiving an animation trigger event, the method further includes: The UI thread deregisters an animation callback CALLBACK_ANIMATION of the first animation effect, where the animation callback is used to trigger the UI thread to modify a property of the control in the first control group.

In the foregoing embodiment, the electronic device may determine the description information about the target frame from the animation effect, and deregister the callback, so that the UI thread of the application no longer performs measurement, layout, and drawing and recording. This prevents frame freezing of the animation effect caused by UI thread blocking.

With reference to some embodiments of the first aspect, in some embodiments, in the duration of the first animation effect, the UI thread receives a vertical synchronization signal at a first moment, and the rendering thread or the rendering process generates the display data of the target frame at a second moment based on the description information about the target frame, where the second moment is after first duration of the first moment, and the first duration is preset.

In the foregoing embodiment, the rendering process or the rendering thread of the application may independently request a vertical synchronization signal to generate the interface of each frame in the duration of the animation effect. Alternatively, after a period of time after the UI thread receives the vertical synchronization signal, the interface of each frame in the duration of the animation effect is generated. In this case, the UI thread may be triggered by a non-animation effect to modify the property of the control and synchronize a modified property of the control to the rendering process or the rendering thread of the application.

With reference to some embodiments of the first aspect, in some embodiments, the rendering thread or the rendering process determines a second parameter in the duration of the first animation effect, where the second parameter includes both a size and a location of the control in the second control group; the rendering thread or the rendering process sends the second parameter to the UI thread; and the UI thread determines the size and the location of the control in the second control group based on the second parameter.

In the foregoing embodiment, the rendering thread or the rendering process may synchronize the location and the size of the control on the interface to the UI thread in the duration of the animation effect, and then the UI thread may know the real location and the size of the control.

With reference to some embodiments of the first aspect, in some embodiments, the animation trigger event includes at least one of user interaction, a network status change, and a message sent by another application on the electronic device to the application.

In the foregoing embodiment, the animation effect may be triggered in a plurality of manners.

According to a second aspect, an embodiment of this application provides an electronic device. The electronic device includes one or more processors and a memory. The memory is coupled to the one or more processors, and the memory is configured to store computer program code. The computer program code includes computer instructions. The one or more processors invoke the computer instructions, to enable the electronic device to perform the following procedures: A UI thread of an application determines based on information about a first animation effect of a first control group that is set by the application, duration of the first animation effect, start time of the first animation effect, and description information about an end frame of the first animation effect after receiving an animation trigger event, where the first control group includes one or more controls, and the animation trigger event is used to trigger display of the first animation effect; and determines description information about a target frame based on the start time of the first animation effect, the duration of the first animation effect, time corresponding to the target frame, and the description information about the end frame of the first animation effect when generating display data of the target frame in the duration of the first animation effect; and a rendering thread of the application or a rendering process generates the display data of the target frame based on the description information about the target frame.

In the foregoing embodiment, in the duration of the animation, the rendering thread of the application or the rendering process generates an interface based on the description information about the target frame, where the description information about the target frame is used to determine a property of a control in the target frame, like a size, a location, and transparency. In the duration of the animation, the rendering thread of the application or the rendering process generates the display data of the target frame, and the UI thread does not need to generate the display data of the target frame through measurement, layout, and drawing and recording. This further prevents frame freezing of the animation effect caused by UI thread blocking.

With reference to some embodiments of the second aspect, in some embodiments, the first animation effect is configured through an animation interface.

With reference to some embodiments of the second aspect, in some embodiments, the one or more processors are specifically configured to invoke the computer instructions, to enable the electronic device to perform the following procedures: The UI thread or the rendering thread or the rendering process determines the description information about the target frame based on the start time of the first animation effect, the duration of the first animation effect, the time corresponding to the target frame, and the description information about the end frame of the first animation effect.

With reference to some embodiments of the second aspect, in some embodiments, the one or more processors are further configured to invoke the computer instructions, to enable the electronic device to perform the following procedures: The UI thread determines properties of controls in the end frame of the first animation effect based on the description information about the end frame of the first animation effect; and the UI thread or the rendering thread or the rendering process compares the properties of the controls in the end frame of the first animation effect with properties of controls shown before the first animation effect starts, to determine a second control group, where the second control group is controls whose properties change in the duration of the first animation effect, and the second control group includes the first control group; and the first control group is displayed through the first animation effect, a control in the second control other than the first control group is displayed through a second animation effect, and the animation trigger event is further used to trigger display of the second animation effect.

With reference to some embodiments of the second aspect, in some embodiments, the description information about the target frame is further used to determine properties of the controls in the second control group in the target frame, where the property of the control includes at least one of a size of the control, a location of the control, and transparency of the control.

With reference to some embodiments of the second aspect, in some embodiments, the one or more processors are specifically configured to invoke the computer instructions, to enable the electronic device to perform the following procedures: The rendering thread or the rendering process updates a first render tree based on the description information about the target frame, and the rendering thread or the rendering process generates the display data of the target frame based on an updated first render tree.

With reference to some embodiments of the second aspect, in some embodiments, the one or more processors are specifically configured to invoke the computer instructions, to enable the electronic device to perform the following procedures: The rendering thread or the rendering process updates the first render tree based on the properties of the controls in the second control group in the target frame.

With reference to some embodiments of the second aspect, in some embodiments, the one or more processors are further configured to invoke the computer instructions, to enable the electronic device to perform the following procedures: The second control group includes a third control; and the rendering thread or the rendering process adjusts, based on a size of the third control and a preconfigured policy, a size of content carried in the third control, where the policy is used to crop or scale the carried content, and the carried content includes at least one of an image and a text.

With reference to some embodiments of the second aspect, in some embodiments, the third control is an image control ImageView, and the content carried in the third control is a first image. The policy includes: comparing the size of the third control with a size of the first image, and cropping or scaling the first image.

With reference to some embodiments of the second aspect, in some embodiments, the third control is a text control TextView, and the content carried in the third control is a first text. The policy includes: comparing a width of the third control with a width of the first text, and performing line division or line combination on the first text.

With reference to some embodiments of the second aspect, in some embodiments, the first render tree is a render tree corresponding to the end frame of the first animation effect; or the first render tree is a render tree corresponding to an interface shown before the first animation effect starts.

With reference to some embodiments of the second aspect, in some embodiments, the one or more processors are specifically configured to invoke the computer instructions, to enable the electronic device to perform the following procedures:

With reference to some embodiments of the second aspect, in some embodiments, the one or more processors are further configured to invoke the computer instructions, to enable the electronic device to perform the following procedures: The UI thread deregisters an animation callback CALLBACK_ANIMATION of the first animation effect, where the animation callback is used to trigger the UI thread to modify a property of the control in the first control group.

With reference to some embodiments of the second aspect, in some embodiments, the one or more processors are further configured to invoke the computer instructions, to enable the electronic device to perform the following procedures: In the duration of the first animation effect, the UI thread receives a vertical synchronization signal at a first moment, and the rendering thread or the rendering process generates the display data of the target frame at a second moment based on the description information about the target frame, where the second moment is after first duration of the first moment, and the first duration is preset.

With reference to some embodiments of the second aspect, in some embodiments, the one or more processors are further configured to invoke the computer instructions, to enable the electronic device to perform the following procedures: The rendering thread or the rendering process determines a second parameter in the duration of the first animation effect, where the second parameter includes both a size and a location of the control in the second control group; the rendering thread or the rendering process sends the second parameter to the UI thread; and the UI thread determines the size and the location of the control in the second control group based on the second parameter.

With reference to some embodiments of the second aspect, in some embodiments, the animation trigger event includes at least one of user interaction, a network status change, and a message sent by another application on the electronic device to the application.

According to a third aspect, an embodiment of this application provides a chip system. The chip system is applied to an electronic device, the chip system includes one or more processors, and the processor is configured to invoke computer instructions to enable the electronic device to perform the method according to any one of the first aspect or the possible implementations of the first aspect.

According to a fourth aspect, an embodiment of this application provides a computer program product including instructions. When the computer program product runs on an electronic device, the electronic device is enabled to perform the method according to any one of the first aspect or the possible implementations of the first aspect.

According to a fifth aspect, an embodiment of this application provides a computer-readable storage medium, including instructions. When the instructions are run on an electronic device, the electronic device is enabled to perform the method according to any one of the first aspect or the possible implementations of the first aspect.

It may be understood that the electronic device according to the second aspect, the chip system according to the third aspect, the computer program product according to the fourth aspect, and the computer storage medium according to the fifth aspect are all configured to perform the method provided in embodiments of this application. Therefore, for beneficial effects that can be achieved by the method, refer to beneficial effects in the corresponding method. Details are not described herein again.

DESCRIPTION OF EMBODIMENTS

Figures 1A, 1B:
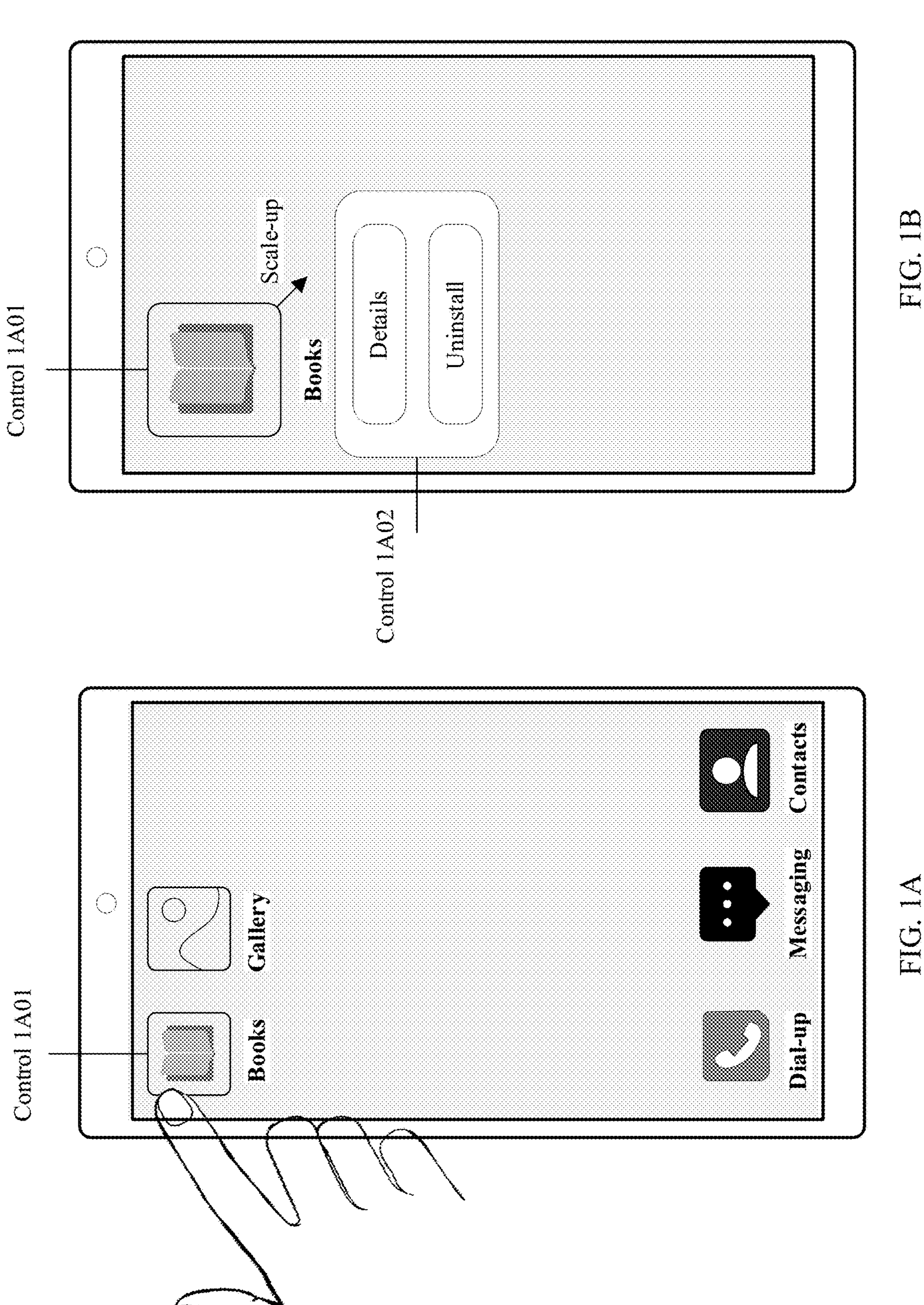
FIG. 1A and FIG. 1B are schematic diagrams of an example of an interface according to an embodiment of this application.

Terms used in the following embodiments of this application are merely intended to describe specific embodiments, but are not intended to limit this application. The terms "one", "a", "the", "the foregoing", "this", and "the one" of singular forms used in this specification of this application are also intended to include plural forms, unless otherwise specified in the context clearly. It should also be understood that, the term "and/or" used in this application indicates and includes any or all possible combinations of one or more related enumerated items.

The following terms "first" and "second" are only intended for a purpose of description, and should not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The term "user interface (user interface, UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (extensible markup language, XML). Interface source code is parsed and rendered on an electronic device, and is finally presented as content that can be identified by the user. The user interface is generally represented in a form of a graphical user interface (graphical user interface, GUI), and is a user interface that is related to a computer operation and that is displayed in a graphic manner. The user interface may be a visual interface element such as a text, an icon, a button, a menu, a tab, a text box, a dialog box, a status bar, a navigation bar, or a Widget that is displayed on a display of the electronic device.

The interface is used as the medium interface for interaction and information exchange between the application and the user. Each time a vertical synchronization (Vsync-APP) signal arrives, the electronic device needs to generate an application interface for a foreground application. A frequency of the vertical synchronization signal is related to a refresh rate of a screen of the electronic device. For example, the frequency of the vertical synchronization signal is the same as the refresh rate of the screen of the electronic device.

To be specific, each time before content displayed on the screen is refreshed, the electronic device needs to generate the application interface for the foreground application. In this case, when the screen is refreshed, the newly generated application interface is displayed to the user.

An animation (animation) effect is applied to an animation object. The animation object may be an interface (or a window) of an application, or the animation object may be one or more controls (views, or may be referred to as views) of the application. From a perspective of the user, the animation object includes one or more controls. From a perspective of the application, the animation object includes one or more views. The view is a basic element constituting the application interface, and one control that is seen by the user on the application interface may correspond to one or more views.

In embodiments of this application, unless otherwise specified, meanings of the control and the view may be the same.

From a perspective of a time dimension, a process in which the animation object changes continuously and smoothly in a period of time (at least duration of an interval between two vertical synchronization signals) is an animation effect.

(1) Interface Configured with an Animation Effect and an Animation Effect Display Method Provided in Embodiments of this Application (1.1) Interface Configured with the Animation Effect In embodiments of this application, an animation may include: an animation effect applied to an appearance, an animation effect applied to a location, a transformation-based animation effect, and an animation effect applied to content. The animation effect applied to the appearance includes: transparency, a rounded corner, a border color, a border line width, a background color, a shadow, and the like. The animation effect applied to the location includes: width/height configuration, x/y/z coordinates, and x/y/z pivots. The transformation-based animation effect includes: translation, rotation, scaling, and 3D transformation. The animation effect applied to the content includes: a filter effect like blur, color enhancement, a grayscale change, and adding noise, and the like.

All animations may be used as configurable properties of the control. The properties of the control are used to determine a display manner of the control. The display manner includes the foregoing animation effect applied to the appearance, animation effect applied to the location, transformation-based animation effect, animation effect applied to the content, and the like.

The following describes the interface configured with the animation effect by using examples.

FIG. 1A and FIG. 1B are schematic diagrams of an example of an interface according to an embodiment of this application.

As shown in FIG. 1A, the interface displayed on a screen of an electronic device is an interface of a desktop application, and the interface of the desktop application includes a control 1A01. The control 1A01 includes an icon of a books application.

The desktop application may further include an icon of another application, like an icon of a gallery application, an icon of a dial-up application, an icon of a messaging application, and an icon of a contacts application.

In response to touching and holding the control 1A01 by a user, the control 1A01 is scaled up.

In a process in which the control 1A01 is scaled up, a control 1A02 appears on the interface. The scale-up process of the control 1A01 is an animation. If the control 1A02 is displayed clearly step by step (for example, transparency changes), a process in which the control 1A02 is displayed clearly step by step is also an animation.

Figure 2B:
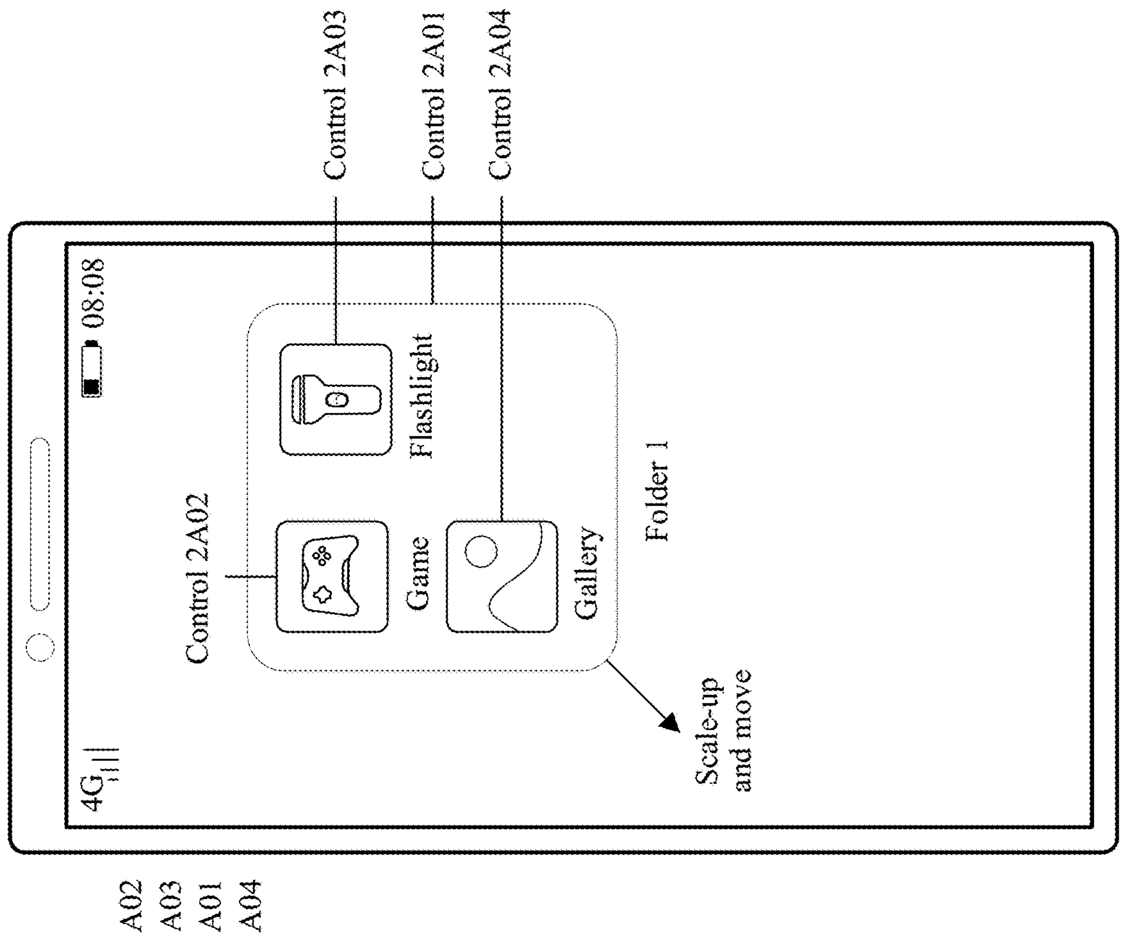
FIG. 2A and FIG. 2B are schematic diagrams of another example of an interface according to an embodiment of this application.
Figure 2A:
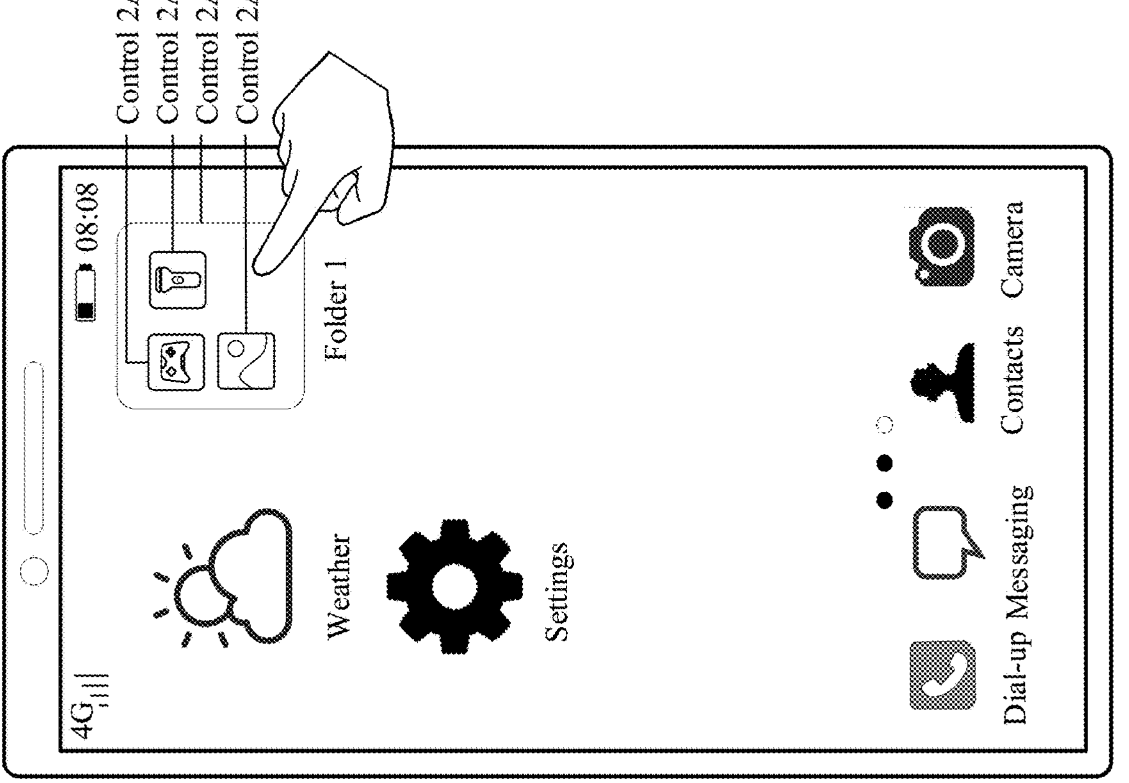

FIG. 2A and FIG. 2B are schematic diagrams of another example of an interface according to an embodiment of this application.

As shown in FIG. 2A, the interface displayed on a screen of an electronic device is an interface of a desktop application, and the interface of the desktop application includes a control 2A01. The control 2A01 is a folder 1, and includes a control 2A02, a control 2A03, and a control 2A04. The control 2A02 is an icon of a game application, the control 2A03 is an icon of a flashlight application, and the control 2A04 is an icon of a gallery application.

In response to tapping the control 2A02 by a user, the control 2A01 is scaled up and moved, and the control 2A02, the control 2A03, and the control 2A04 are scaled up and moved.

A scale-up and movement process of the control 2A01, the control 2A02, the control 2A03, and the control 2A04 is also an animation.

(1.2) Animation Effect Display Method

To implement the interfaces shown in FIG. 1A and FIG. 1B, an animation event needs to be configured for the control 1A01. To implement the interfaces shown in FIG. 2A and FIG. 2B, an animation event needs to be configured for the control 2A01, the control 2A02, the control 2A03, and the control 2A04.

Figure 3:
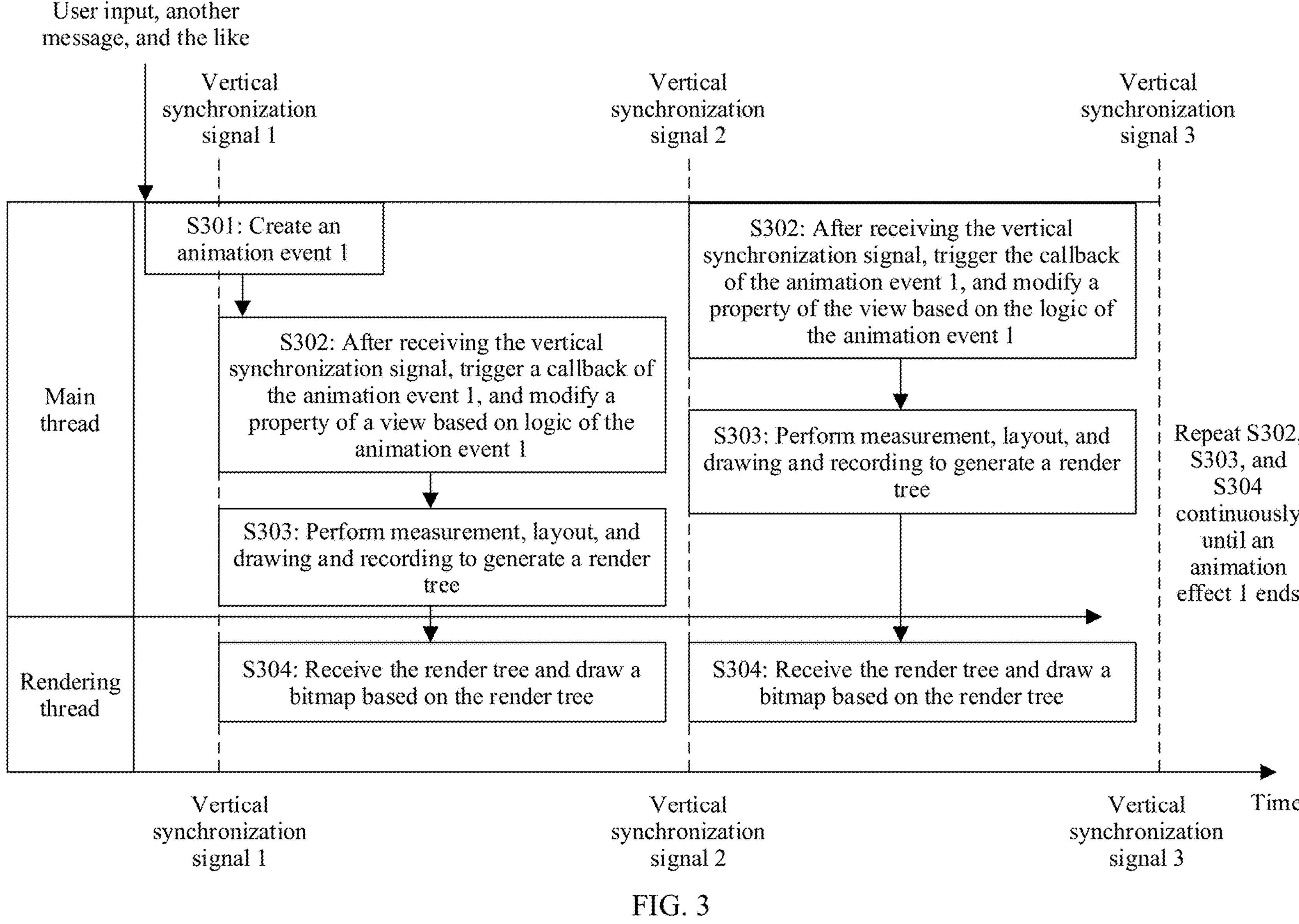
FIG. 3 is a schematic diagram of an example of an animation effect display method according to an embodiment of this application.

FIG. 3 is a schematic diagram of an example of an animation effect display method according to an embodiment of this application.

As shown in FIG. 3, the animation effect display method may include four steps: step S301: create an animation event 1; step S302: after receiving a vertical synchronization signal, trigger a callback of the animation event 1, and modify a property of a view based on logic of the animation event 1; step S303: perform measurement (measurement), layout (layout), and drawing and recording (drawing, which may also be referred to as drawing in software rendering) to generate a render tree; and step S304: receive the render tree, and draw a bitmap based on the render tree. A UI thread needs to perform step S301, step S302, and step S303. A rendering thread needs to perform step S304. For a first frame of an animation effect, an electronic device needs to perform step 301, step 302, step 303, and step 304. For each frame in duration of the animation effect, the electronic device needs to perform step S302, step S303, and step S304.

Step S301: Create the animation event 1

The animation event may be created at any moment, and is related to logic of an application. For example, the animation event may be created after a user input is received, a message event sent by another thread or process to the application is received, and a network data requests an update. The animation event includes internal logic for implementing the animation effect, for example, an end condition of the animation effect and a modification amount of a property of a view of each frame in the duration of the animation effect.

After the animation event is created, a callback is registered (equivalent to that the animation event is registered) with the UI thread. For example, the callback is registered with Choregrapher (Choregrapher) of the UI thread. The callback is used to trigger the UI thread to process the animation event each time the UI thread receives the vertical synchronization (Vsync-APP) signal and modify the property of the view based on logic of the animation event.

When the animation effect ends, the UI thread actively deregisters, based on the logic of the animation event, the callback of the animation event registered with the UI thread.

Step S302: After receiving the vertical synchronization signal, trigger the callback of the animation event 1, and modify the property of the view based on the logic of the animation event 1.

After receiving the vertical synchronization (Vsync-APP) signal, for example, a vertical synchronization signal 1, a vertical synchronization signal 2, and a vertical synchronization signal 3 shown in FIG. 3, the UI thread of the application sequentially processes an input event (CALLBACK_INPUT), an animation event (CALLBACK_ANIMATION), a traversal event (CALLBACK_TRAVERSAL), and a commitment event (CALLBACK_COMMIT).

In a process of processing the animation event (for example, doCallbacks (CALLBACK_ANIMATION)), the UI thread of the application modifies the property of the view based on the logic of the animation event.

For example, on the interfaces shown in FIG. 1A and FIG. 1B, a size of the control 1A02 is expanded from a rectangle with a width and height of 200 px to a rectangle with a width and height of 300 px, and duration is 20 frames. In this case, the size of the control 1A02 needs to be modified for each frame. To be specific, for a first frame of the animation, a view corresponding to the control 1A02 is modified to a rectangle with a width and height of 205 px, and for a second frame of the animation, the view corresponding to the control 1A02 is modified to a rectangle with a width and height of 210 px.

Step S303: Perform measurement, layout, and drawing and recording to generate the render tree.

A change of the property of the view triggers the UI thread to perform measurement, layout, and drawing and recording on the application interface. Measurement is used to determine a size of each view, layout is used to determine a layout of each view, and drawing and recording method is used to determine one or more drawing operations for drawing the bitmap of the application, and store the drawing operations in a drawing instruction list of the render tree.

Both the input event and the animation event may affect content of any one or more views on the application interface. Therefore, a main thread of the application needs to first process the input event and the animation event, and then process the traversal event. In a process in which the main thread of the application processes the traversal event, the UI thread of the application performs measurement, layout, and drawing and recording on the application interface, determines a property of each view, determines a rendering node corresponding to each view, and generates the render tree. The rendering node includes a rendering property (property) and a drawing instruction list (display list).

The render tree is generated by the UI thread, and is a data structure used to generate the application interface. In other words, the render tree records all information for generating the interface of one frame of the application. The render tree may include a plurality of rendering nodes, each rendering node includes a rendering property and a drawing instruction list, and the drawing instruction list includes one or more drawing operations.

The drawing operation is a data structure, and is used to draw a graph, for example, draw a line, draw a variable width, draw a rectangle, or draw a text. When the rendering thread is executed, the drawing operation is converted to an API call of an image processing library, for example, an interface call of OpenGL. For example, DrawLineOp is a data structure. The data structure includes drawn data such as a length and a width of a line, and may further include an interface call corresponding to DrawLineOP of an underlying graphics processing library.

The drawing instruction list may be a buffer. The buffer records all drawing operations included in one frame of the application interface, or identifiers of all the drawing operations, such as addresses and sequence numbers. When the application has a plurality of windows or is displayed in different display (display) areas, a plurality of render trees need to be independently generated. A plurality of drawing instruction lists corresponding to different windows and display areas are independently generated. In this embodiment of this application, the display area may be a display, or may be a virtual display (Virtual Display), or the like. The virtual display may be an area in which the electronic device carries content displayed on the display during screen recording.

Step S304: Receive the render tree, and draw the bitmap based on the render tree.

After the UI thread generates the render tree and transfers the render tree to the rendering thread, the rendering thread generates the bitmap based on the render tree. The rendering thread obtains a hardware canvas (Hardware Canvas) and performs the drawing operation on the render tree on the hardware canvas to generate the bitmap. The bitmap is transferred to a surface synthesizer (Surface Flinger) and a hardware synthesis policy module (Hardware Composer, HWC) for obtainment, and then an interface is generated for display.

Figure 4A:
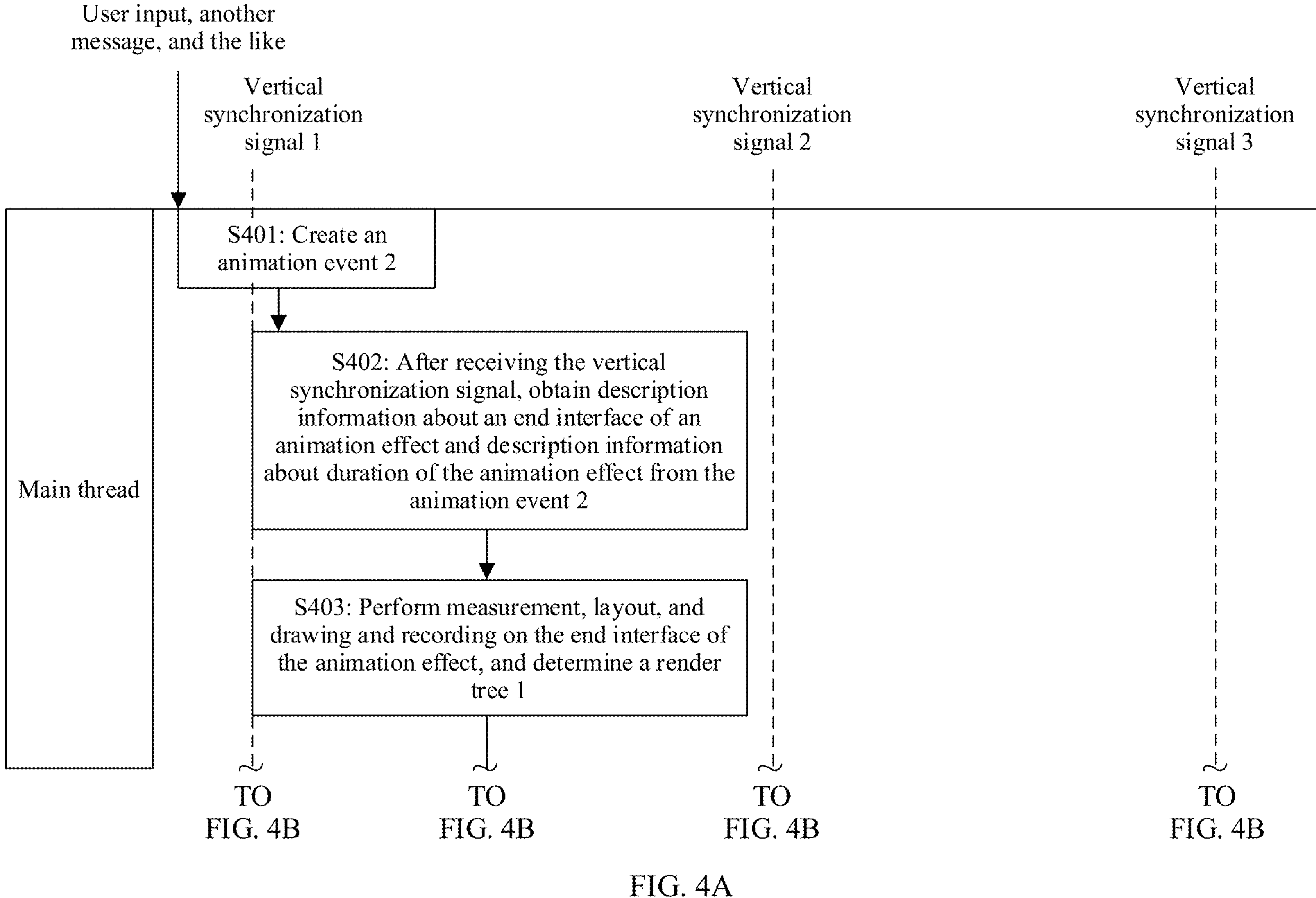
FIG. 4A and FIG. 4B are a schematic diagram of an example of another animation effect display method according to an embodiment of this application.
Figure 4B:
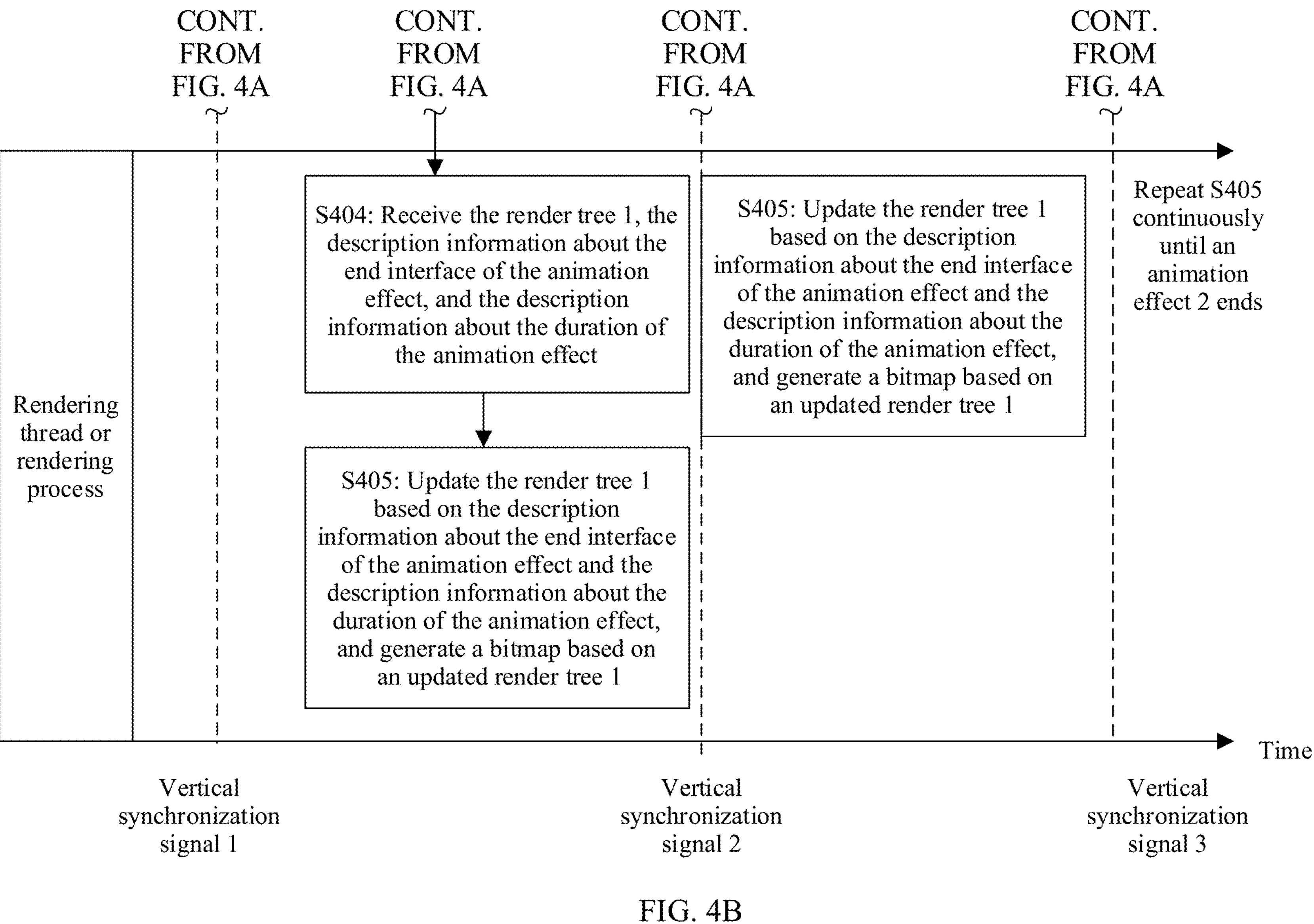

Different from the method in FIG. 3, another animation effect display manner as shown in FIG. 4A and FIG. 4B according to an embodiment of this application is provided.

FIG. 4A and FIG. 4B are a schematic diagram of an example of another animation effect display method according to an embodiment of this application.

As shown in FIG. 4A and FIG. 4B, the animation effect display method may include five steps: step S401: create an animation event 2; step S402: after receiving a vertical synchronization signal, obtain description information about an end interface (which may also be referred to as description information about an end frame) of an animation effect and description information about duration of the animation effect from the animation event 2; step S403: perform measurement, layout, and drawing on the end interface of the animation effect, and determine a render tree 1; step S404: receive the render tree 1, the description information about the end interface of the animation effect, and description about the duration of the animation effect; and S405: update the render tree 1 based on the description information about the end interface of the animation effect and the description information about the duration of the animation effect, and generate a bitmap based on an updated render tree 1.

A UI thread needs to perform step S401, step S402, and step S403. A rendering thread or a rendering process needs to perform step S404 and step S405. For a first frame of the animation effect, an electronic device needs to perform step S401, step S402, step S403, step S404, and step S405. In each frame in the duration of the animation effect, the electronic device needs to perform step S405. The rendering process may be a process independent of an application.

Step S401: Create the animation event 2.

The UI thread of the application creates the animation event 2 through an animation interface. For a description of the animation interface, refer to the following description in step S802. Details are not described herein again.

Different from the animation event 1, a callback may not be registered with the UI thread in the duration of the animation effect for the animation event 2.

For an occasion of creating the animation event 2, refer to the text description in step S301. Details are not described herein again.

Step S402: After receiving the vertical synchronization signal, obtain the description information about the end interface of the animation effect and the description information about the duration of the animation effect from the animation event 2.

Different from step S302, after receiving the vertical synchronization signal, for example, a vertical synchronization signal 1, a vertical synchronization signal 2, and a vertical synchronization signal 3 in the figure, the UI thread obtains the description information about the end interface of the animation effect and the description information about the duration of the animation effect from the animation event 2. In addition, the UI thread does not modify a property of a view, and does not trigger step S303.

Optionally, in some embodiments of this application, the UI thread may obtain description information about a step size of the animation effect and the description information about the duration of the animation effect from the animation event 2. Alternatively, the UI thread may obtain the description information about the end interface, description information about a step size of the animation effect, and the like from the animation event 2. This is not limited herein.

It should be noted that the UI thread may directly obtain the end interface of the animation effect from the animation event 2, or indirectly determine the end interface of the animation effect from the animation event 2.

S403: Perform measurement, layout, and drawing on the end interface of the animation effect, and determine the render tree 1.

The UI thread actively performs measurement, layout, and drawing and recording on the end interface of the animation effect, and further generates the render tree 1. The UI thread synchronizes the render tree 1, the description information about the end interface of the animation effect, and the description information about the duration of the animation effect to the rendering thread.

Optionally, in some embodiments of this application, the UI thread synchronizes the render tree 1, the description information about the duration of the animation effect, and the description information about the step size of the animation effect to the rendering thread or the rendering process.

Optionally, in some embodiments of this application, the UI thread synchronizes the render tree 1, the description information about the end interface of the animation effect, and the description information about the step size of the animation effect to the rendering thread or the rendering process.

Optionally, in some embodiments of this application, the UI thread synchronizes at least two description information of the description information about the end interface of the animation effect, the description information about the step size of the animation effect, and the description information about the step size of the animation effect to the rendering thread, but does not synchronize the render tree 1. In this case, in step S405, the rendering thread updates a render tree 0 based on the description information about the end interface of the animation effect and the description information about the duration of the animation effect. The render tree 0 corresponds to an interface shown before the animation effect starts.

Optionally, in some embodiments of this application, the UI thread may determine a property of a view on an interface of each frame in the duration of the animation effect based on the at least two description information of the description information about the end interface of the animation effect, the description information about the step size of the animation effect, and the description information about the step size of the animation effect, and further synchronize a property value of the view on the interface of each frame in the duration of the animation effect and the render tree 1 to the rendering thread or the rendering process.

Step S404: Receive the render tree 1, the description information about the end interface of the animation effect, and the description information about the duration of the animation effect.

The rendering thread of the application may receive, through a message queue, data sent by the UI thread. The rendering process may receive, through inter-process communication, the data sent by the UI thread. The rendering process may further request and obtain the data from the UI thread after independently requesting and receiving a vertical synchronization signal.

S405: Update the render tree 1 based on the description information about the end interface of the animation effect and the description information about the duration of the animation effect, and generate the bitmap based on an updated render tree 1.

The rendering thread of the application or the rendering process determines, based on the description information about the end interface of the animation effect, and the interface shown before the animation effect starts, a view whose property changes. The rendering thread determines a step size of a property based on the duration of the animation effect, and further determines a property of the view on the interface of each frame in the duration of the animation effect.

For a process of generating an interface of one frame in the animation effect, the rendering thread of the application or the rendering process may first determine a rank of the frame in the animation effect, that is, a specific number of the frame in the animation effect. Further, a property of a view on the interface of the frame may be determined, that is, description information about the animation effect of the frame may be determined.

The specific number of the frame in the animation effect may be determined based on time of the frame, a frequency of a vertical synchronization signal, and start time of the animation effect. The start time of the animation effect is time of a vertical synchronization signal, for example, the vertical synchronization signal 1 in FIG. 4A and FIG. 4B, corresponding to an interface of the first frame of the animation effect. Alternatively, the start time of the animation effect may be a moment of an animation trigger event, or the like. This is not limited herein.

After determining the property of the view on the interface of each frame in the duration of the animation effect, and receiving the vertical synchronization signal, for example, the vertical synchronization signal 2 and the vertical synchronization signal 3 in FIG. 4B, the rendering thread may update a parameter corresponding to property of the view in the render tree 1, and then generate the bitmap based on an updated render tree 1.

For each frame other than the first frame in the duration of the animation, only the rendering thread of the application or the rendering process needs to perform step S405 to draw the interface of each frame in the animation effect and further display the animation effect.

It should be noted that execution of the UI thread and the rendering thread or the rendering process may be separately triggered by different vertical synchronization signals. For example, the vertical synchronization signal received by the UI thread and the vertical synchronization signal received by the rendering thread may be vertical synchronization signals with a same cycle and different phases (with a fixed time difference).

Clearly, according to the animation effect display method shown in FIG. 3, when the UI thread is blocked by another task, or it takes a relatively long time for the UI thread to perform step S303, the rendering thread cannot generate the bitmap before the vertical synchronization signal 2 arrives. Frame freezing or jank occurs. However, for the animation effect display method shown in FIG. 4A and FIG. 4B, in a process of generating an interface of each frame other than the first frame in the duration of the animation, the rendering thread or the rendering process mainly updates the render tree to generate a multi-frame interface in the duration of the animation, and the UI thread does not participate in the process, or the UI thread undertakes a relatively small calculation amount or task amount. When the UI thread is blocked by another task, frame freezing or jank is not likely to occur.

In addition, for the animation effect display method shown in FIG. 3, if there are a plurality of animation events, different animation effects conflict with each other. In this case, only one animation effect is displayed, and consequently an interface jumps. This is unfavorable to user experience.

The following describes, by using examples, a reason why a plurality of animation effects conflict with each other and an interface jump caused by the plurality of animation effects.

(1.3) Animation Effect Conflict

Figure 5:
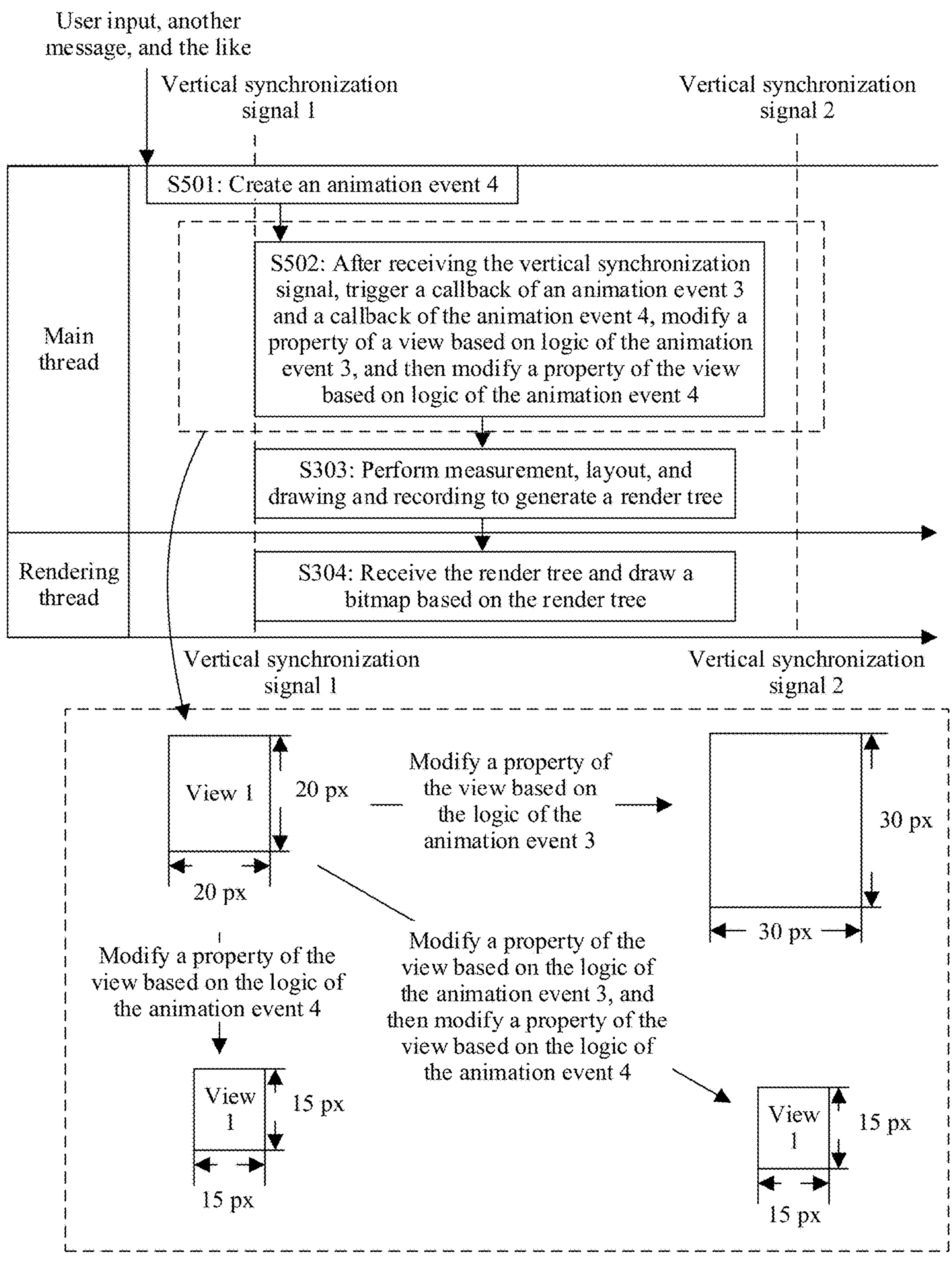
FIG. 5 is a schematic diagram of an example of an animation effect conflict according to an embodiment of this application.

FIG. 5 is a schematic diagram of an example of an animation effect conflict according to an embodiment of this application.

As shown in FIG. 5, a process in which an electronic device performs the animation effect display method shown in FIG. 3 includes the following steps.

S501: Create an animation event 4

In duration of an animation effect 3, in response to a user input, another message, and the like, a UI thread creates the animation event 4, and registers a callback corresponding to the animation event 4 with the UI thread.

S502: After receiving a vertical synchronization signal, trigger a callback of an animation event 3 and a callback of the animation event 4, modify a property of a view based on logic of the animation event 3, and then modify a property of the view based on logic of the animation event 4.

After a vertical synchronization signal 1 is received, the callback of the animation event 3 and the callback of the animation event 4 are triggered. The UI thread separately modifies the property of the view based on the logic of the animation event 3, and modifies the property of the view based on the logic of the animation event 4. In this case, the logic of the animation event 4 may overwrite the modification of the property of the view by the animation event 3.

For example, the view modified by the animation event 3 includes a view 1, and the view modified by the animation event 4 includes the view 1. Before modification, the view 1 is a square of 20 px. The view 1 is modified to a square of 30 px based on the logic of the animation event 3, and the view 1 is modified to a square of 15 px based on the logic of the animation event 4. The UI thread separately modifies the property of the view based on the logic of the animation event 3, and modifies the property of the view 1 based on the logic of the animation event 4. The view 1 finally becomes the square of 15 px.

In this case, the UI thread actually does not execute the logic of the animation event 3, and the animation effect corresponding to the animation effect event 3 is not correctly displayed. As a result, an interface jumps. The interface jumps as shown in FIG. 6A to FIG. 6F.

Then, step S303 and step S304 are performed. For content of step 303 and step S304, refer to the foregoing text description corresponding to FIG. 3. Details are not described herein again.

FIG. 6A to FIG. 6F are schematic diagrams of an example of an interface change in a multi-animation conflict according to an embodiment of this application.

Figure 6A:
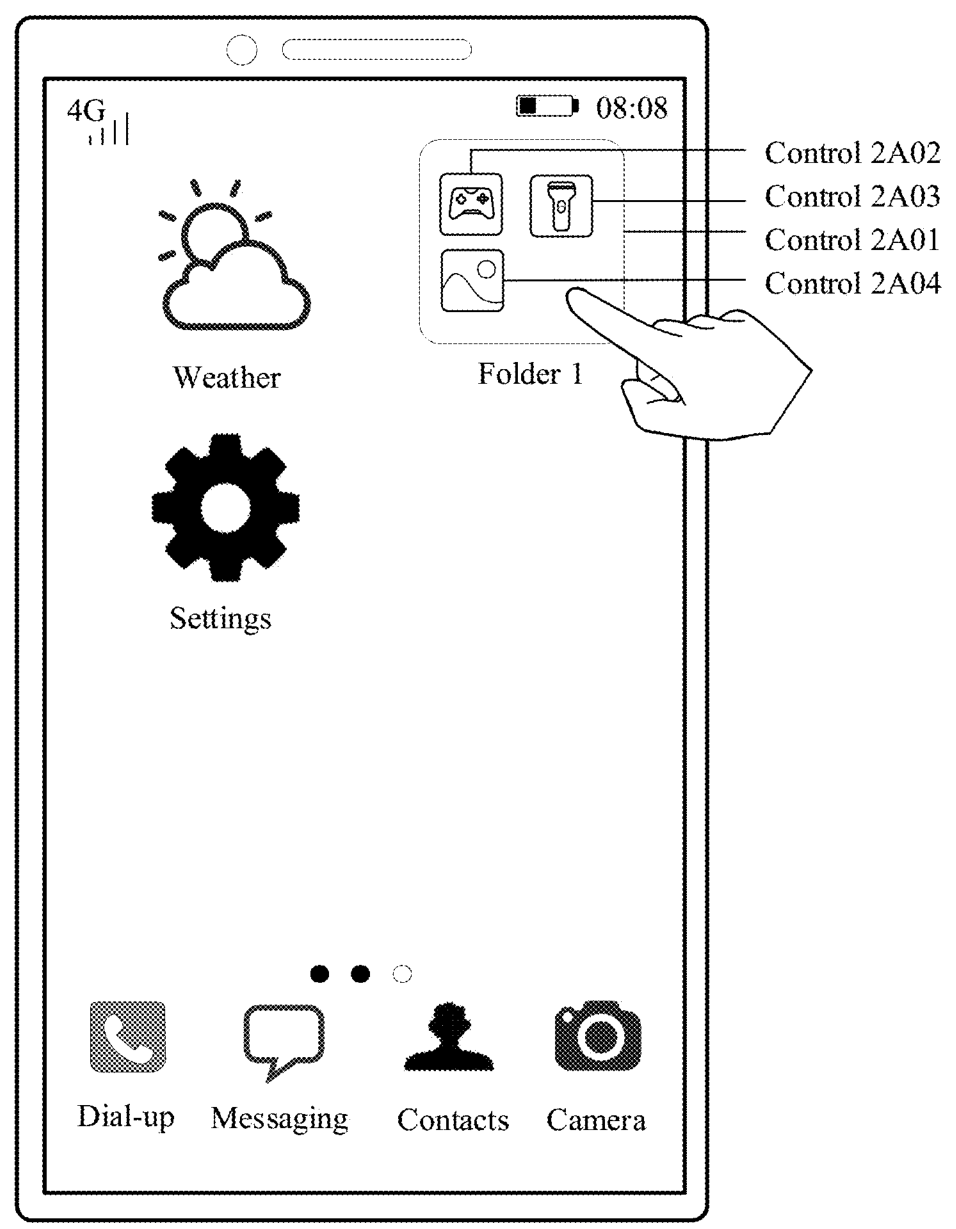
FIG. 6A to FIG. 6F are schematic diagrams of an example of an interface change in a multi-animation conflict according to an embodiment of this application.

As shown in FIG. 6A, an interface of a desktop application is displayed on a screen of an electronic device. The interface of the desktop application includes a control 2A01. As a parent control, the control 2A01 may further include several child controls, for example, include a control 2A02, a control 2A03, and a control 2A04.

The control 2A01 may be a folder or a card in the desktop application. For example, in FIG. 6A to FIG. 6E, the control 2A01 is a folder 1, the control 2A02 includes an icon of a game application, the control 2A03 includes an icon of a flashlight application, and the control 2A04 includes an icon of a gallery application.

The interface shown in FIG. 6A may be considered as an interface shown before an animation effect 1 starts.

In response to tapping the control 2A01 by a user, this interaction may trigger the animation effect 1. The animation effect 1 is applied to the control 2A01, the control 2A02, the control 2A03, and the control 2A04, that is, the control 2A01, the control 2A02, the control 2A03, and the control 2A04 are animation objects of the animation effect 1. The animation effect 1 gradually increases sizes of the animation objects and moves locations of the animation objects toward a center of the interface.

Figure 6B:
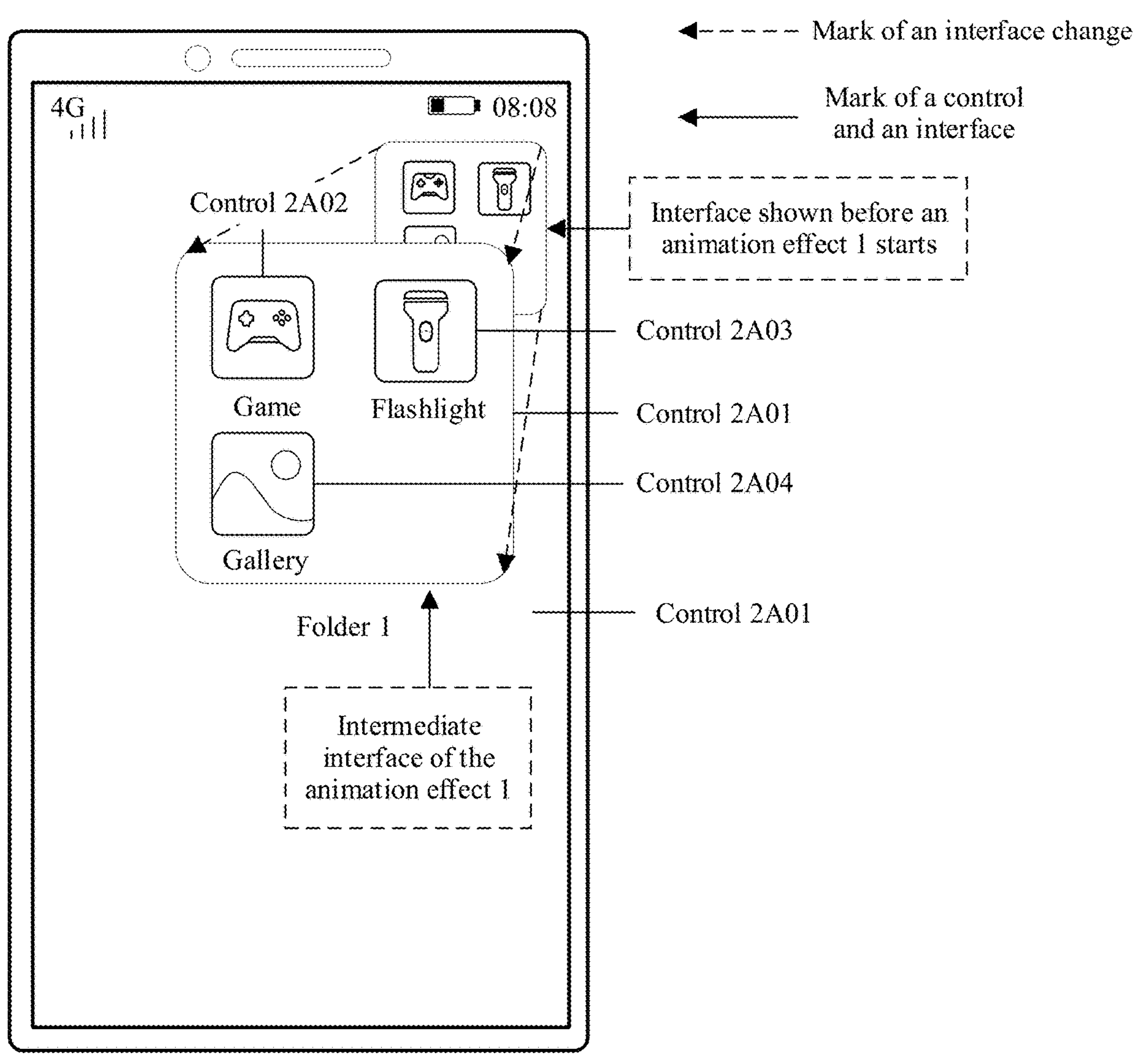

As shown in FIG. 6B, a size of the control 2A02 gradually increases, for example, a height and/or a width increases, and a location of the control 2A02 changes. An interface shown in FIG. 6B includes a start interface of the animation effect 1 and an intermediate interface of the animation effect 1.

Figure 6C:
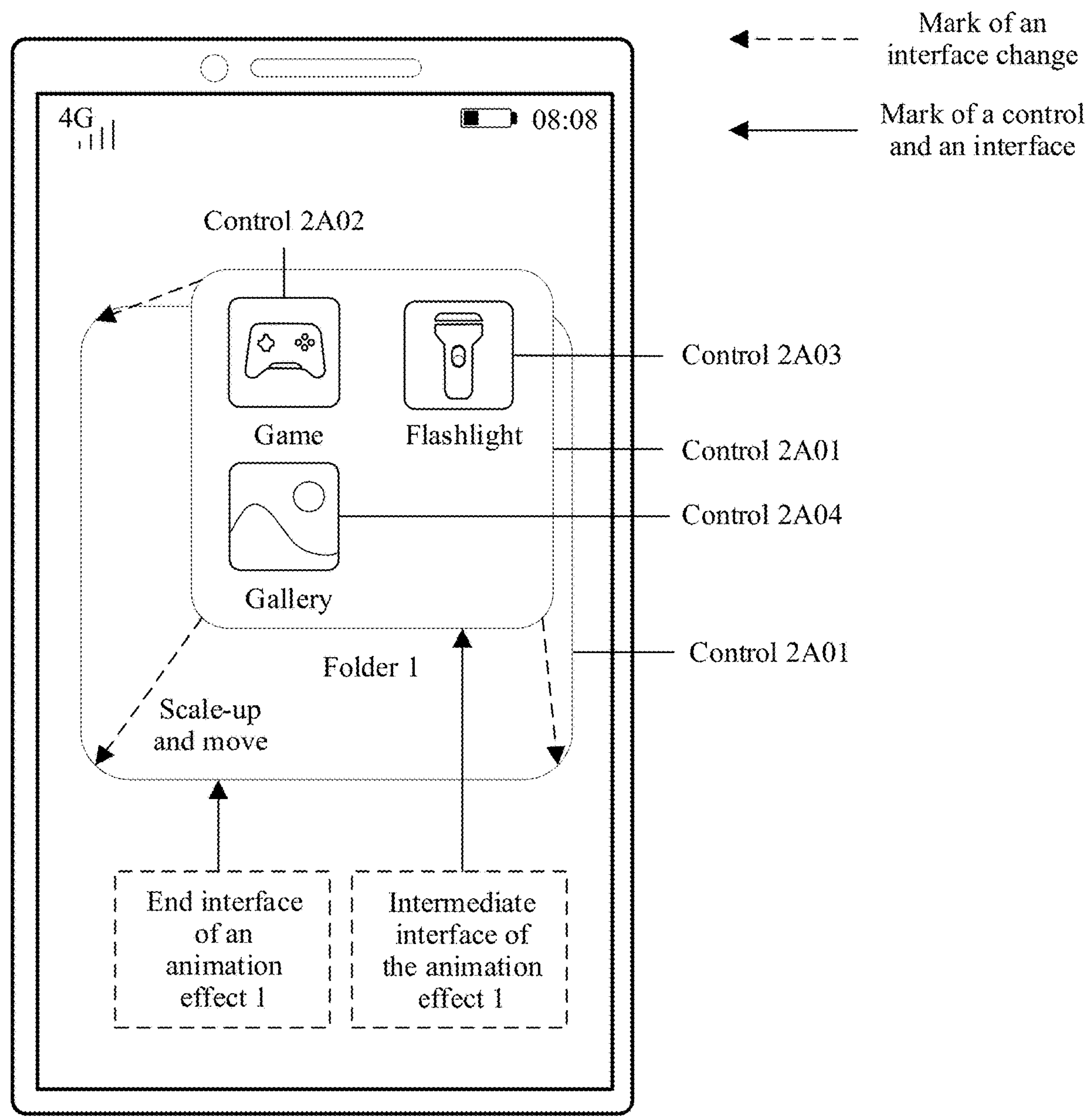

As shown in FIG. 6C, as the size of the control 2A02 continuously increases, a change of an interface displayed on the electronic device is a process in which the intermediate interface of the animation effect 1 changes to an end interface of the animation effect 1.

Figure 6D:
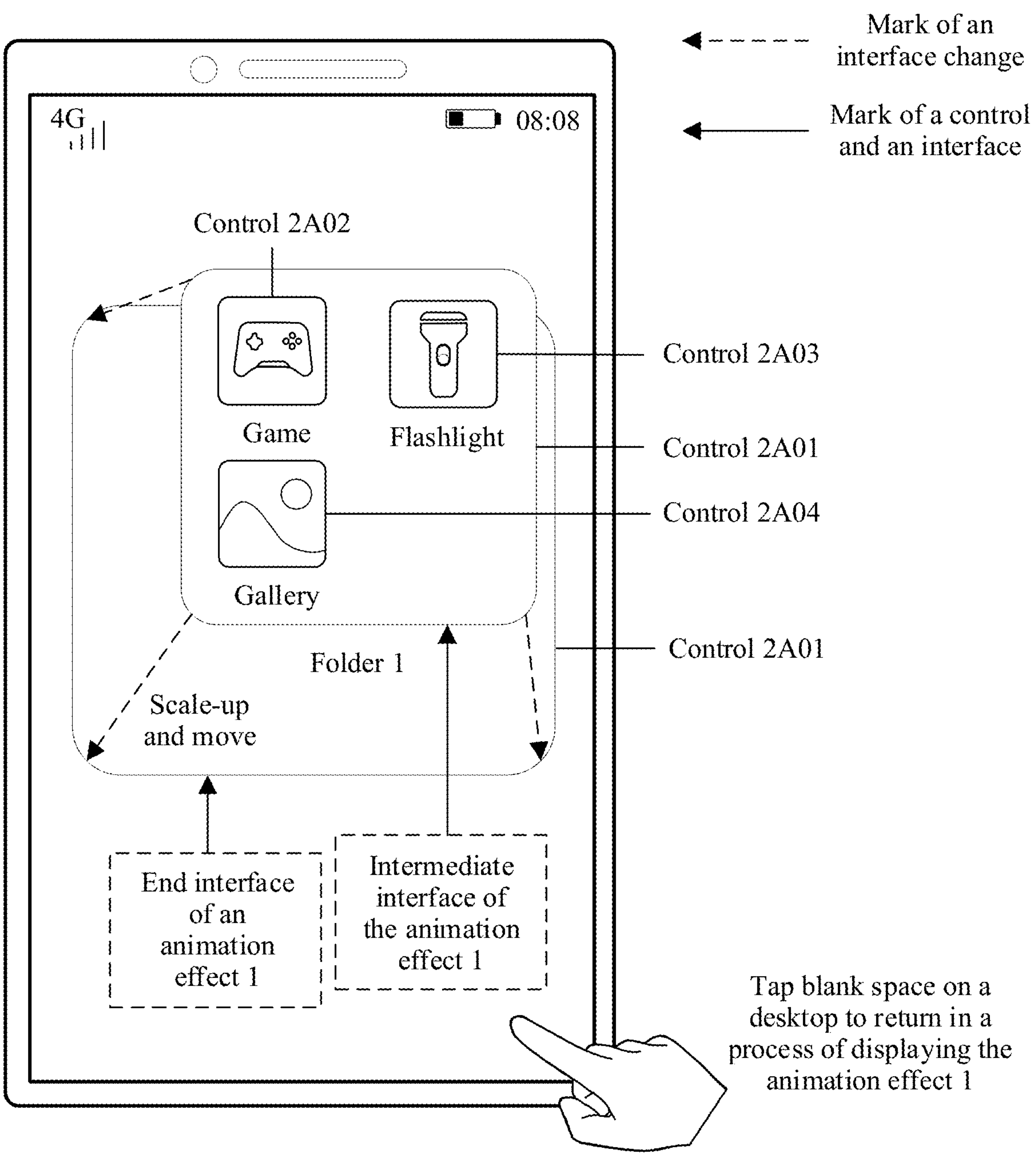

As shown in FIG. 6D, before the animation effect 1 ends, the user taps a part that does not belong to the control 2A01 on a desktop, or returns to the interface shown in FIG. 6A in another interaction manner, for example, by using a "back (back)" interaction gesture, and the like. In this case, the interaction triggers an animation effect 2. The animation effect 2 is applied to the control 2A01, the control 2A02, the control 2A03, and the control 2A04, that is, the control 2A01, the control 2A02, the control 2A03, and the control 2A04 are animation objects of the animation effect 2. An effect of the animation effect 2 is that sizes of the animation objects gradually decrease and locations of the animation objects move toward a location of the control 2A01 in FIG. 1A.

The animation effect 1 does not end yet, and the animation effect 2 occurs. The animation objects to which the animation effect 1 and the animation effect 2 are applied have an intersection, and both the animation effect 1 and the animation effect 2 need to modify a size and a location of a view corresponding to the animation object. Therefore, a conflict occurs between the animation effect 1 and the animation effect 2. In this case, the interface may be changed in two manners: an interface shown in FIG. 6E and an interface shown in FIG. 6F.

Figure 6E:
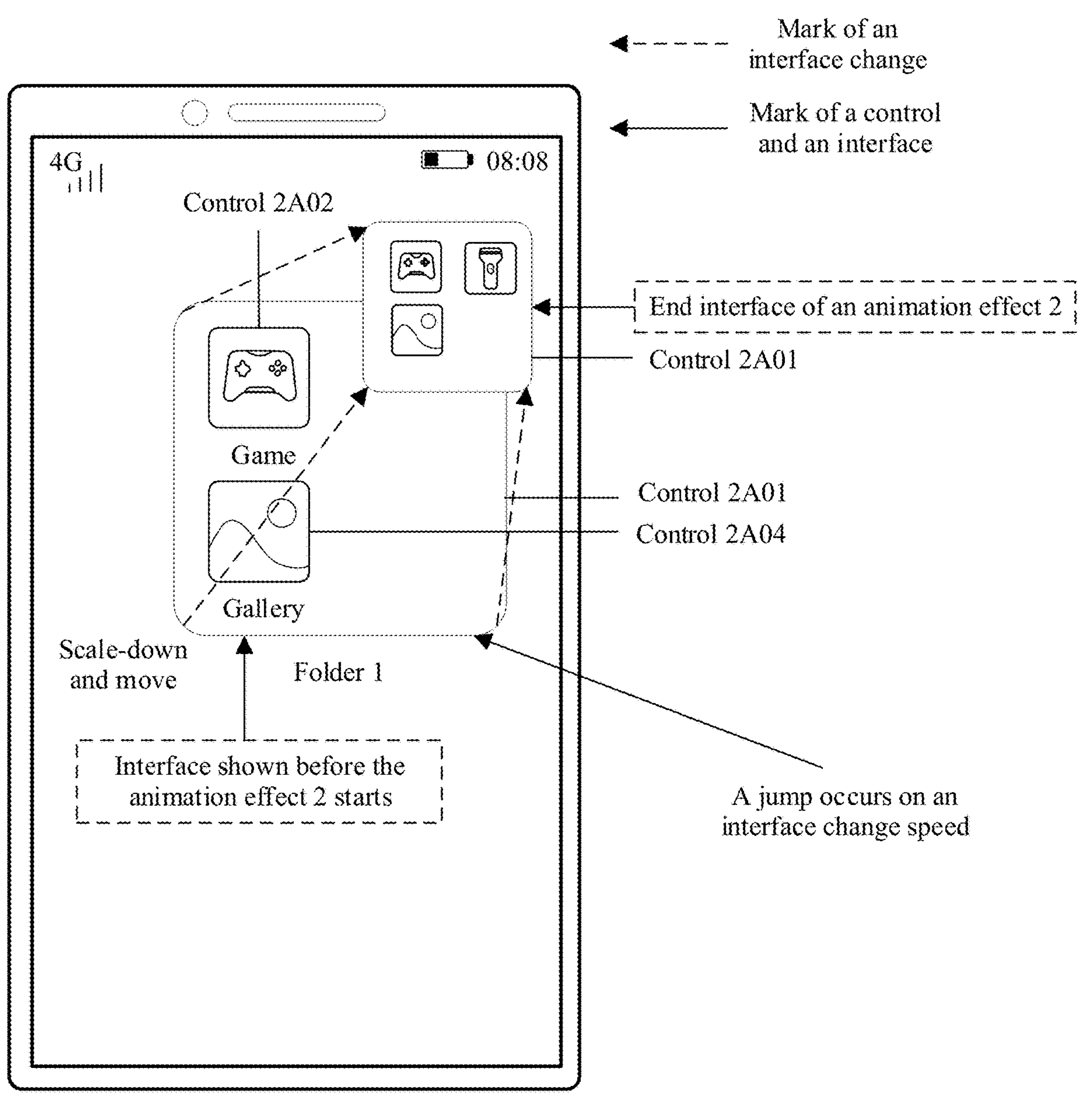

As shown in FIG. 6E, in response to tapping, by the user, the part that does not belong to the control 2A01 on the desktop, or using another interaction manner, for example, the "back (back)" interaction gesture, and the like, an intermediate interface of the animation effect 1 is used as a start interface of the animation effect 2, and the property of the view starts to be modified based on logic of the animation effect 2. For example, the view starts from the intermediate interface of the animation effect 1, and changes into an end interface of the animation effect 2.

Figure 6F:
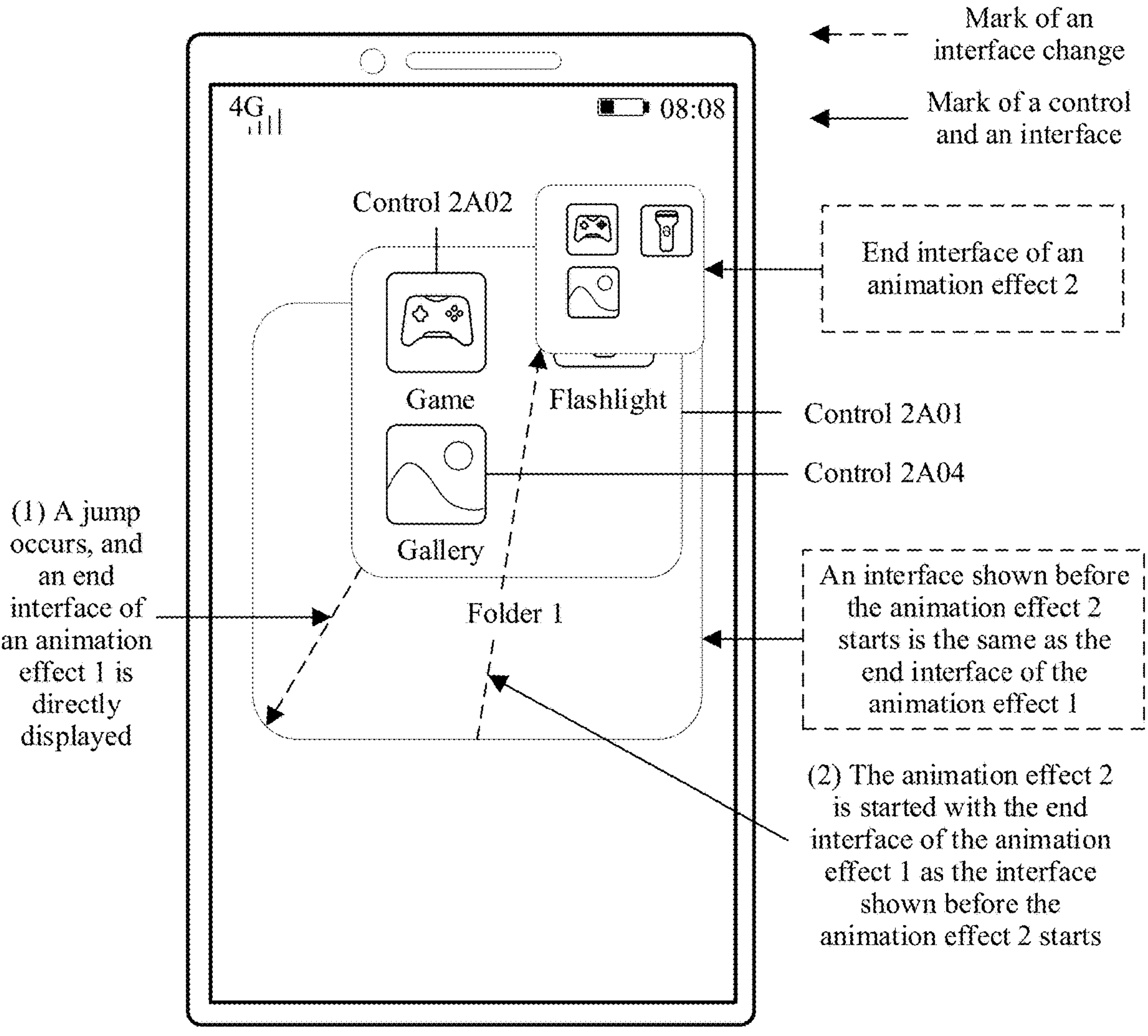

Alternatively, as shown in FIG. 6F, in response to tapping, by the user, the part that does not belong to the control 2A01 on the desktop, or using another interaction manner, for example, the "back (back)" interaction gesture, and the like, a change of the interface displayed by the electronic device is divided into two steps:

(1) in FIG. 6F: Content displayed by the electronic device directly jumps from an intermediate interface of the animation effect 1 to the end interface of the animation effect 1.

(2) in FIG. 6F: In a next frame, the end interface of the animation effect 1 is used as a start interface of the animation effect 2, and is gradually changed to an end interface of the animation effect 2 based on logic of the animation effect 2. To be specific, in FIG. 6F, the control 2A01 gradually decreases until the control 2A01 changes to a size shown in FIG. 6A, and a location of the control 2A01 returns to a location of the control 2A01 shown in FIG. 6A.

Figure 7A:
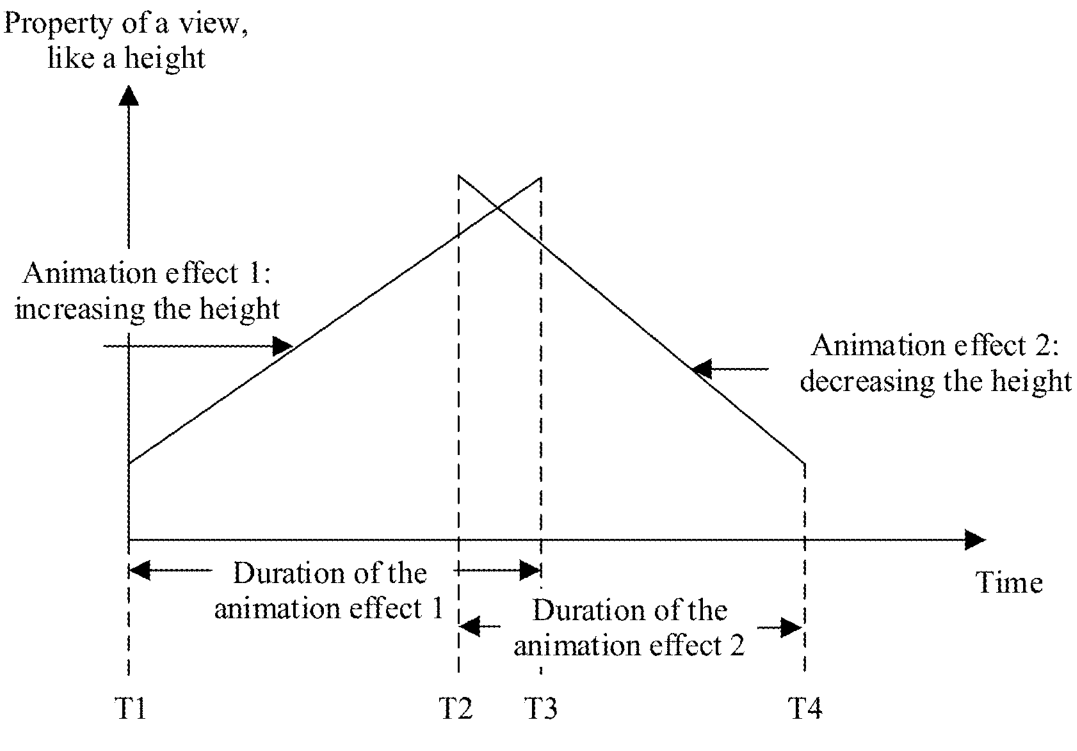
FIG. 7A, FIG. 7B, and FIG. 7C are schematic diagrams of an example of a view property change in a multi-animation scenario according to an embodiment of this application.
Figure 7B:
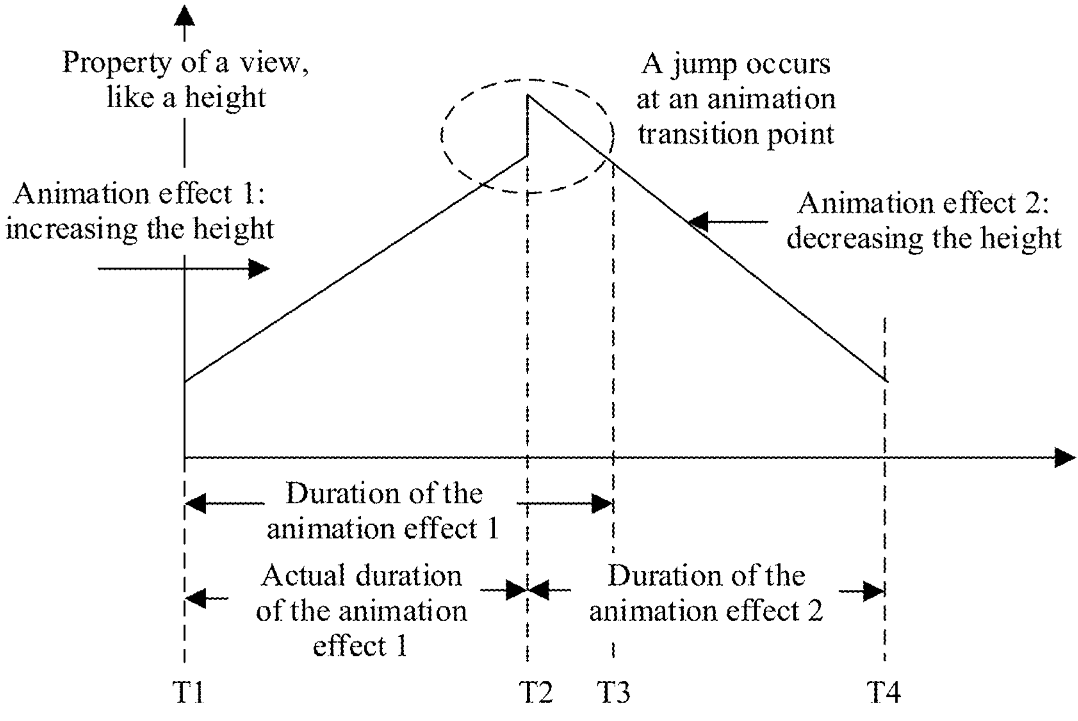
Figure 7C:
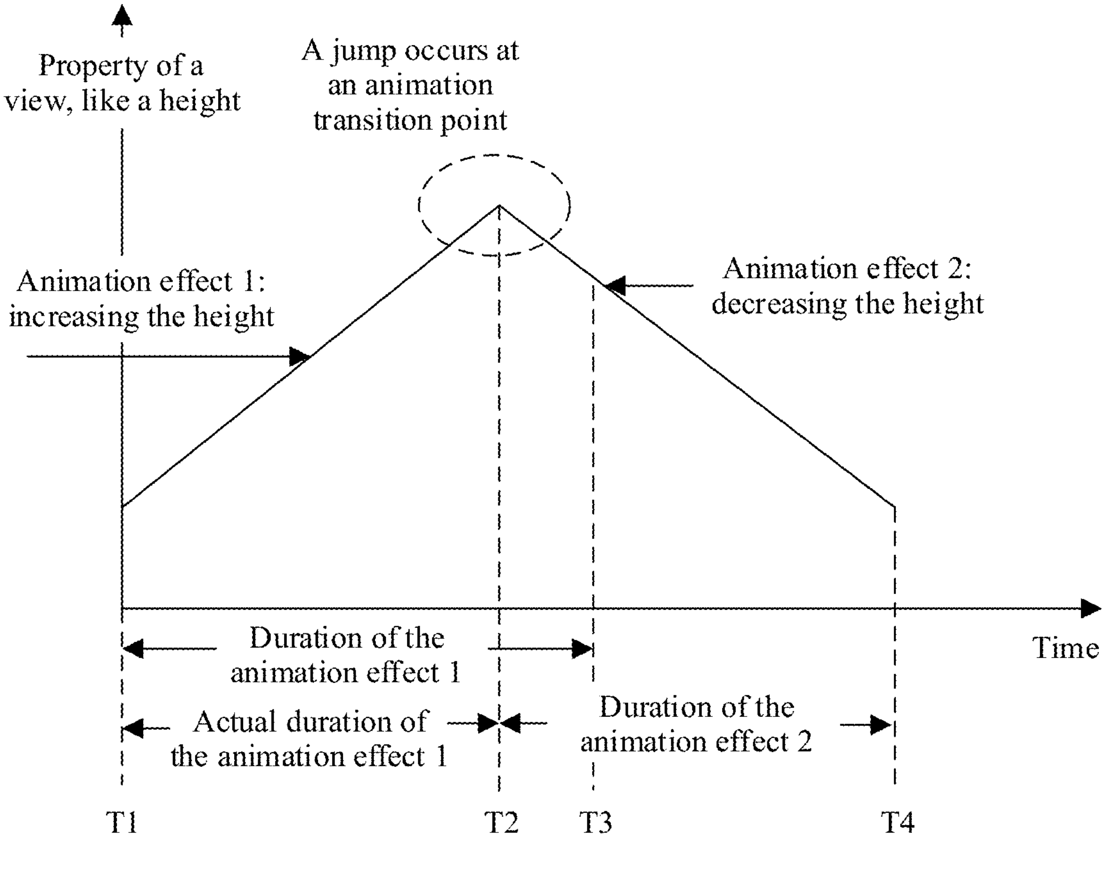

Clearly, when a plurality of animation effects conflict, the change of the interface jumps, or a change speed of the interface jumps. As a result, changes of the interface are not continuous, which does not conform to a visual habit of the user, as shown in FIG. 7A, FIG. 7B, and FIG. 7C. This reduces user experience.

FIG. 7A, FIG. 7B, and FIG. 7C are schematic diagrams of an example of a view property change in a multi-animation scenario according to an embodiment of this application.

As shown in FIG. 7A, estimated duration of an animation effect 1 is T1 to T3, and estimated duration of an animation effect 2 is T2 to T4. T1 is less than T2, T2 is less than T3, and T3 is less than T4. The estimated duration is a period of time configured by an application for the animation effect. The animation effect 1 increases a height of a view, and the animation effect 2 decreases a height of the view.

In the case shown in FIG. 7A, a property of a view changes as shown in FIG. 7B or FIG. 7C.

As shown in FIG. 7B, from T1 to T2, the property of the view changes based on logic of the animation effect 1, for example, a height of the view increases linearly; at T2, because the animation effect 1 conflicts with the animation effect 2, the property of the view like the height jumps; from T2 to T4, the property of the view changes based on logic of the animation effect 2, for example, the height of the view decreases linearly.

Clearly, at the moment T2, the property of the view, for example, the height, jumps at a transition point between the animation effect 1 and the animation effect 2.

As shown in FIG. 7C, from T1 to T2, the property of the view changes based on the logic of the animation effect 1, for example, the height of the view increases linearly; at T2, because the animation effect 1 conflicts with the animation effect 2, the property of the view starts to change based on the logic of the animation effect 2, for example, the height of the view decreases linearly.

Clearly, at the moment T2, the property of the view, for example, a height change rate, jumps at a transition point between the animation effect 1 and the animation effect 2. In FIG. 7B and FIG. 7C, actual duration of the animation effect 1 is T2 to T1. Duration of the animation effect 2 is T2 to T4.

It should be noted that, in addition to the content shown in FIG. 7A, FIG. 7B, and FIG. 7C, if different types of animation effects conflict, the interface is also likely to be incorrectly displayed or jump.

(2) Animation Effect Display Method Provided in an Embodiment of this Application According to the animation effect display method provided in this embodiment of this application, this embodiment of this application first provides an animation interface for implementing an animation effect. The animation interface may be one or more functions, methods, and manners. An application may set information such as a property of a control or the animation effect through the animation interface, so that an animation framework provided in this application generates a corresponding animation interface based on the information. The information that may be set in the animation interface includes: an end interface of the animation effect and duration of the animation effect; or description information about a step size of the animation effect and the duration of the animation effect; or the description information about the step size of the animation effect and description information about the end interface of the animation effect. The animation interface helps reduce a workload of an application developer. In addition, the application developer may not configure an interface of each frame in an animation effect process, and a rendering thread or a rendering process independently determines the interface of each frame in the animation effect process.

According to the animation effect display method provided in this embodiment of this application, in the process of displaying the animation effect, a property of a view is not modified, but an animation parameter in a rendering property of a render tree is added and modified, to draw the interface of each frame in the continuous process of the animation effect. To be specific, the animation parameter may be a parameter used to update the render tree, and may include a changed property of a control on an interface of one frame in the animation effect process.

According to the animation effect display method provided in this embodiment of this application, in the animation process again, because only the parameter in the rendering property of the render tree instead of the property of the view needs to be modified, a UI thread may neither respond to an animation event nor perform measurement, layout, and drawing and recording. This helps avoid jank. The rendering thread or the rendering process is responsible for modifying the rendering property of the render tree.

According to the animation effect display method provided in this embodiment of this application, finally, if a plurality of animation effects conflict, because the animation effect display method provided in this embodiment of this application modifies display content based on the end interface of the animation effect, a continuous interface change (or a continuous interface change speed) can be implemented. This implements a smoother interface and improves user experience.

The following describes the animation effect display method provided in this embodiment of this application by using examples.

(2.1) Process of the Animation Effect Display Method

Figure 8:
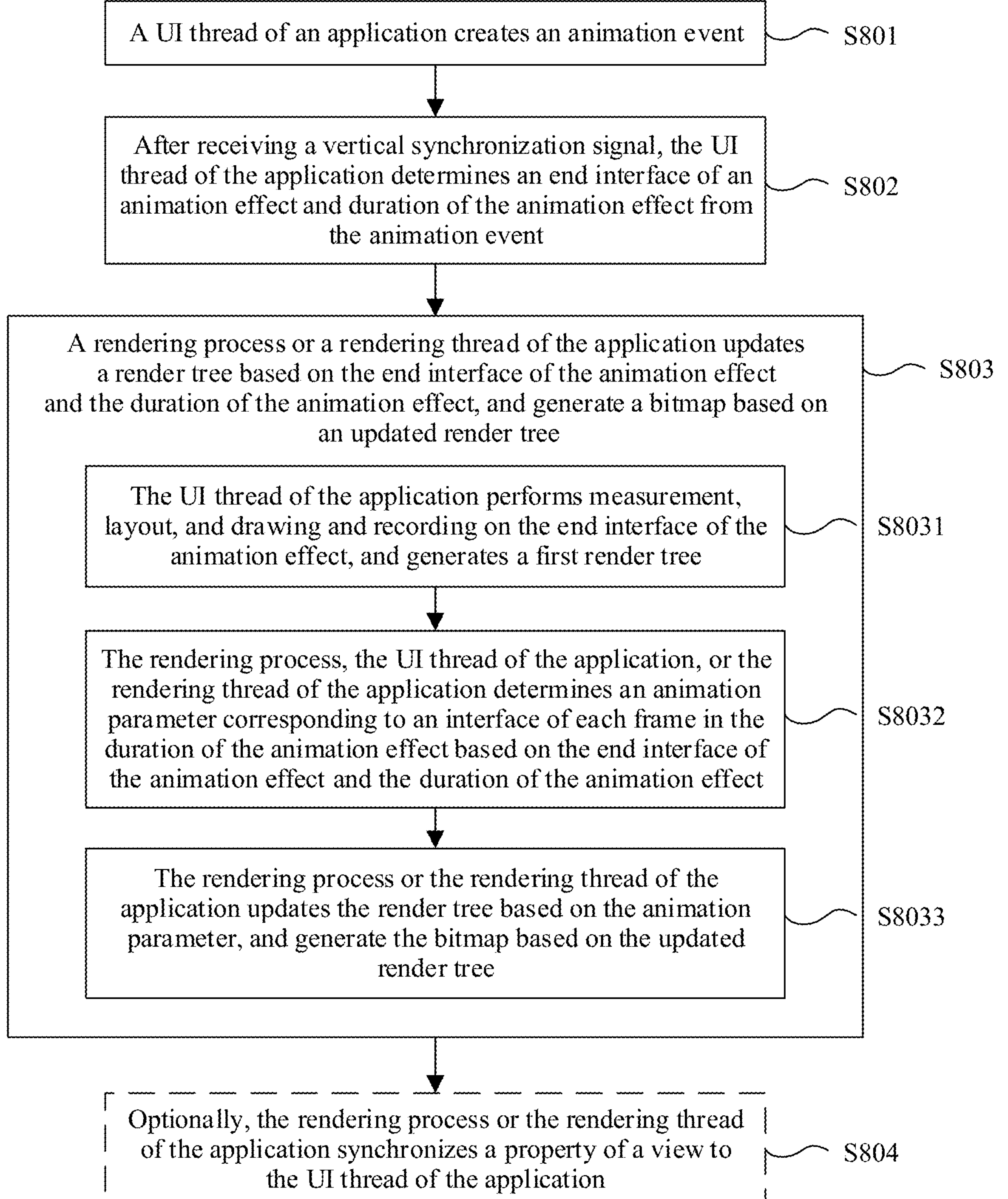
FIG. 8 is a schematic diagram of an example of a procedure of an animation effect display method according to an embodiment of this application.

FIG. 8 is a schematic diagram of an example of a procedure of an animation effect display method according to an embodiment of this application.

As shown in FIG. 8, the procedure of the animation effect display method provided in this embodiment of this application includes the following steps.

S801: A UI thread of an application creates an animation event.

The animation event may be created at any moment, and is related to logic of an application. For example, the animation event may be created after a user input is received, a message event sent by another thread or process to the application is received, and a network data requests an update. The animation event includes internal logic for implementing an animation effect. For ease of description, messages that trigger the UI thread of the application to create the animation event are referred to as an animation trigger event.

In this embodiment of this application, after the animation event is created, a callback is registered once with a choreographer of the UI thread of the application. This callback is used to trigger the UI thread of the application to process the animation event when a first vertical sync signal arrives after the animation event is created.

To distinguish between animation events in the methods shown in FIG. 3, FIG. 4A, and FIG. 4B, in the following, the animation event in the method shown in FIG. 3 is a non-implicit animation, and the animation event in FIG. 4A and FIG. 4B is an implicit animation. An animation event created by an application developer through an animation interface provided in this embodiment of this application is an implicit animation.

It should be noted that, for ease of comparative description of content in FIG. 3, FIG. 4A, and FIG. 4B, the animation events are briefly referred to as the implicit animation and the non-implicit animation. This does not impose any limitation on the animation event created through the animation interface in this embodiment of this application.

Optionally, in some embodiments of this application, an implicit animation may be converted into a non-implicit animation. A conversion process may occur in a process of installing or starting the application for the first time, or a conversion process may occur in a compilation process, which is not limited herein.

For example, the non-implicit animation determines that an animation object, a callback of a vertical synchronization signal of each frame, a modification of a property of a view, an end condition of the animation, and the like. The callback of the vertical synchronization signal of each frame is used to always trigger the UI thread to process the animation event when the animation does not meet the end condition. In this case, a process of converting the animation event into an implicit animation may include the following two steps:

First, the callback of the vertical synchronization signal of each frame of the non-implicit animation is blocked or intercepted, so that the non-implicit animation neither modifies the property of the view nor triggers the UI thread of the application to perform measurement, layout, and drawing and recording.

Then, a parameter required for the implicit animation is determined. For example, an end interface and duration of the animation are determined by modifying time information of the vertical synchronization (Vsync-APP) signal. Alternatively, for some non-implicit animations, an animation object of the animation, a step size of each property of each animation object, duration of the animation, an end interface of the animation, and the like may be directly determined.

S802: After receiving the vertical synchronization signal, the UI thread of the application determines the end interface of the animation effect and the duration of the animation effect from the animation event.

After receiving the vertical sync signal, the UI thread of the application processes the animation event. The animation event is configured by the animation interface. A format of the animation interface may be: a name of the animation interface (duration, description information about an end interface), a name of the animation interface (duration, a change curve, description information about an end interface), a name of the animation interface (description information about a step size, description information about an end interface), a name of the animation interface (duration, description information about an end interface), and the like, which is not limited herein.

In addition to a location, a size, transparency, and the like of the view, the description of the end interface may further include a theme (style). The description of the end interface may be an increment compared with an interface shown before the animation effect starts, for example, a wide increase in a view 1.

The description information about the step size may include a variation of a property of controls on an interface on which rendering is currently performed compared with that a property of the controls on an interface of a previous frame.

If the format of the animation interface is: a name of the animation interface (duration, a change curve, and a final interface), the animation interface may be:

```
animateTo({duration: 3000, cure: Curve. Linear}, ( )=>{
view1.Height=800
view1.Width=400
})
```

animateTo is the name of the animation interface; duration: 3000 indicates that the duration is 3000 ms; cure: Curve. Linear indicates that the curve is a linear curve; "view1.Height=800 view1.Width=400" indicates that a height and a width of the view 1 on the end interface of the animation are 800 and 400 respectively, that is, description information about an end frame of the animation.

The animation interface is one or more functions and methods provided for a system. The application developer may configure an animation effect for controls on an interface by invoking the animation interface, and configure information about the animation effect. The information about the animation effect includes the duration of the animation effect, the description information about the end frame of the animation effect, and the like.

In a process of running the application, after receiving an animation trigger event, the application may provide information about the animation effect for the system through the animation interface, and the system may generate an interface of each frame in an animation process based on the information.

In this format, an electronic device may determine an animation object based on a difference between the end interface of the animation and the interface shown before the animation starts.

It should be noted that the animation event may be registered only once with the choreographer of the UI thread.

S803: The rendering process or the rendering thread of the application updates a render tree based on the end interface of the animation effect and the duration of the animation effect, and generates a bitmap based on an updated render tree.

After determining the end interface of the animation effect and the duration of the animation effect, the UI thread may transfer the end interface of the animation effect and the duration of the animation effect to the rendering process or the rendering thread of the application. In this case, the rendering process or the rendering thread of the application may determine a property of a view on the interface of each frame in the duration of the animation effect, and may directly update the render tree and generate the bitmap based on an updated render tree.

In a process of generating an interface of one frame, the rendering process or the rendering thread of the application needs to determine a number of a current frame in the animation effect, and further determines a property of a view on the interface of the frame. The rendering process or the rendering thread of the application may determine, in a plurality of manners such as using a quantity of received vertical synchronization signals, a moment of the vertical synchronization signal, and the like, the number of the current frame in the animation effect. This is not limited herein. The number of the current frame in the animation effect may also be referred to as a rank of the frame in the animation effect. In other words, description information about the frame includes the property of the view on the interface of the frame.

An interface to be displayed by the application is formed by nesting a plurality of views, and different views have a parent-child relationship. Therefore, a parent-child relationship between rendering nodes generated by traversing a render tree of a view is the same as a parent-child relationship of the view. In other words, a parent-child relationship between views determines a nesting relationship between different rendering nodes, so that the rendering thread can correctly render the application interface when generating the bitmap based on the render tree.

One view may correspond to one or more rendering nodes. A root view (DecorView) corresponds to a root rendering node (Root Render Node). In other words, a nesting relationship between rendering nodes corresponds to the parent-child relationship of the view.

For example, a structure of the application interface is as follows: A root view is carried on PhoneWindow of the application, sub-views of the root view are the view 1 and a view 2, and a sub-view of the view 2 is a view 3. In this case, a structure of the render tree generated by the UI thread of the application is: a root rendering node corresponding to PhoneWindow is a root node of the render tree, a child node of the root rendering node is a rendering node 0 corresponding to the root view, a child node of the rendering node 0 is a rendering node 1 corresponding to the view 1 and a rendering node 2 corresponding to the view 2, and a child node of the rendering node 2 is a rendering node 3 corresponding to the view 3. A correspondence between a view and a rendering node means that the rendering node includes all drawing operations performed on the corresponding view. One view may correspond to one or more rendering nodes.

Figure 9:
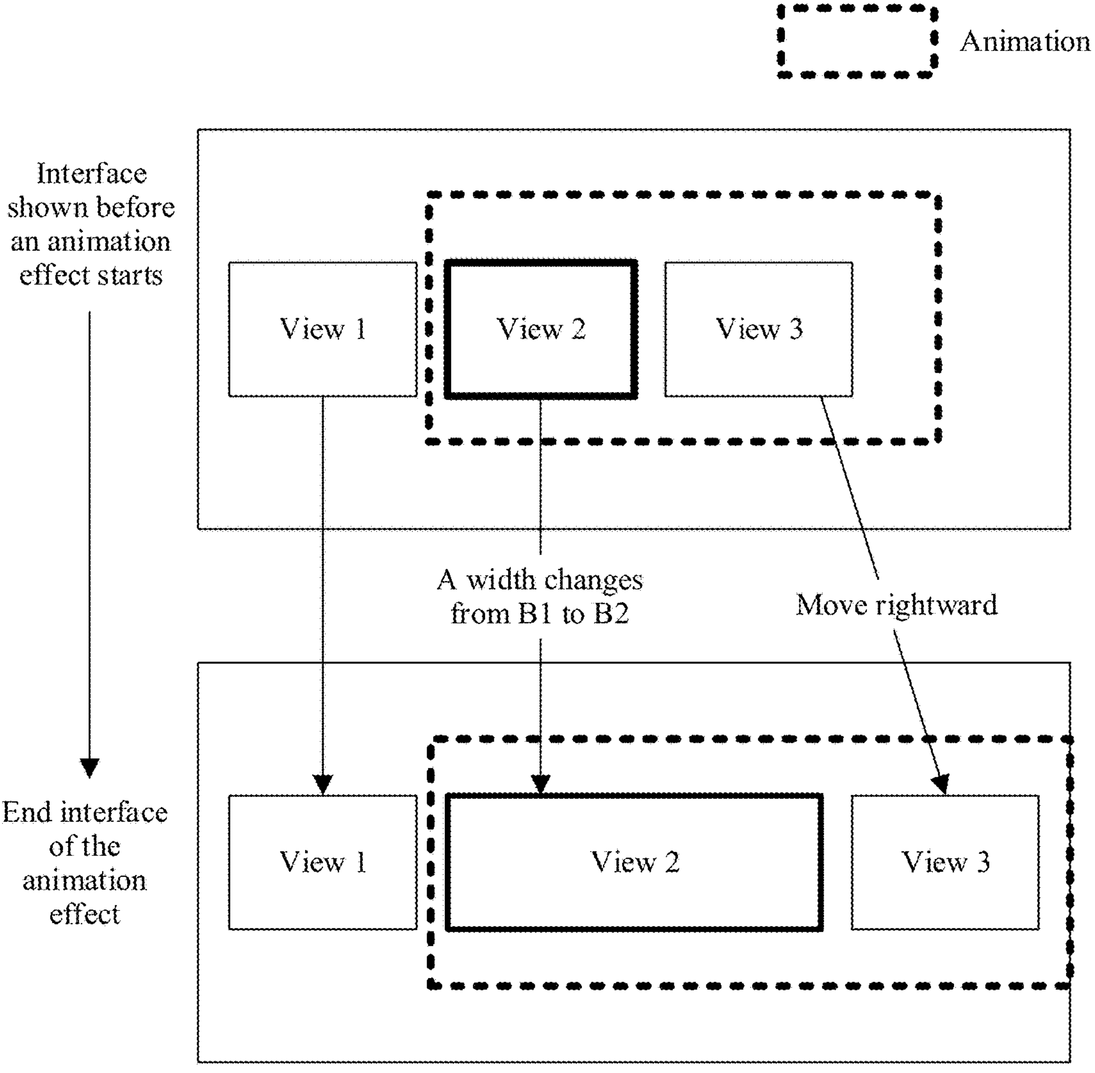
FIG. 9 is a schematic diagram of an example of determining an animation object according to an embodiment of this application.
Figure 10:
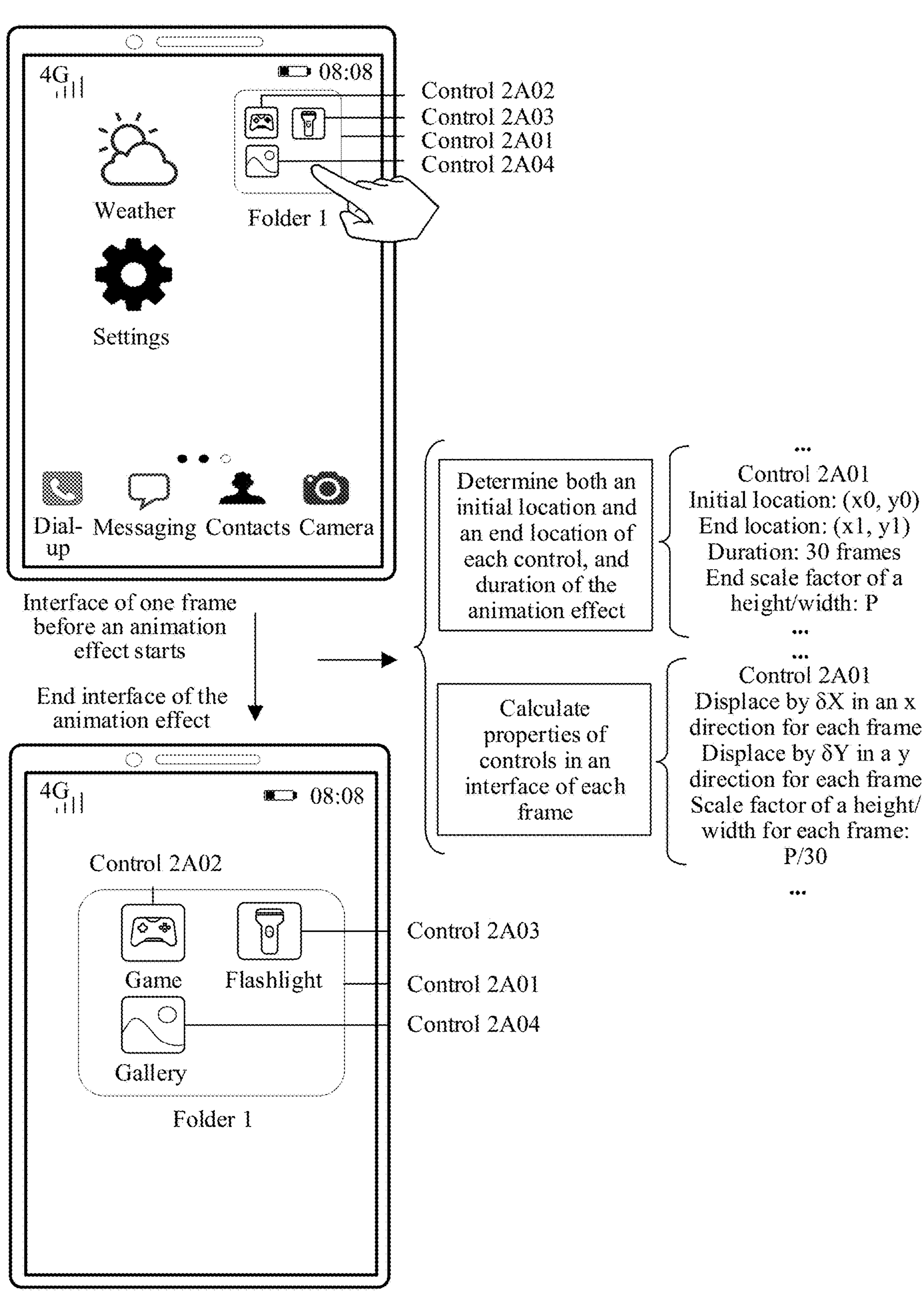
FIG. 10 is a schematic diagram of an example of determining a property of a view on an interface of each frame according to an embodiment of this application.

With reference to content shown in FIG. 9 and FIG. 10, the following describes a method for determining the property of the view on the interface of each frame in the duration of the animation effect by using examples. A property of a view on an interface of one frame may also be referred to as description information about the interface of one frame.

FIG. 9 is a schematic diagram of an example of determining an animation object according to an embodiment of this application.

As shown in FIG. 9, an application interface includes a view 1, a view 2, and a view 3, and a horizontal (a width direction of a view is horizontal) spacing between the view 1, the view 2, and the view 3 is fixed.

When the view 2 is configured with an animation effect of changing a width from B1 to B2, where B2 is greater than B1 and greater than 0. Clearly, the view 2 is an animation object of a non-implicit animation. However, an interface shown before the animation effect starts is compared with an end interface of the animation effect, and a location of the view 3 changes because a width change of the view 2. Therefore, in the method shown in FIG. 3, after modifying the property of the view based on logic of the non-implicit animation, the UI thread of the application needs to perform measurement, layout, and drawing and recording, to ensure correctness of the interface after the animation.

Clearly, compared with the methods shown in FIG. 4A, FIG. 4B and FIG. 8, in the method in FIG. 9, because properties of the view 2 and the view 3 change, it may be determined that animation objects are the view 2 and the view 3.

Optionally, in some embodiments of this application, the animation object may change only on an intermediate interface of the animation effect, and does not change on the end interface of the animation or the interface shown before the animation starts. A UI thread of an application may determine, by adjusting time information of a vertical synchronization signal, that a set of changed views of each frame in an animation process is the animation object.

FIG. 10 is a schematic diagram of an example of determining a property of a view on an interface of each frame according to an embodiment of this application.

As shown in FIG. 10, an animation event is an implicit animation, and there are the interface shown before the animation starts and the end interface of the animation. A main thread and the rendering thread of the application, or the rendering process may compare the interface shown before the animation starts with the end interface of the animation, to determine that changed controls are animation objects related to the animation. For example, the animation objects include a control 2A01.

A location of the control 2A01 changes from (x0, y0) to (x1, y1), that is, the control 2A01 is an animation object related to the animation event. In addition, a height/width of the control 2A01 is changed to S times that of an original height/width, and animation duration is 30 frames. Further, a location and a size of the control 2A01 on an interface of each frame may be further determined. A $Q^{th}$ frame (Q is calculated from the interface shown before the animation starts) of the control 2A01 is (x0+Q*δX, y0+Q*δY), where δX=(x1−x0)/30, and δY=(y1−y0)/30.

A value of an animation parameter of each frame is (x0+Q*δX, y0+Q*δY). Description information about a step size of the animation parameter may be δX=(x1−x0)/30 and δY=(y1−y0)/30. To be specific, the animation parameter is information that is used to determine a property of a view on an interface of one frame in an animation effect, for example, the foregoing description information about the end interface of the animation effect and the foregoing description information about duration of the animation effect, or the like. Alternatively, the animation parameter is information about a property of a view on an interface of one frame in an animation effect.

In the following, for ease of description, the animation parameter is used to represent the property of the view on the interface of one frame or is used to determine the property of the view on the interface of one frame. In other words, the animation parameter represents description information about the interface of one frame, or the animation parameter is a parameter used to determine description information about the interface of one frame.

The foregoing describes a process of determining the animation parameter in a single animation event. The following mainly describes a process of determining an animation parameter in a plurality of animation events.

Optionally, in some embodiments of this application, if the animation parameter of the animation object is modified by the plurality of animation events, vector superposition is performed based on an animation parameter independently determined by each animation event, to determine a final animation parameter used to update a render tree in step S1002.

Optionally, in some embodiments of this application, if the animation parameter of the animation object is modified by a plurality of animation effects, for example, if the animation parameter of the animation object is modified by an animation effect 1 and an animation effect 2 (the animation effect 2 occurs in duration of the animation effect 1), an animation effect 3 may be generated based on the animation effect 1 and an animation event 2, and a modification amount of the animation parameter is determined based on logic of the animation effect 3. The logic of the animation effect 3 is determined by logic of the animation effect 1 and the effect of the animation event 2.

The animation effect 3 modifies the animation parameter, so that a property of a view is continuous in the duration of the animation effect; or further, the animation parameter is first-order differentiable; or further, the animation parameter is second-order differentiable, or the like. Duration of the animation effect 3 may be an intersection of the duration of the animation effect 1 and duration of the animation effect 2, or may be from a start of the intersection of the animation effect 1 and the animation effect 2 to an end of the animation effect 1 or an end of the animation effect 2.

It should be noted that, because the end interface of the animation effect and an interface shown before the animation effect starts are known, a property of a view of each frame in the duration of the animation effect may be determined by using an interpolator, so that the property of the view of each frame is continuous as time changes, and is first-order differentiable and second-order differentiable.

The animation parameter may be determined by the rendering thread or the rendering process. Alternatively, the animation parameter may be determined by a UI thread, and a value of the animation parameter of each frame is transferred to the rendering thread or the rendering process. Data used to perform communication between the UI thread and the rendering thread, carry a change of the animation parameter, or carry the end interface for calculating the change of the animation parameter may be referred to as a staging render tree.

With reference to content shown in FIG. 11A to FIG. 11D, the following describes a process of determining an animation parameter in a multi-animation scenario by using an example.

FIG. 11A to FIG. 11D are schematic diagrams of an example of an animation parameter change according to an embodiment of this application.

Figure 11A:
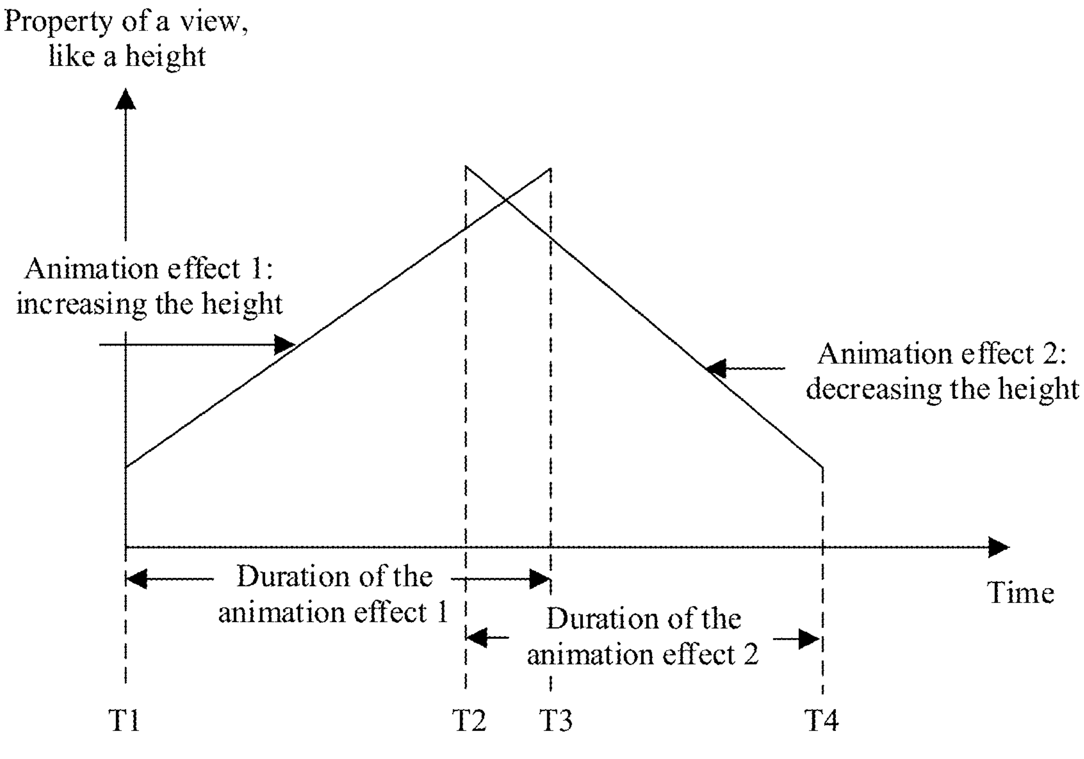
FIG. 11A to FIG. 11D are schematic diagrams of an example of an animation parameter change according to an embodiment of this application.

For content shown in FIG. 11A, refer to content shown in FIG. 7A. Details are not described herein again.

Figure 11B:
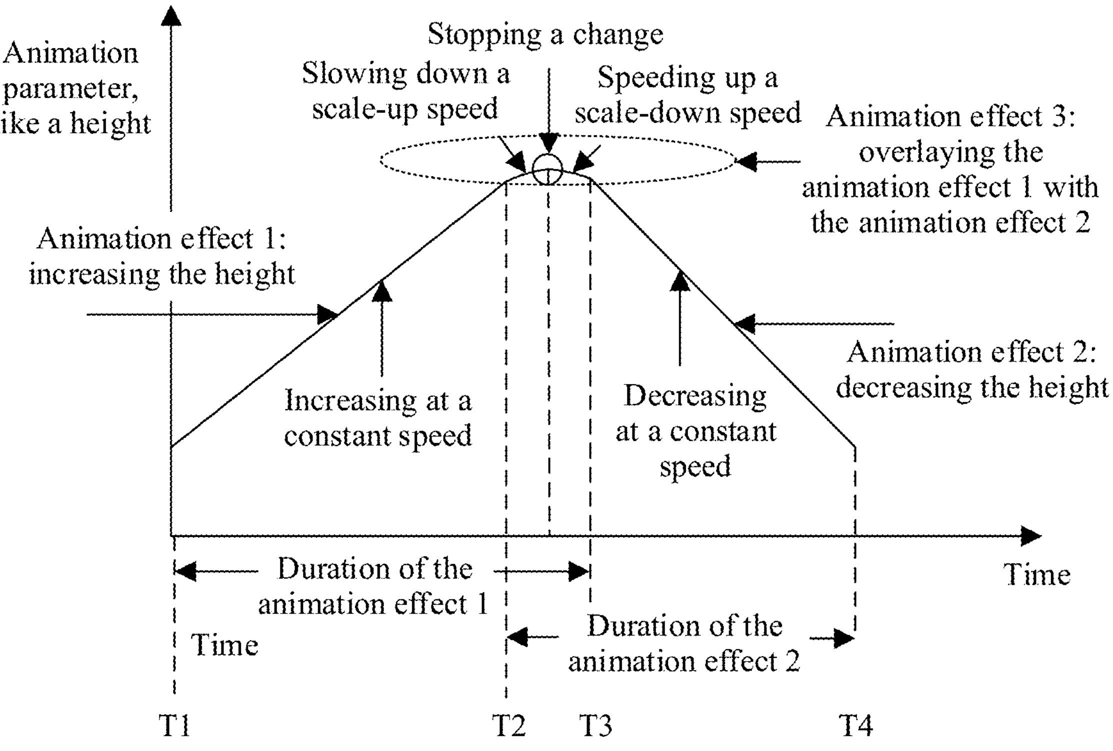

As shown in FIG. 11B, at T2, the application receives an animation trigger event corresponding to an animation effect 2, determines that the animation effect 2 involves modification of a height of a view, and then generates an animation effect 3, to smooth a transition point between the animation effect 1 and the animation effect 1.

Duration of the animation effect 3 is an intersection of duration of the animation effect 1 and duration of the animation effect 2, that is, T2 to T3. A start interface of the animation effect 3 and an end interface of the animation effect 3 are known. Therefore, the animation effect 3 is used as an animation effect that connects the animation effect 1 and the animation effect 2, and modification of a property of a view allows the property of the view to be continuous between T2 and T3, or first-order differentiable or second-order differentiable. The animation effect from T2 to T3 may be referred to as a transition process.

Figure 11C:
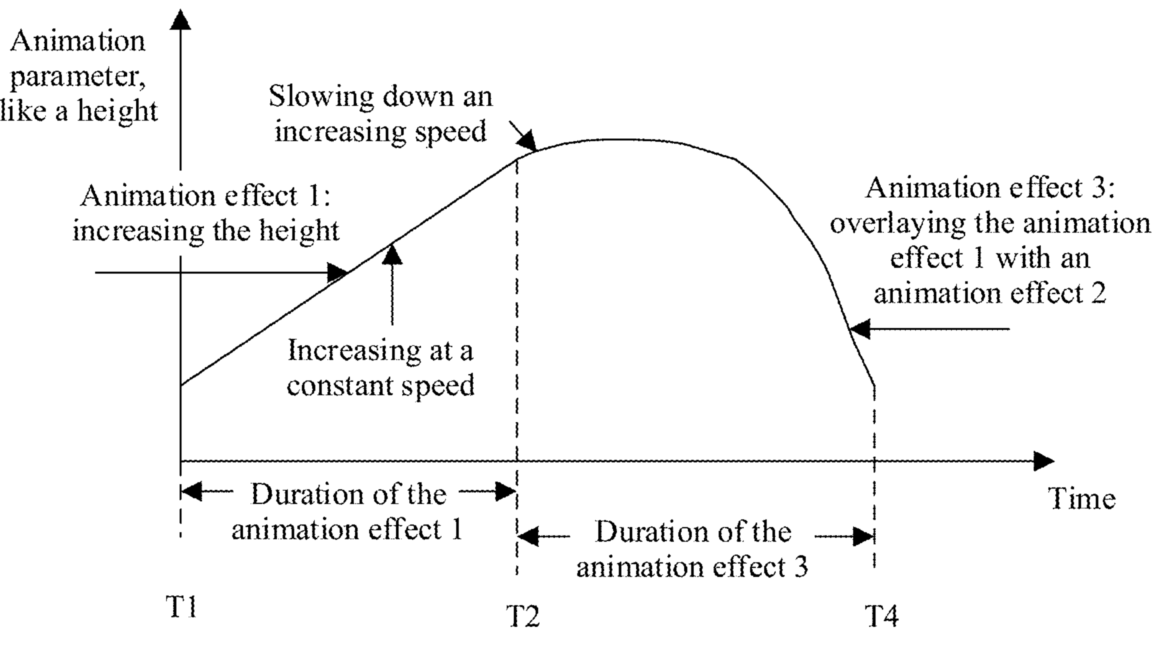

As shown in FIG. 11C, at T2, the application receives an animation trigger event corresponding to an animation effect 2, determines that the animation effect 2 involves modification of a height, and then generates an animation effect 3, to smooth a transition point between the animation 1 and the animation 2.

Duration of the animation effect 3 is T2 to T4. A start interface of the animation effect 3 is an interface corresponding to the animation effect 1 at T2, and an end interface of the animation effect 3 is an end interface of the animation effect 2. Therefore, the animation effect 3 is used as an animation effect that connects the animation effect 1 and the animation effect 2, and modification of a property of a view allows the property of the view to be continuous between T2 and T4, or first-order differentiable or second-order differentiable.

Figure 11D:
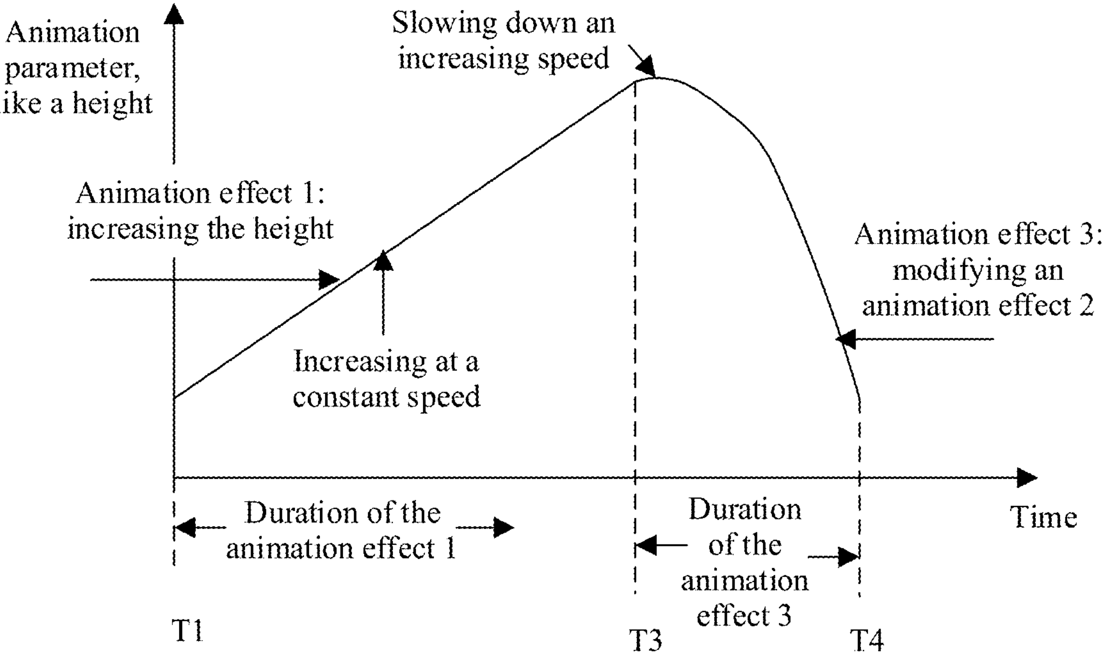

As shown in FIG. 11D, at T2, the application receives an animation trigger event corresponding to an animation effect 2, determines that the animation effect 2 involves modification of a height, and then generates an animation effect 3, to smooth a transition point between the animation 1 and the animation 2.

Duration of the animation effect 3 is T3 to T4. A start interface of the animation effect 3 is an end interface of the animation effect 1, and an end interface of the animation effect 3 is an end interface of the animation effect 2. Therefore, the animation effect 3 is used as an animation effect that connects the animation effect 1 and the animation effect 2, and modification of a property of a view allows the property of the view to be continuous between T3 and T4, or first-order differentiable or second-order differentiable.

The following describes an application interface change with reference to an animation parameter change shown in FIG. 11B. The application interface change is shown in FIG. 12A and FIG. 12B.

Figure 12A:
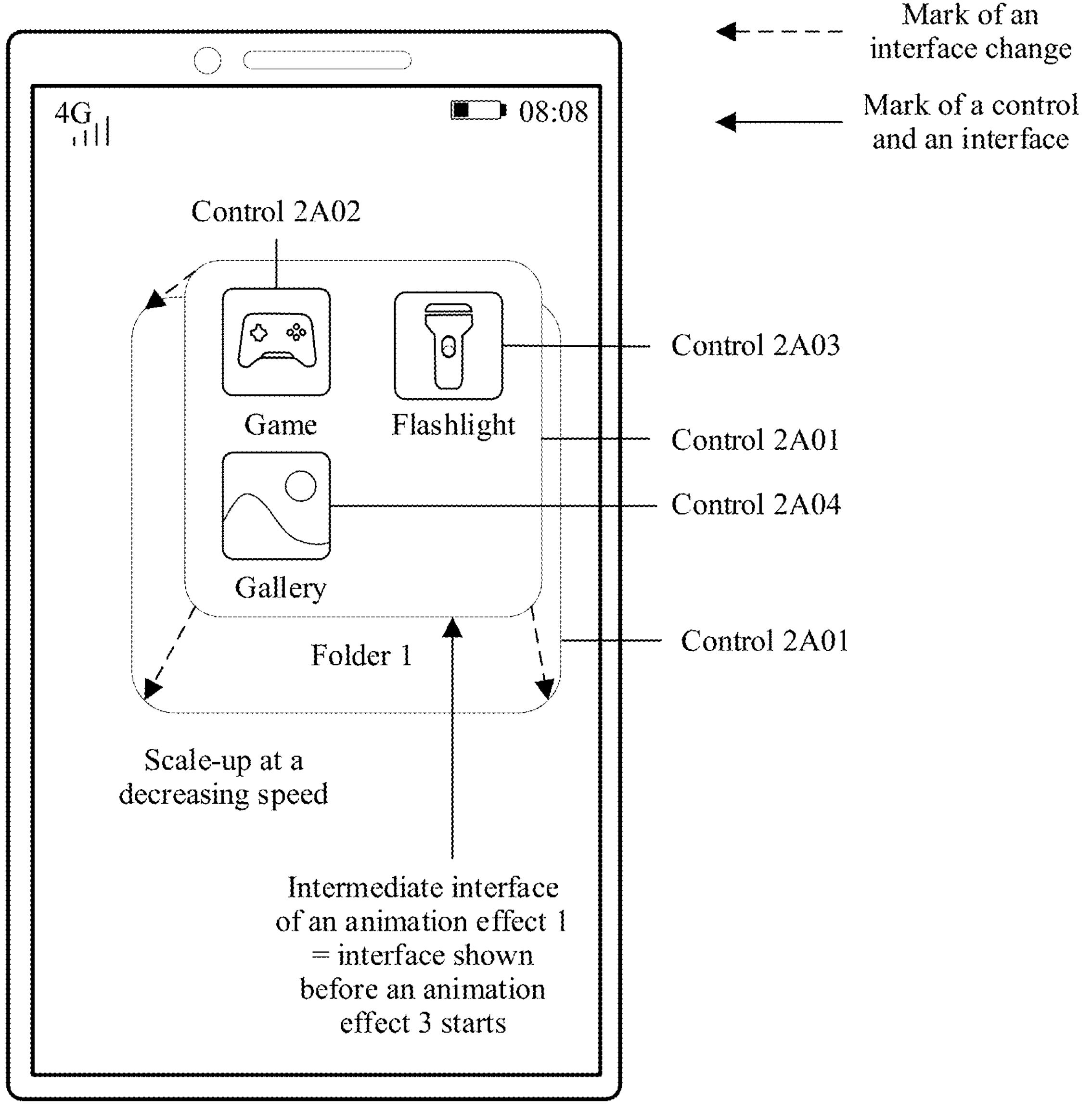
FIG. 12A and FIG. 12B are schematic diagrams of an example of an interface change in a multi-animation scenario according to an embodiment of this application.
Figure 12B:
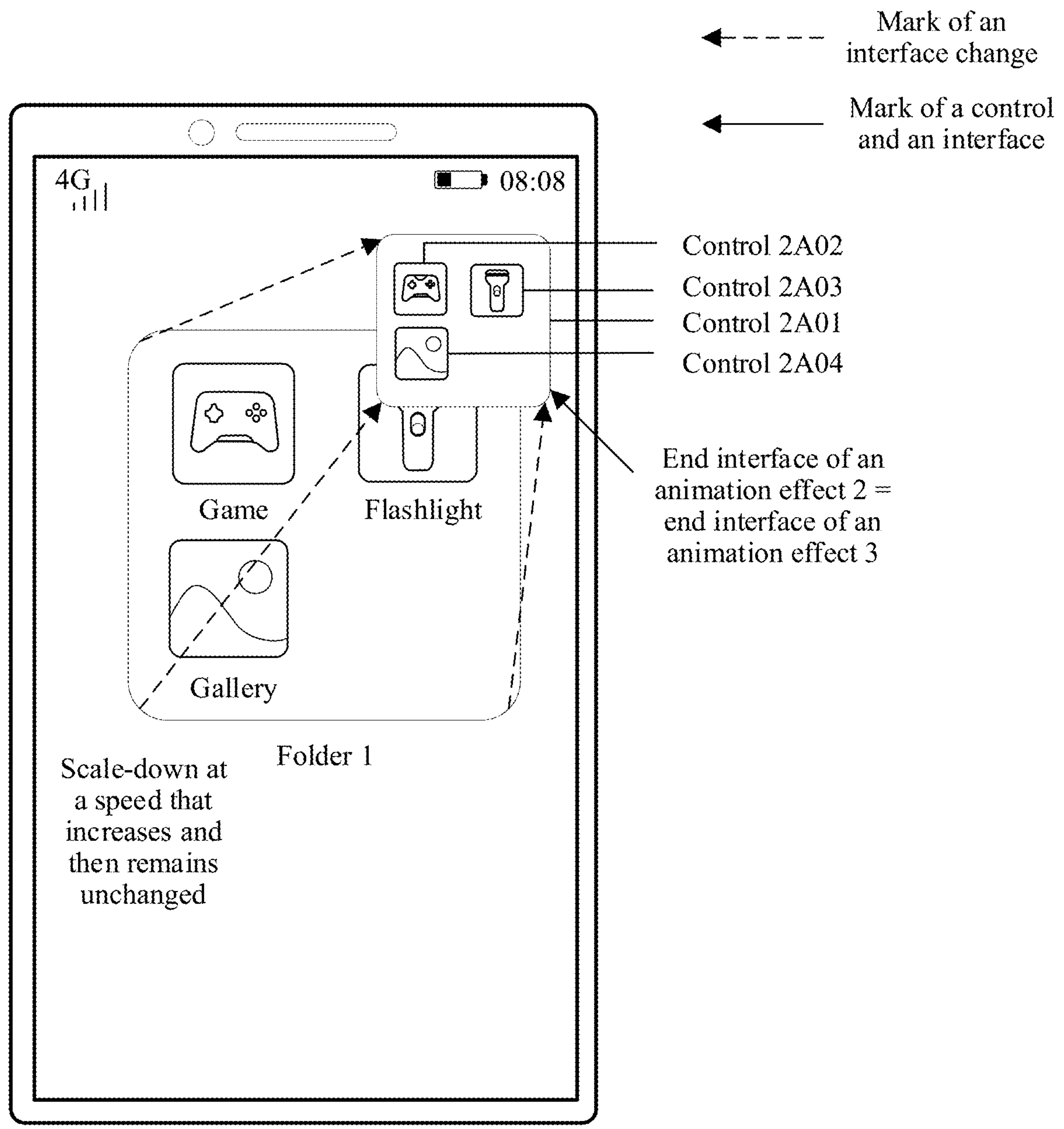

FIG. 12A and FIG. 12B are schematic diagrams of an example of an interface change in a multi-animation scenario according to an embodiment of this application.

FIG. 6A to FIG. 6D, and FIG. 12A and FIG. 12B are a group of schematic diagrams of examples of interface changes after the electronic device performs the animation effect display method according to an embodiment of this application.

FIG. 6A and FIG. 6D are correspondingly described above, and details are not described herein again.

As shown in FIG. 12A, after receiving interaction that a user taps a part that does not belong to a control 2A01 on a desktop, or interaction in another interaction manner, for example, by using a "back (back)" interaction gesture, a scale-up speed and a moving speed of the control 2A01 slow down, which corresponds to "slow down a scale-up speed" in FIG. 7B.

It should be noted that, the animation parameter is actually changed discretely. Therefore, optionally, in some embodiments of this application, "stop changing" in FIG. 7B does not occur.

After T3 and before T4, the scale-up speed of the control 2A01 slows down, and then the control 2A01 starts to be scaled down. A scale-down process of the control 2A01 is shown in FIG. 12B and "speed up a scale-down speed" in FIG. 12B, and a speed of the control 2A01 continuously increases until the speed remains unchanged.

The change of the control 2A01 may be the same as a change of a child control of the control 2A01.

A display process of "scale-up at a decreasing speed" in FIG. 12A and "scale-down at a speed that increases and then remains unchanged" in FIG. 12B are a transition process.

It may be understood that, the interface changes shown in FIG. 6A to FIG. 6D and FIG. 12A and FIG. 12B are continuous and first-order differentiable. This implements a smoother interface and improves user experience.

There are many methods for implementing step S803. The following uses step S8031, step S8032, and step S8033 as an example to describe an embodiment of implementing step S803.

S8031: The UI thread of the application performs measurement, layout, and drawing and recording on the end interface of the animation effect, and generates a first render tree.

The UI thread of the application performs measurement, layout, and drawing and recording on the end interface of the animation effect, and generates the first render tree. An interface corresponding to the first render tree is the end interface.

S8032: The rendering process, the UI thread of the application, or the rendering thread of the application determines an animation parameter corresponding to the interface of each frame in the duration of the animation effect based on the end interface of the animation effect and the duration of the animation effect.

The rendering process, the UI thread of the application, or the rendering thread of the application determines an animation parameter of the render tree corresponding to the interface of each frame in the duration of the animation effect based on the end interface of the animation effect, the duration of the animation effect, and start time of the animation effect. The animation parameter may be located in a rendering property of the render tree, and the animation parameter is used to modify a display manner of the view on the interface.

Optionally, in some embodiments of this application, the animation parameter may replace the animation effect that can be implemented only by modifying a drawing instruction list. In this case, the drawing instruction list does not need to be changed in the duration of the animation effect, and the UI thread does not need to perform measurement, layout, and drawing and recording to update the render tree.

Added animation parameters include: a width (BOUDS_WIDTH), a height (BOUNDS_HEIGHT), a location (BOUNDS_POSITION), a pivot (PIVOT), a rounded corner (Roundcorner), 2D transformation (TRANSLATE), 3D transformation (ROTATION_3D), Z coordinates (POSITION_Z), a background color (BACKGROUND_COLOR), a foreground color (FOREGROUND_COLOR), a border color (BORDER_COLOR), a border width (BORDER_WIDTH), transparency (ALPHA), a content rectangle (FRAME_WIDTH and FRAME_HEIGHT), a content-adaptive mode (Gravity), a background filter (BACKGROUND_FILTER), a content filter (CONTENT_FILTER), and a background and content filter (Filter), a shadow color (SHADOW_COLOR), shadow offset (SHADOW_OFFSET_X and SHADOW_OFFSET_Y), shadow transparency (SHADOW_ALPHA), a shadow radius (SHADOW_RADIUS), a shadow path (SHADOW_PATH), and a mask (MASK).

Optionally, in some embodiments of this application, step S8032 may be performed by the UI thread.

The animation parameter is located in the rendering property of the render tree, and directly affects the display manner of the view on the interface. Therefore, the animation parameter may be continuous, or first-order differentiable or second-order differentiable, so that the property of the view is continuous, or first-order differentiable, or second-order differentiable in the animation process. For determining the animation parameters, refer to the foregoing text descriptions corresponding to FIG. 9 and FIG. 10. Details are not described herein again.

The interface can be changed by modifying the animation parameter, and the UI thread of the application does not need to perform measurement, layout, and drawing and recording. Therefore, in the animation process, the UI thread of the application may not process an animation-related operation, for example, processing the animation event, updating the property of the view, and performing measurement, layout, and drawing and recording. For division of work between the UI thread and the rendering thread or the rendering process, refer to content of a procedure of determining data of the animation parameter in the following (a). Details are not described herein again.

In the animation process, the UI thread of the application and the rendering thread are independent of each other in the animation implementation process. Therefore, after receiving the vertical synchronization (Vsync-APP) signal, the UI thread of the application notifies the rendering thread to update the animation parameter; or the rendering process independently requests a vertical synchronization (Vsync-Render) signal, where a frequency of the vertical synchronization (Vsync-Render) signal may be different from a frequency of the vertical synchronization (Vsync-APP) signal, or the like. For an occasion at which the rendering thread or the rendering process starts to update the animation parameter, refer to content of an occasion at which the rendering thread or the rendering process updates the animation parameter in the following (b). Details are not described herein again. To distinguish between vertical synchronization signals received by different threads or processes, the vertical synchronization (Vsync-APP) signal is used to represent the vertical synchronization signal received by the UI thread, and the vertical synchronization (Vsync-Render) signal is used to represent the vertical synchronization signal received by the rendering thread or the rendering process.

The following separately describes (a) occasion at which a rendering thread or a rendering process updates a render tree, and (b) modification of a drawing instruction list.

Figures 13A, 13B:
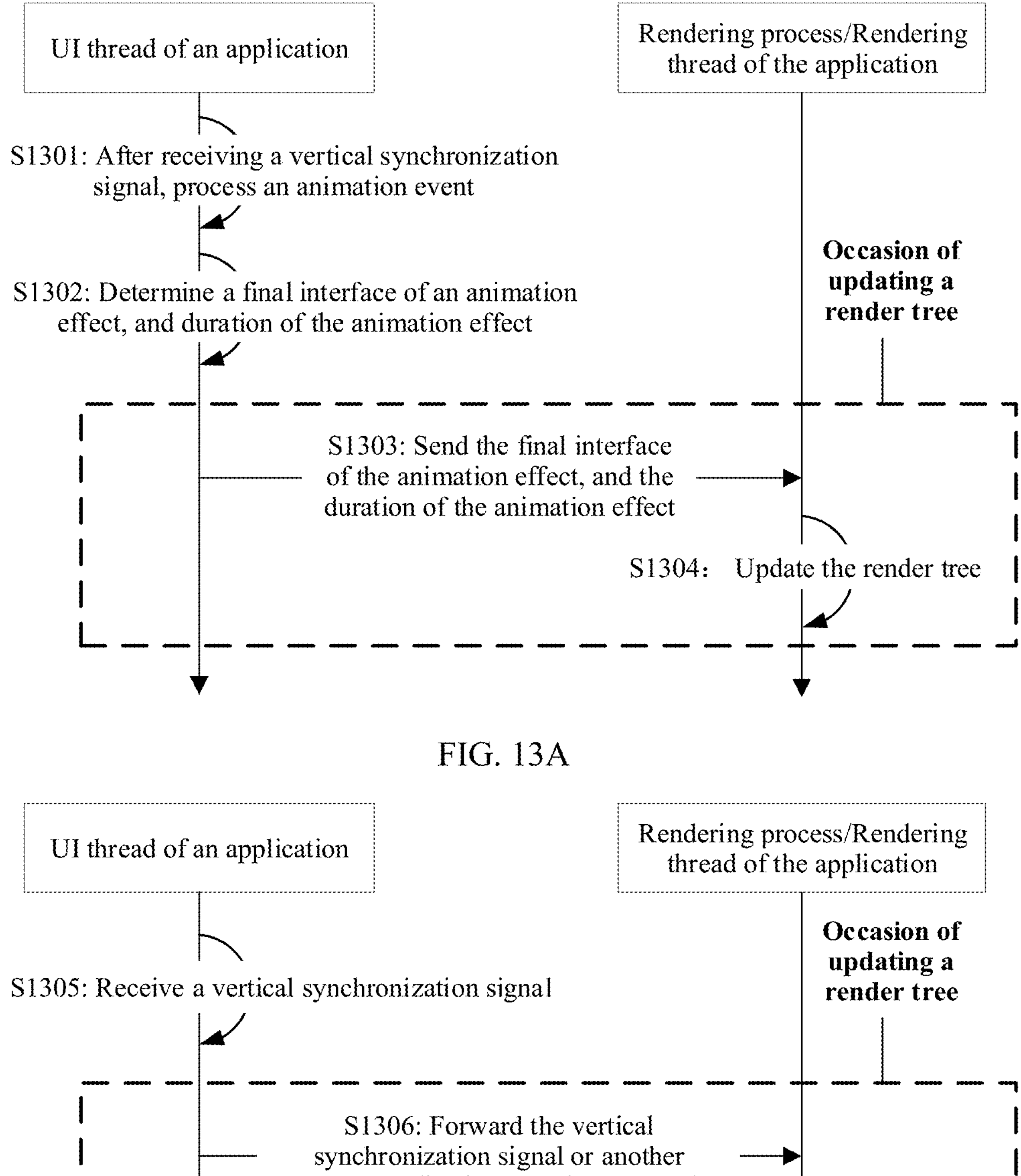
FIG. 13A, FIG. 13B, and FIG. 13C are schematic diagrams of an example of an occasion at which a rendering thread or a rendering process updates a render tree according to an embodiment of this application.
Figure 13C:
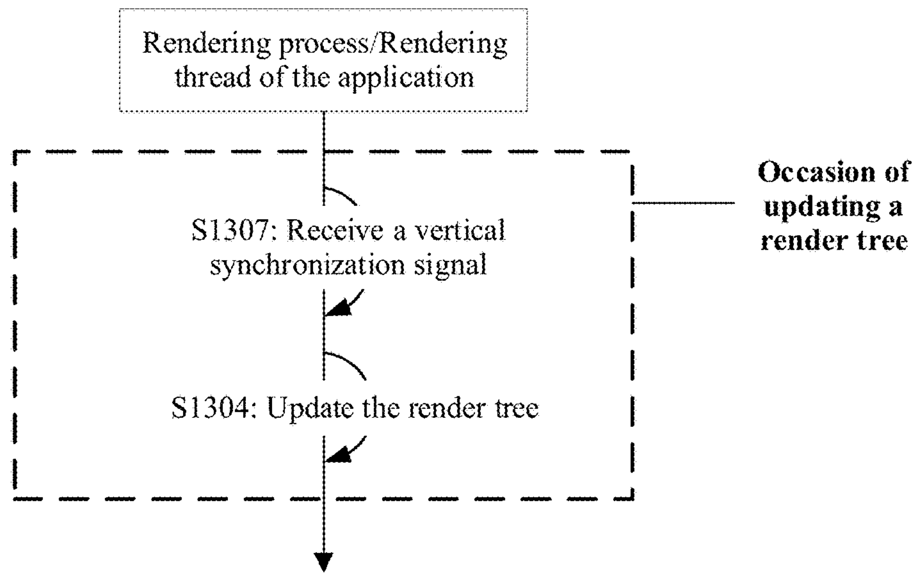

(a) Occasion at which the Rendering Thread or the Rendering Process Updates the Render Tree FIG. 13A, FIG. 13B, and FIG. 13C are schematic diagrams of an example of an occasion at which a rendering thread or a rendering process updates a render tree according to an embodiment of this application.

The occasion at which the rendering thread or the rendering process updates the render tree may be shown in FIG. 13A, FIG. 13B, and FIG. 13C.

As shown in FIG. 13A, first, the UI thread performs step S1301: after receiving a vertical synchronization (Vsync-APP) signal, processing an animation event. Then, the UI thread performs step S1302: determining the final interface of the animation effect, and the duration of the animation effect. Then, the UI thread performs step S1303: sending the final interface of the animation effect, and the duration of the animation effect. Finally, the rendering process or the rendering thread of the application performs step S1304 to update the render tree.

As shown in FIG. 13B, first, the UI thread performs step S1305: receiving a vertical synchronization (Vsync-APP) signal; then, the UI thread performs step S1306: forwarding the vertical synchronization signal or another parameter indicating a trigger occasion; and finally, the rendering process or the rendering thread of the application performs step S1304 to update the render tree.

As shown in FIG. 13C, the rendering process or the rendering thread of the application performs step S1307: receiving a vertical synchronization (Vsync-Render) signal; and then the rendering process or the rendering thread of the application performs step S1304: updating the render tree.

In a process of generating an interface of a first frame of the animation effect, the occasion at which the rendering thread or the rendering process updates the render tree may be shown in FIG. 13A. In a process of generating an interface of a non-first frame of the animation effect, the occasion at which the rendering thread or the rendering process updates the render tree may be shown in FIG. 13A, FIG. 13B, or FIG. 13C.

It should be noted that, if the UI thread of the application transfers data to the rendering process, data exchange needs to be completed through inter-process communication (InterProcess Communication, IPC). The application may implement IPC communication through Binder, AIDL, a shared memory, a socket, or the like. This is not limited herein.

Figure 14:
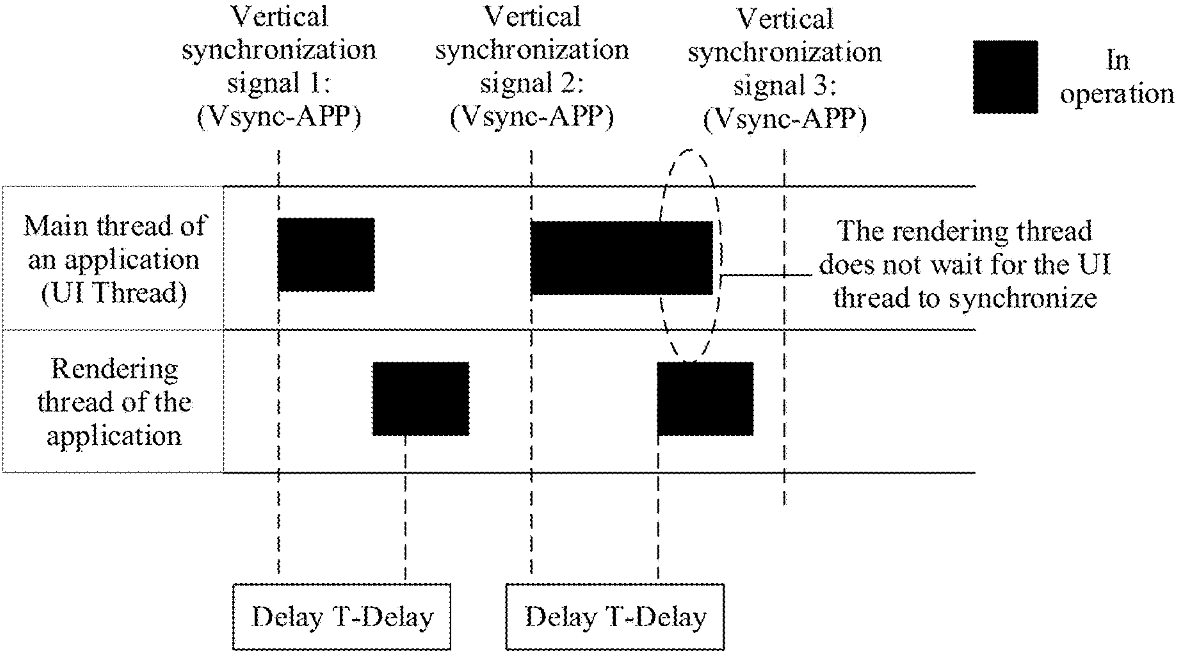
FIG. 14 is a schematic diagram of another example of an occasion at which a rendering thread updates an animation parameter according to an embodiment of this application.

FIG. 14 is a schematic diagram of another example of an occasion at which a rendering thread updates an animation parameter according to an embodiment of this application.

As shown in FIG. 14, in the animation process, the rendering thread may independently request a vertical synchronization (Vsync-APP) signal. In T-Delay of receiving the vertical synchronization (Vsync-APP) signal, the UI thread does not transfer information about updating a render tree to the rendering thread due to blocking or another reason. After the T-Delay, the rendering thread starts to update the render tree and generates an interface. In the T-Delay of receiving the vertical synchronization (Vsync-APP) signal, the UI thread processes an input event or other logic (which may not include processing an animation event), and may transfer the information about updating the render tree to the rendering thread. After receiving the information about updating the render tree, the rendering thread updates the render tree, and generates an interface.

It may be understood that one delay T-Delay is configured for the rendering thread, to help implement the animation and quickly generate an interface that is changed due to non-animation logic.

A value of the T-Delay may be less than a cycle of the vertical synchronization signal, or may be greater than or equal to a cycle of the vertical synchronization signal.

Optionally, in some embodiments of this application, the rendering thread may lag one or more vertical synchronization (Vsync-APP) signals behind the UI thread in updating the animation parameter and generating the interface. It may be understood that, in this case, when the rendering thread lags the one or more vertical synchronization (Vsync-APP) signals behind the UI thread in updating the animation parameter, a start of the animation may be delayed. However, this increases maximum processing duration for generating a single-frame interface, and helps reduce a probability of jank.

An occasion at which the rendering process updates the animation parameter is different from an occasion at which the rendering thread updates the animation parameter. The rendering process independently requests a vertical synchronization (Vsync-Render) signal. Frequencies and time of the vertical synchronization (Vsync-Render) signal and the vertical synchronization (Vsync-APP) signal may be the same or different.

(b) Modification of the Drawing Instruction List

Optionally, in some embodiments of this application, if a drawing instruction list of the interface shown before the animation effect starts is different from that of the end interface of the animation effect, from a start of the interface of the first frame of the animation effect to the end interface of the animation effect, the interface is generated by modifying an animation parameter of a render tree by using the render tree corresponding to the end interface of the animation effect as a reference. This is an animation effect process in which the drawing instruction list is not modified as the following (i).

Optionally, in some embodiments of this application, if a drawing instruction list of the interface shown before the animation effect starts is different from that of the end interface of the animation effect, from a start of the interface of the first frame of the animation effect to the end interface of the animation effect, the interface is generated by modifying an animation parameter of a render tree by using the render tree corresponding to the interface shown before the animation effect starts as a reference. This is an animation effect process in which the drawing instruction list is not modified as the following (i).

Optionally, in some embodiments of this application, if a drawing instruction list of the interface shown before the animation effect starts is different from that of the end interface of the animation effect, the rendering thread or the rendering process may modify a drawing operation in the drawing instruction list and an animation effect parameter in the render tree, to generate the interface. This is an animation effect process in which the drawing instruction list is modified as the following (ii).

In some embodiments of this application, when the application interface includes a text view (textview) or an image view (imageview), the drawing instruction list of the interface shown before the animation effect starts may be different from that of the end interface of the animation effect.

(i) Animation Effect Process in which the Drawing Instruction List is not Modified Drawing content of the end interface of the animation effect is different from that of the interface shown before the animation effect starts. As a result, the drawing instruction lists are different. In the animation effect display method provided in this embodiment of this application, a drawing instruction list of a render tree of the final interface is used as a reference, and an animation parameter is modified to update the render tree, to generate an interface, as shown in FIG. 15A and FIG. 15B.

Figure 15A:
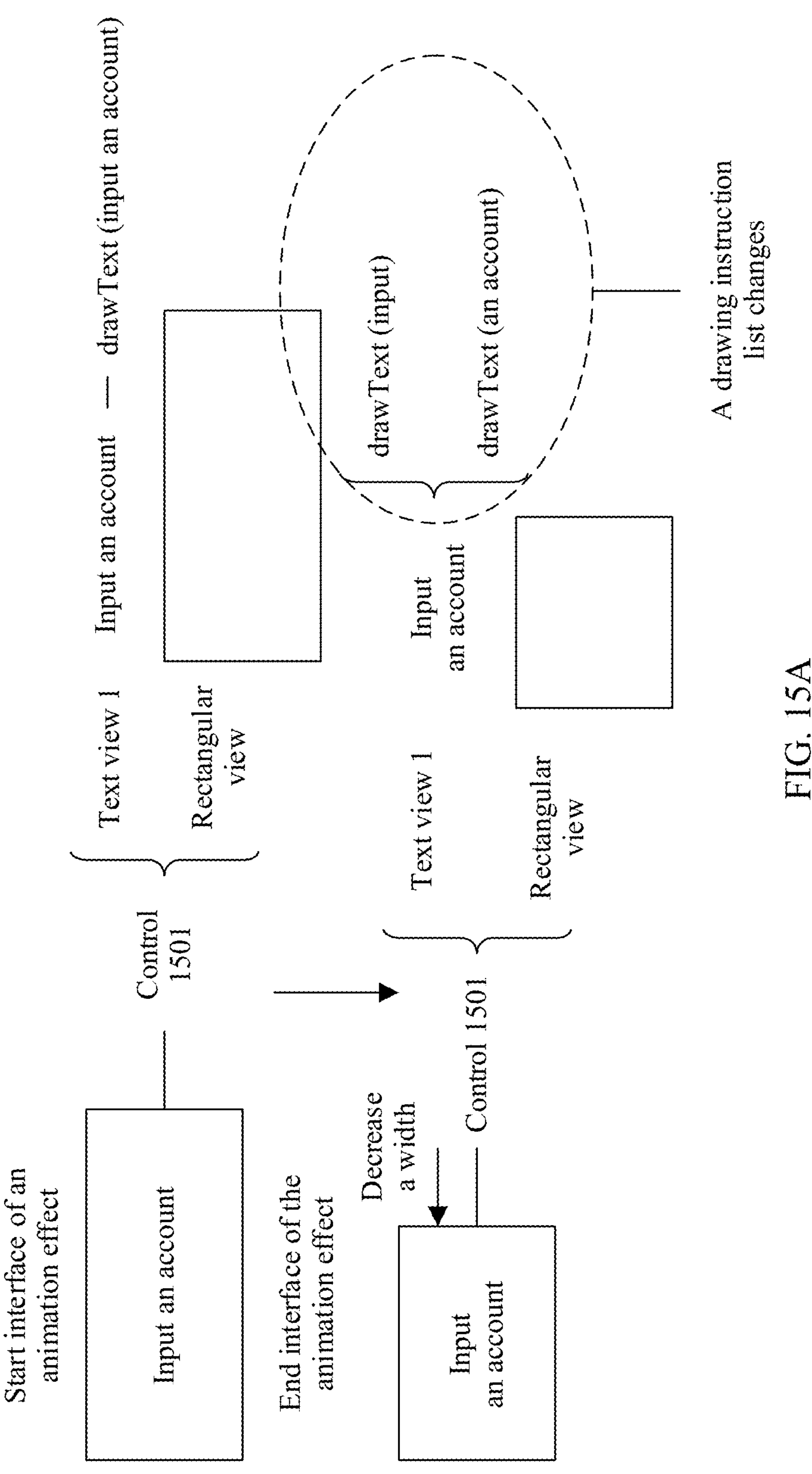
FIG. 15A and FIG. 15B are schematic diagrams of an example of an animation effect process according to an embodiment of this application.
Figure 15B:
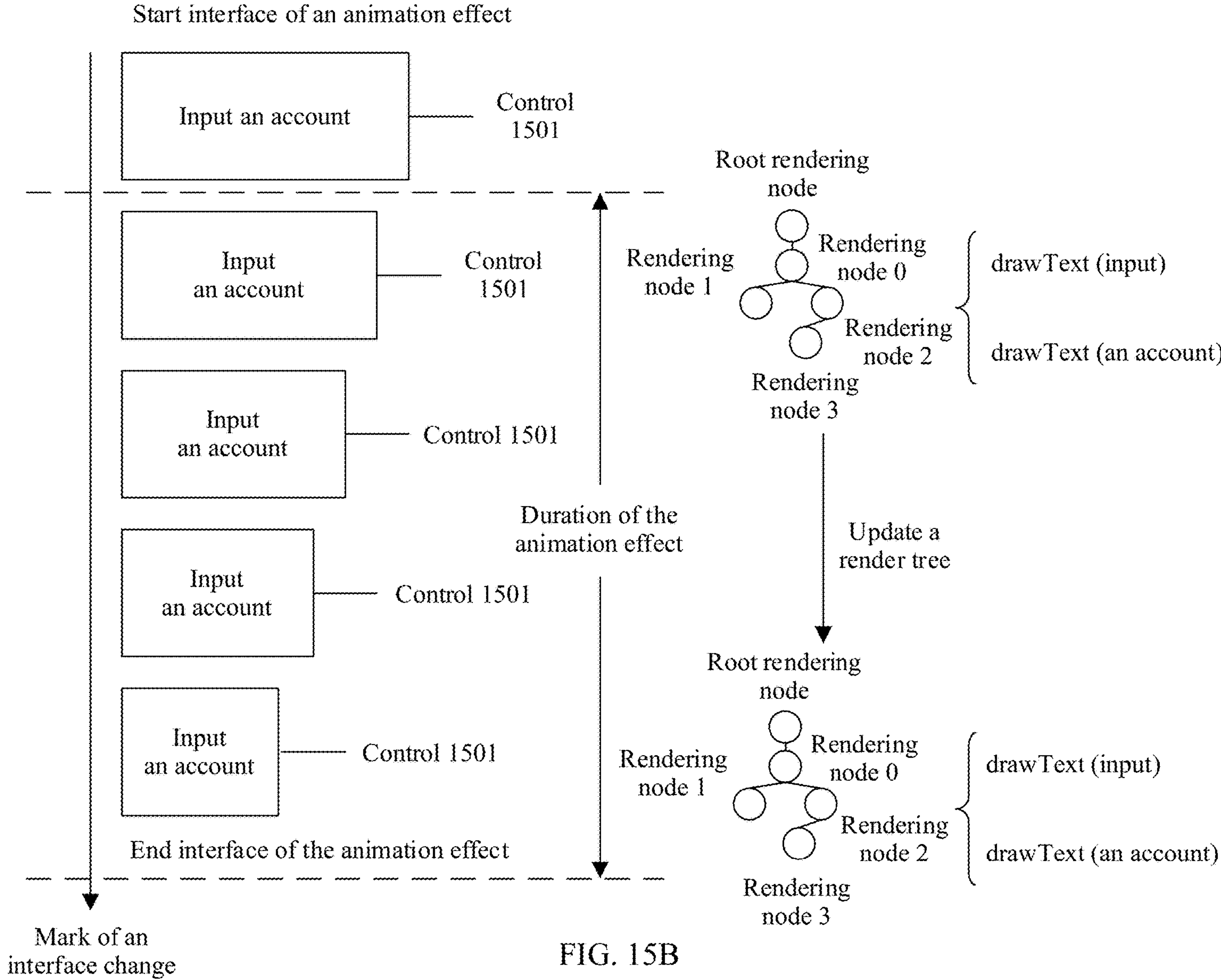

FIG. 15A and FIG. 15B are schematic diagrams of an example of an animation effect process according to an embodiment of this application.

As shown in FIG. 15A, before the animation effect starts, an interface includes a control 1501, and the control 1501 carries a text "input an account". In this case, the control may include a text view 1 and a rectangular view, the text view 1 carries the text "input an account", and a size of the text view 1 is the same as that of the control 1501.

A drawing operation corresponding to the text view 1 in the drawing instruction list is drawText (enter an account).

After the animation effect is configured for the control 1501, on the end interface of the animation effect, a width of the control 1501 becomes shorter, and a text "input an account" becomes two lines, where a first line is "input", and the second line is "an account". In other words, the control 1501 includes the text view 1, and the text view 1 carries "input" and "an account".

The drawing operation corresponding to the text view 1 in the drawing instruction list is drawText (enter) and drawText (an account).

For the drawing instruction list, the UI thread needs to perform real-time measurement, layout, and drawing and recording on the interface. Therefore, to avoid updating the drawing instruction list in the animation effect process, from the start of the interface of the first frame of the animation effect to the end interface of the animation effect, a render tree of the interface is upgraded and generated by using the render tree corresponding to the end interface as the animation effect parameter, which is specifically shown in FIG. 15B.

As shown in FIG. 15B, in the duration of the animation effect, even if the width of the control 1501 is robust to accommodate the text "input an account" in one line, "input an account" is still presented in two lines: "input" and "an account". In this case, in the duration of the animation effect, a rendering node corresponding to the control 1501 is a rendering node 2, and a drawing operation included in a drawing instruction list of the rendering node 2 is "drawText (enter) and drawText (an account)".

To be specific, in the animation effect process, the drawing instruction list does not change, the rendering thread or the rendering process modifies the animation effect parameter to generate the interface shown in FIG. 15B, the width of the control 1501 gradually decreases, and the text is always displayed in two lines.

(ii) Animation Effect Process in which the Drawing Instruction List is Modified

Drawing content of the end interface of the animation effect is different from that of the interface shown before the animation effect starts. As a result, the drawing instruction lists are different. According to the animation effect display method provided in this embodiment of this application, in a process of generating an interface, the drawing operation in the drawing instruction list is continuously modified, and the animation effect parameter is modified, to generate an interface, as shown in FIG. 16A and FIG. 16B.

FIG. 16A, FIG. 16B, FIG. 16C, FIG. 16D, and FIG. 16E are schematic diagrams of an example of an animation effect process according to an embodiment of this application.

Figure 16A:
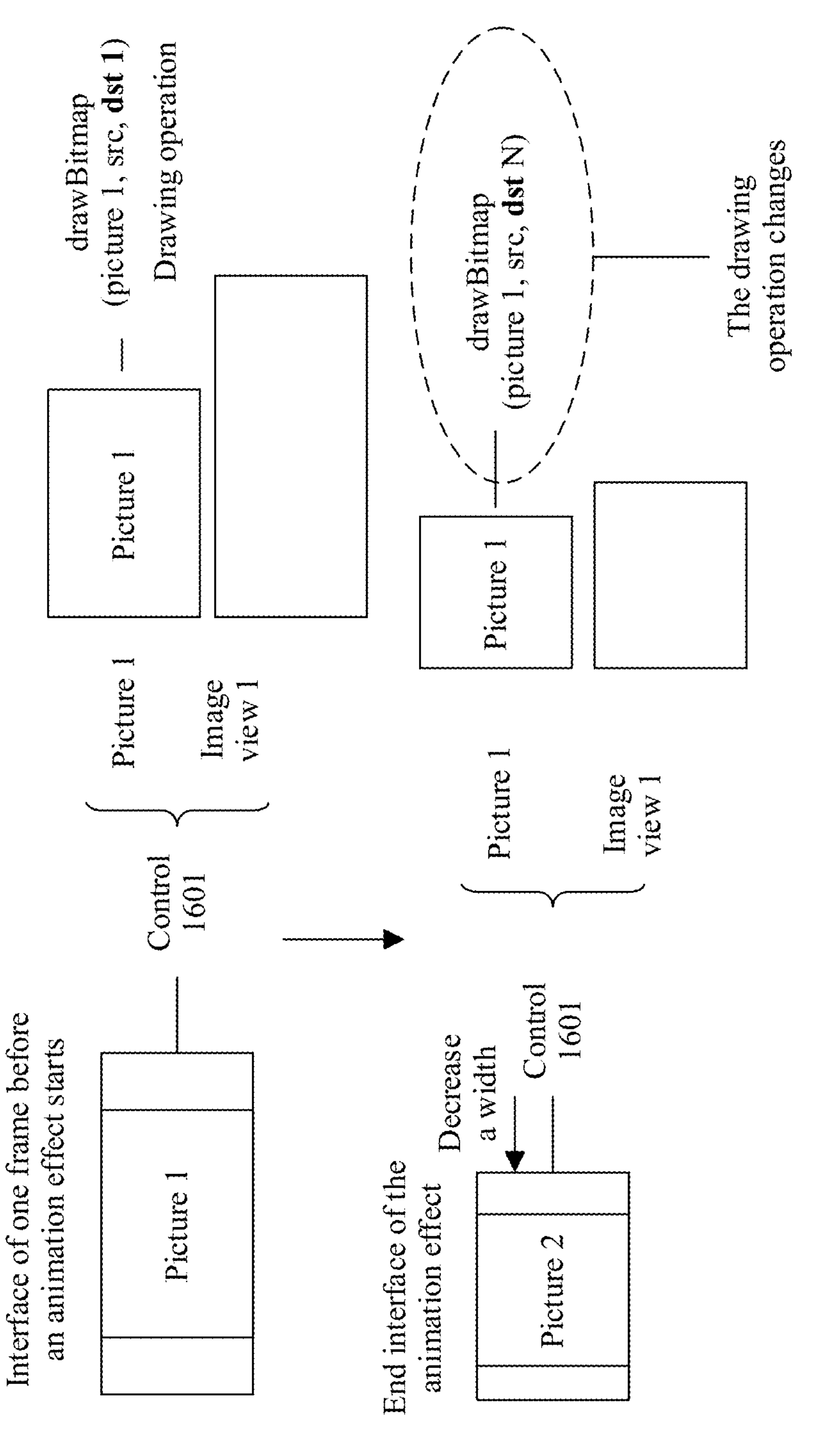
FIG. 16A, FIG. 16B, FIG. 16C, FIG. 16D, and FIG. 16E are schematic diagrams of an example of an animation effect process according to an embodiment of this application.
Figure 16B:
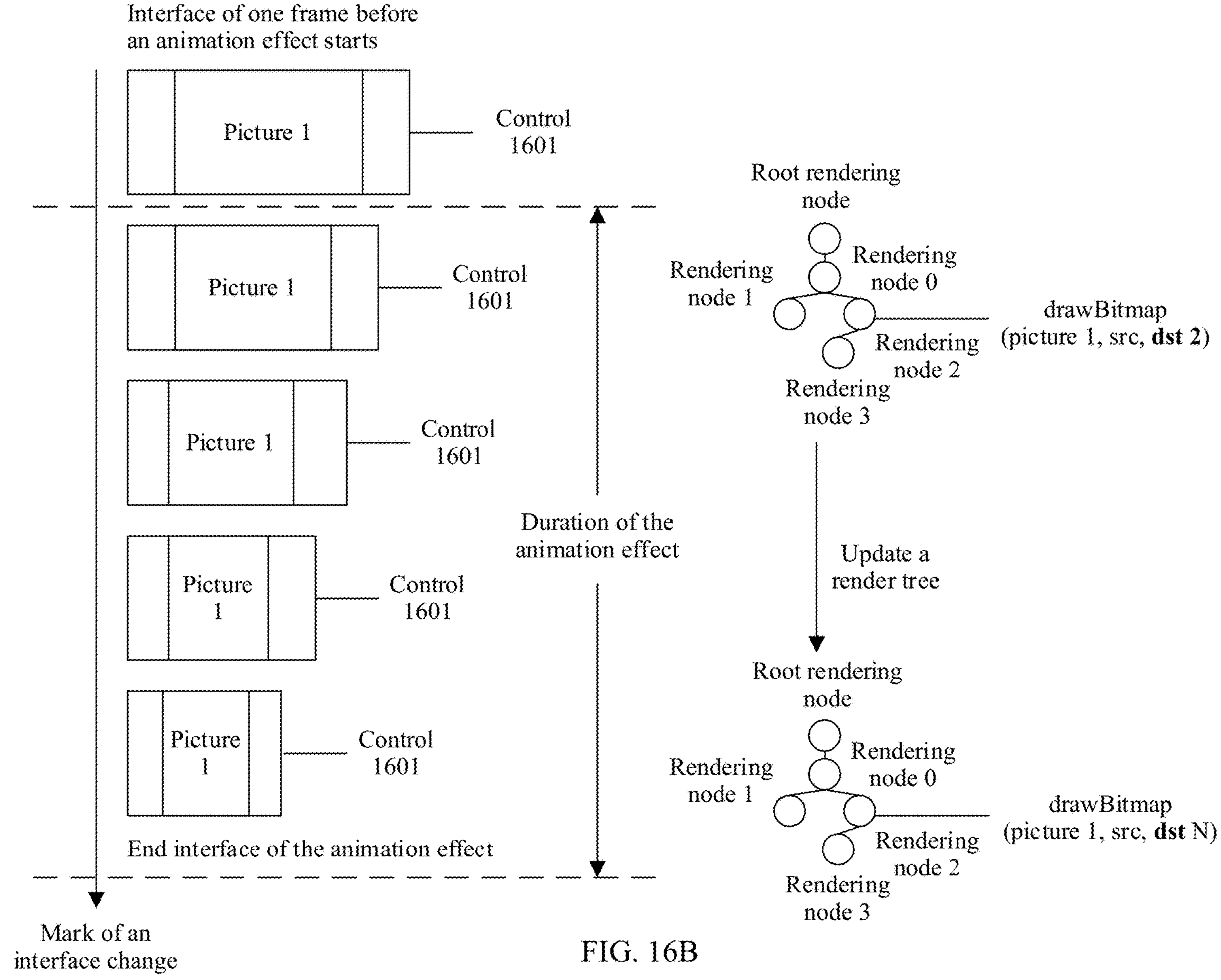

As shown in FIG. 16A, the interface shown before the animation effect starts includes a control 1601, and the control 1601 carries a picture 1. The control 1601 may be one image view.

A drawing operation that corresponds to displaying the picture 1 on the control 1601 is drawBitmap (picture 1, src, dst 1) in the drawing instruction list. The picture 1 is a source image, scr indicates an area to be displayed in the source image, and dst 1 indicates an area in which the scr in the picture 1 is drawn on the control 1601.

After the animation effect is configured for the control 1601, on the end interface of the animation effect, a width of the control 1601 decreases, and a width of an image view 1 decreases proportionally. A drawing operation corresponding to the image view 1 in the drawing instruction list is drawBitmap (picture 1, src, dst N).

For example, dst 1=Rect(10, 20, 150, 200). (10,20) indicates coordinates of an upper left corner of a rectangle; (150,100) indicates coordinates of a lower right corner of the rectangle; dst N=Rect(10, 20, 150, 100).

In the animation effect process, the rendering thread or the rendering process updates a drawing operation corresponding to the control 1601, to implement an interface shown in FIG. 16B.

As shown in FIG. 16B, in the animation effect process, the rendering thread or the rendering process modifies a drawing operation and an animation effect parameter in a render tree for each frame, so that the width of the image view 1 is continuously decreased in the animation effect process. The rendering thread or the rendering process modifies a drawing operation, for example, drawBitmap (picture 1, src, dst 2), . . . , and drawBitmap (picture 1, src, dst N).

It should be noted that, a picture processing policy affects a manner in which the rendering thread or the rendering process modifies the drawing operation. The picture processing policy may include: CENTER (a picture is displayed in a center, and the picture is cropped if a picture size exceeds a size of a view that carries the picture), CENTER_INSIDE (the picture size is adjusted based on a ratio, so that the picture is complete and displayed in a center of the view that carries the picture), FIT_CENTER (the picture size is adjusted based on the ratio, so that the picture is not greater than the size of the view that carries the picture and is displayed in the center), FIT_END (the picture size is adjusted based on the ratio, so that the picture is not greater than the size of the view carrying the picture and is displayed at a bottom), FIT_START (the picture size is adjusted based on the ratio, so that the picture is not greater than the size of the view carrying the picture and is displayed at the top), FIT_XY (the picture size is not adjusted based on the ratio, so that the picture is not greater than the size of the view carrying the picture), and the like, which are not limited herein.

CENTER, CENTER_INSIDE, FIT_CENTER, FIT_END, FIT_START and FIT_XY may be implemented by modifying parameters dst and src in the drawing operation drawBitmap.

Figure 16C:
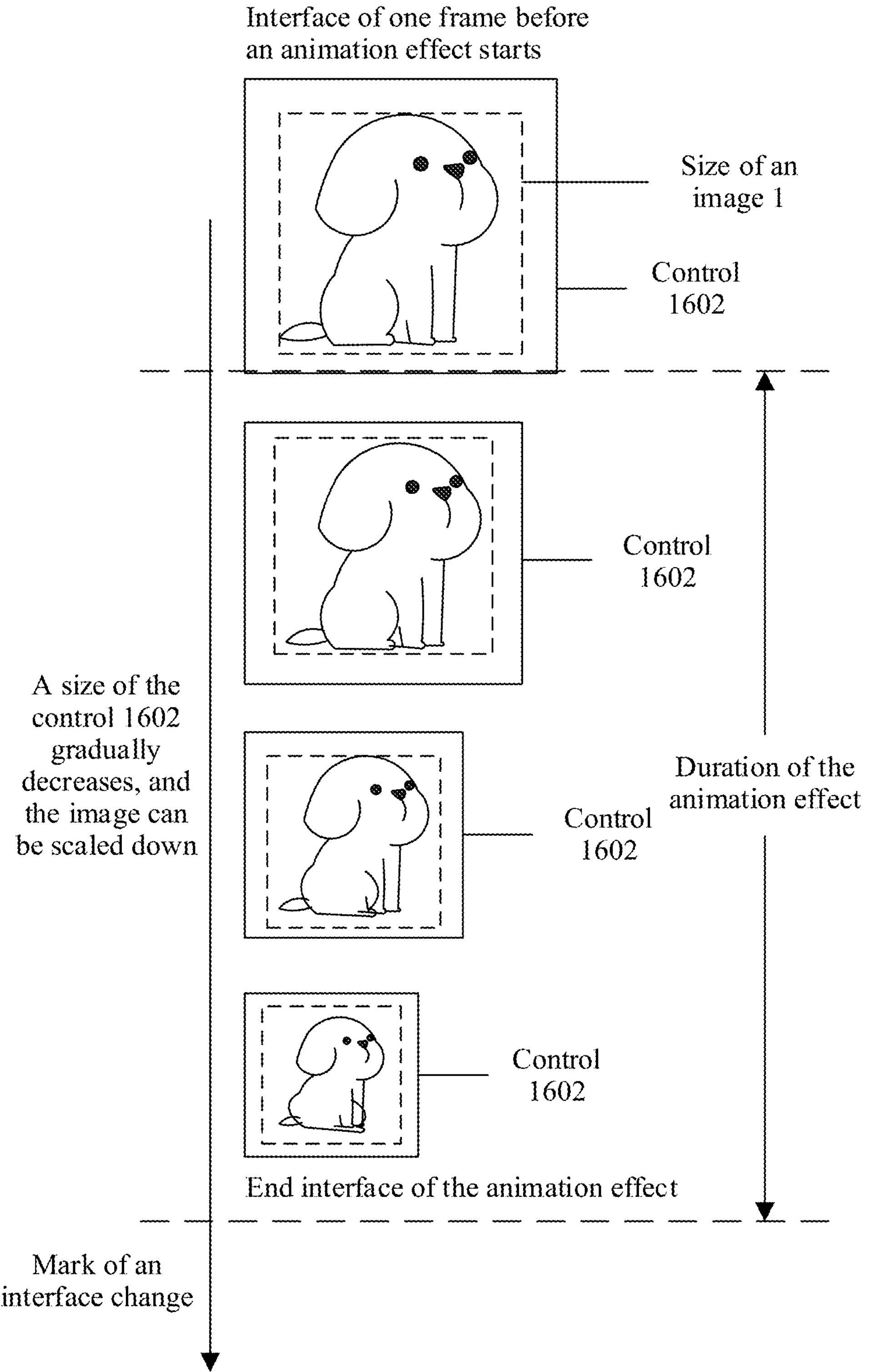
Figure 16D:
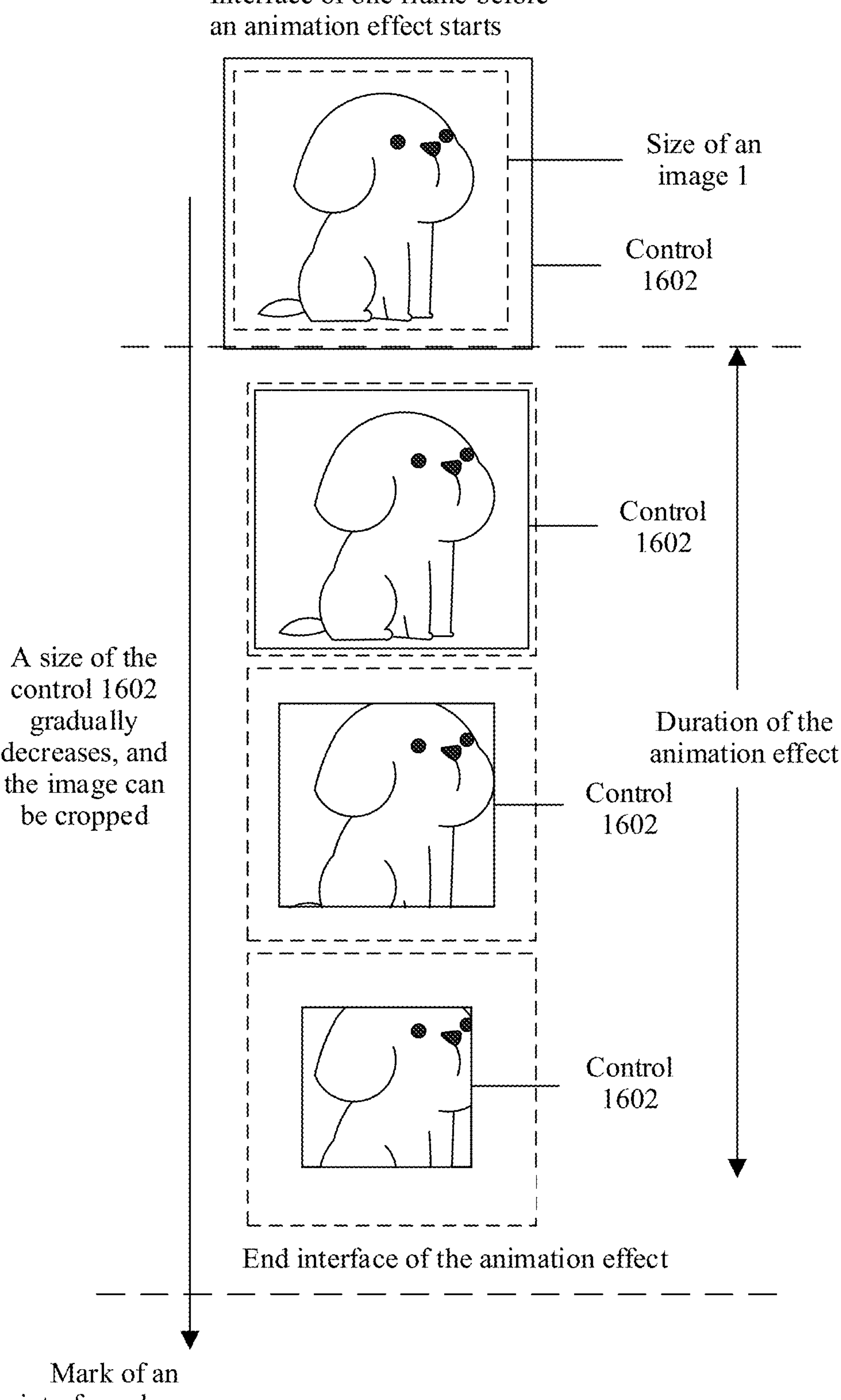

As shown in FIG. 16C and FIG. 16D, a drawing operation in the drawing instruction list is modified to scale or crop the picture carried on the control, to adapt to a size change of the control.

As shown in FIG. 16C, a control 1602 carries an image 1. When a size of the control becomes smaller, the picture may be scaled based on a change ratio of the size of the control, for example, CENTER_INSIDE in the foregoing description.

Figure 16E:
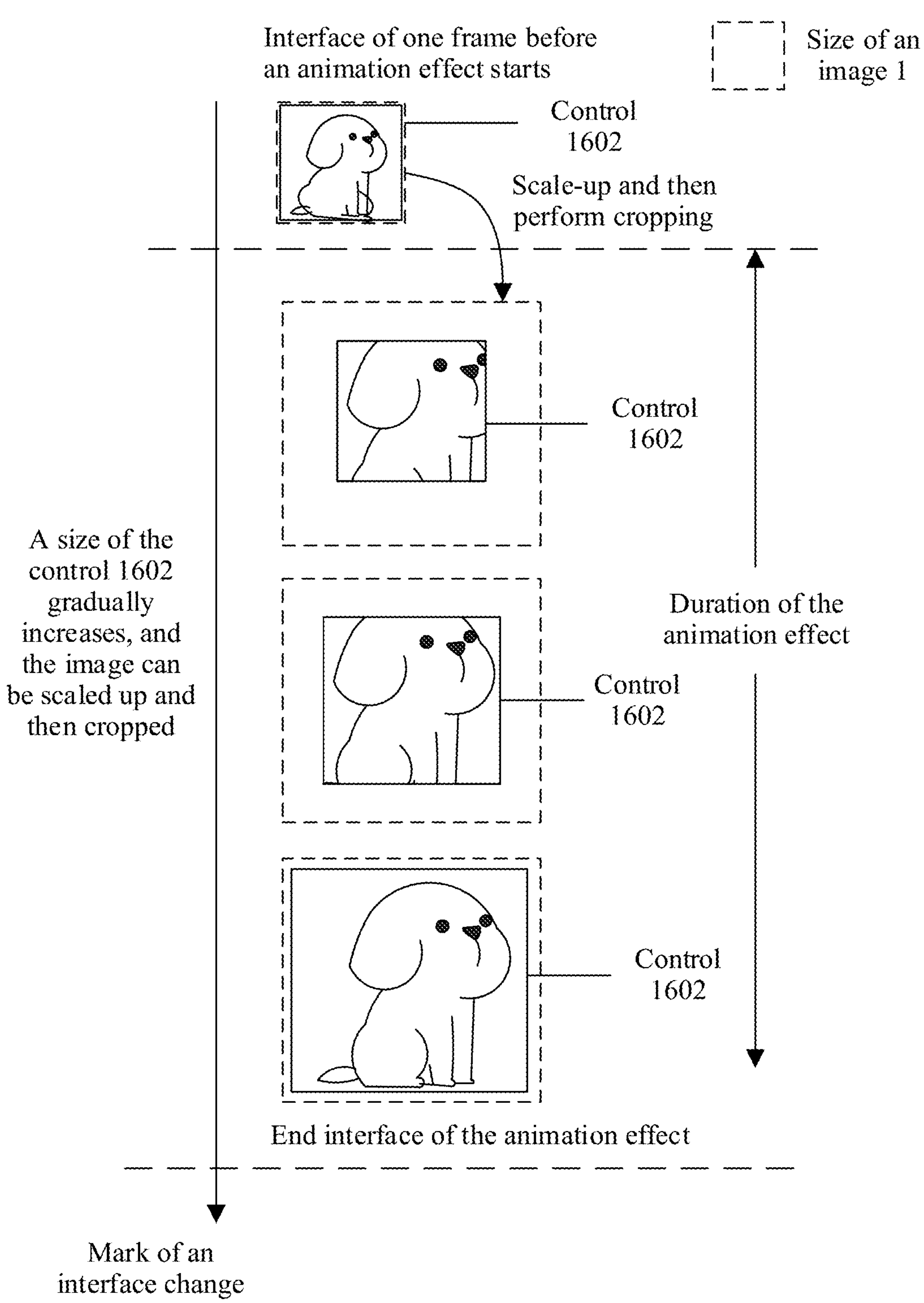

Alternatively, as shown in FIG. 16D, when a size of the control becomes smaller, the picture may be cropped based on a change ratio of the size of the control. Alternatively, as shown in FIG. 16E, when a size of the control becomes larger, the image 1 may be first scaled up to a size of the end interface of the animation effect, and then cropped based on the size of the control, to implement the animation effect shown in FIG. 16E.

In conclusion, the rendering thread or the rendering process may crop, based on the change of the size of the control, the image or other content carried in the control by modifying the drawing operation in the drawing instruction list, to implement continuous interface change.

S8033: The rendering process or the rendering thread of the application updates the render tree based on the animation parameter, and generates the bitmap based on the updated render tree.

After obtaining the render tree with an updated animation parameter, the rendering thread or the rendering process may traverse the render tree, traverse and execute drawing operations in the drawing instruction list on a canvas. In each drawing operation, the rendering thread or the rendering process may adjust, with reference to a rendering property of a rendering node, a parameter of the drawing operation or a graphics processing library call corresponding to the drawing operation, to generate the bitmap.

In some embodiments of this application, the rendering process or the rendering thread may invoke a GPU to draw and generate the bitmap. Alternatively, in some embodiments of this application, the rendering process or the rendering thread may invoke a CPU to draw and generate the bitmap.

The bitmap is obtained by the rendering process or a surface synthesizer (SurfaceFlinger), and then an interface is generated after layer composition.

S804: Optionally, the rendering process or the rendering thread of the application synchronizes a property of a view to the UI thread of the application.

After the interface is generated, the UI thread does not sense an actual location and a size of a control on the interface in the animation process. Therefore, optionally, in some embodiments of this application, the rendering thread or the rendering process may send the location and the size of the control to the UI thread of the application. The location and the size of the control may be transferred by using a data structure like a render tree, which is not limited herein.

Figure 17:
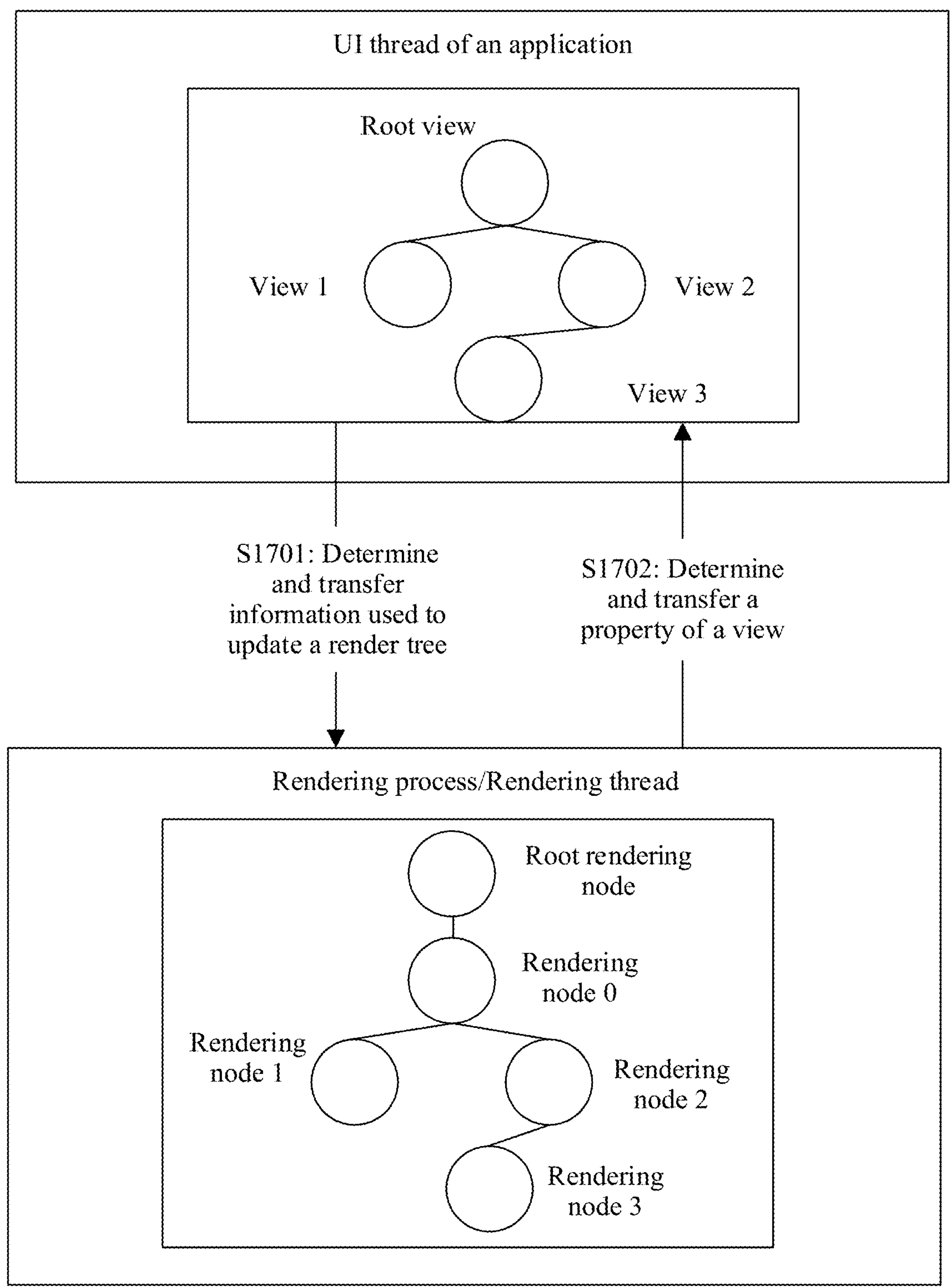
FIG. 17 is a schematic diagram of an example of determining a property of a view by using UI thread data according to an embodiment of this application.

FIG. 17 is a schematic diagram of an example of determining a property of a view by using UI thread data according to an embodiment of this application.

As shown in FIG. 17, the determining the property of the view by using the UI thread data includes the following steps.

S1701: Determine and transfer information used to update a render tree.

After determining the information used to update the render tree, the UI thread of the application may transfer, to a rendering process or a rendering thread of the application, the information used to update the render tree, for example, an animation parameter of the render tree of an interface of each frame in duration of an animation effect.

For a first frame of the animation effect, the UI thread of the application transfers, to the rendering thread or the rendering process, information used to update an animation parameter, such as duration of the animation effect, an animation object, and an end interface of the animation effect.

In a process of displaying the animation effect except the first frame of the animation, the UI thread of the application may not transfer, to the rendering thread or the rendering process, the information used to update the animation parameter.

In the process of displaying the animation effect except the first frame of the animation, the UI thread of the application may transfer, to the rendering thread or the rendering process, a render tree that is changed by an input event or logic of another UI thread (excluding an animation event).

S1702: Determine and transfer the property of the view.

In the process of displaying the animation effect, the rendering thread or the rendering process determines the property of the view, like a size and a location, based on the render tree, and transfers the size and the property of the view to the UI thread of the application, so that the UI thread of the application can determine the size and the location of the view.

Optionally, in some embodiments of this application, the rendering thread or the rendering process may transfer the location and the size of the view and another property to the UI thread of the application in response to a request of the UI thread of the application.

It may be understood that, in the process of displaying the animation effect, the UI thread of the application does not need to determine the property of the view by performing measurement, layout, and drawing. This reduces load of the UI thread of the application.

Figure 18A:
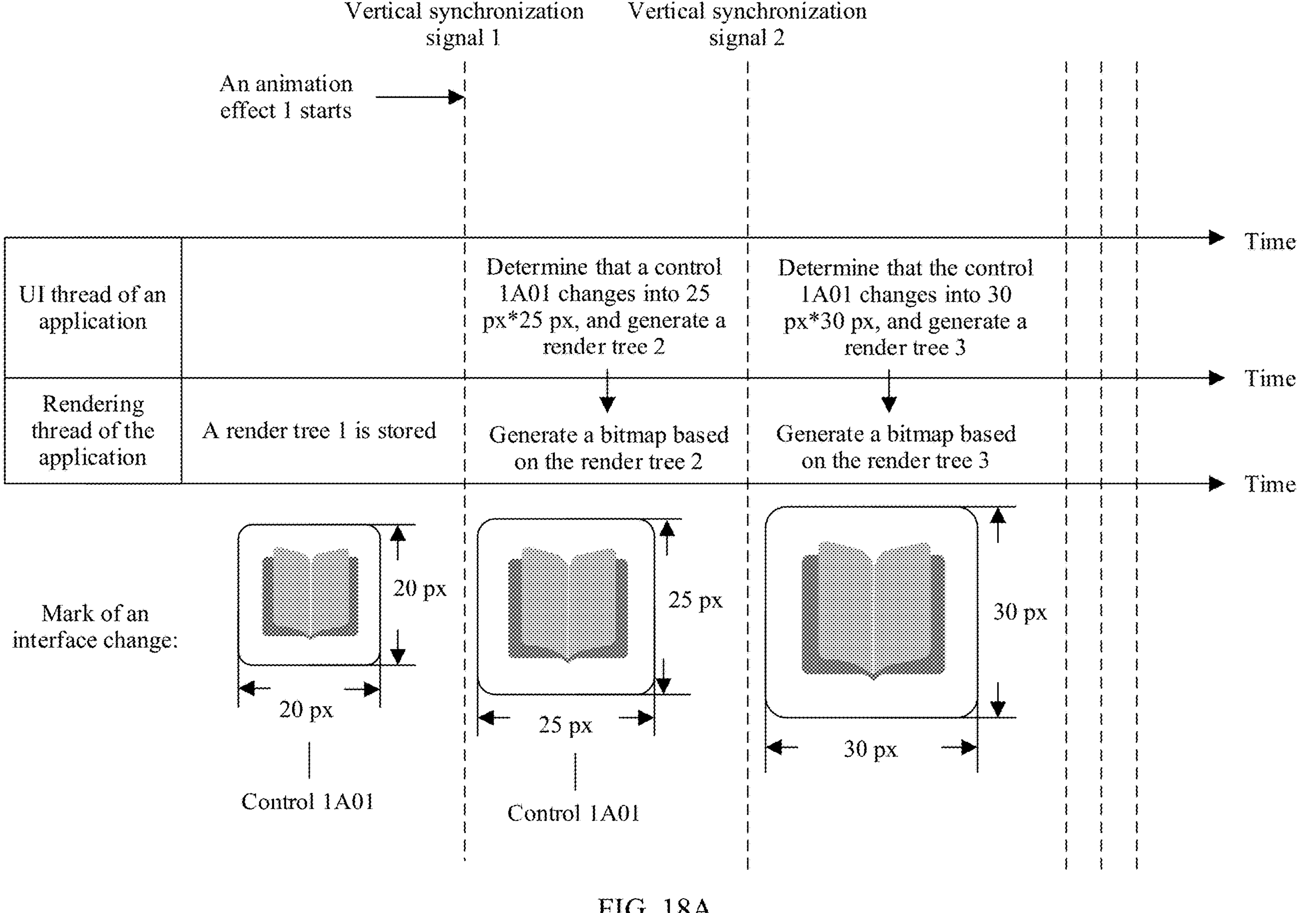
FIG. 18A is a schematic diagram of an example of a render tree change in a process of performing the method shown in FIG. 3 according to an embodiment of this application.
Figure 18B:
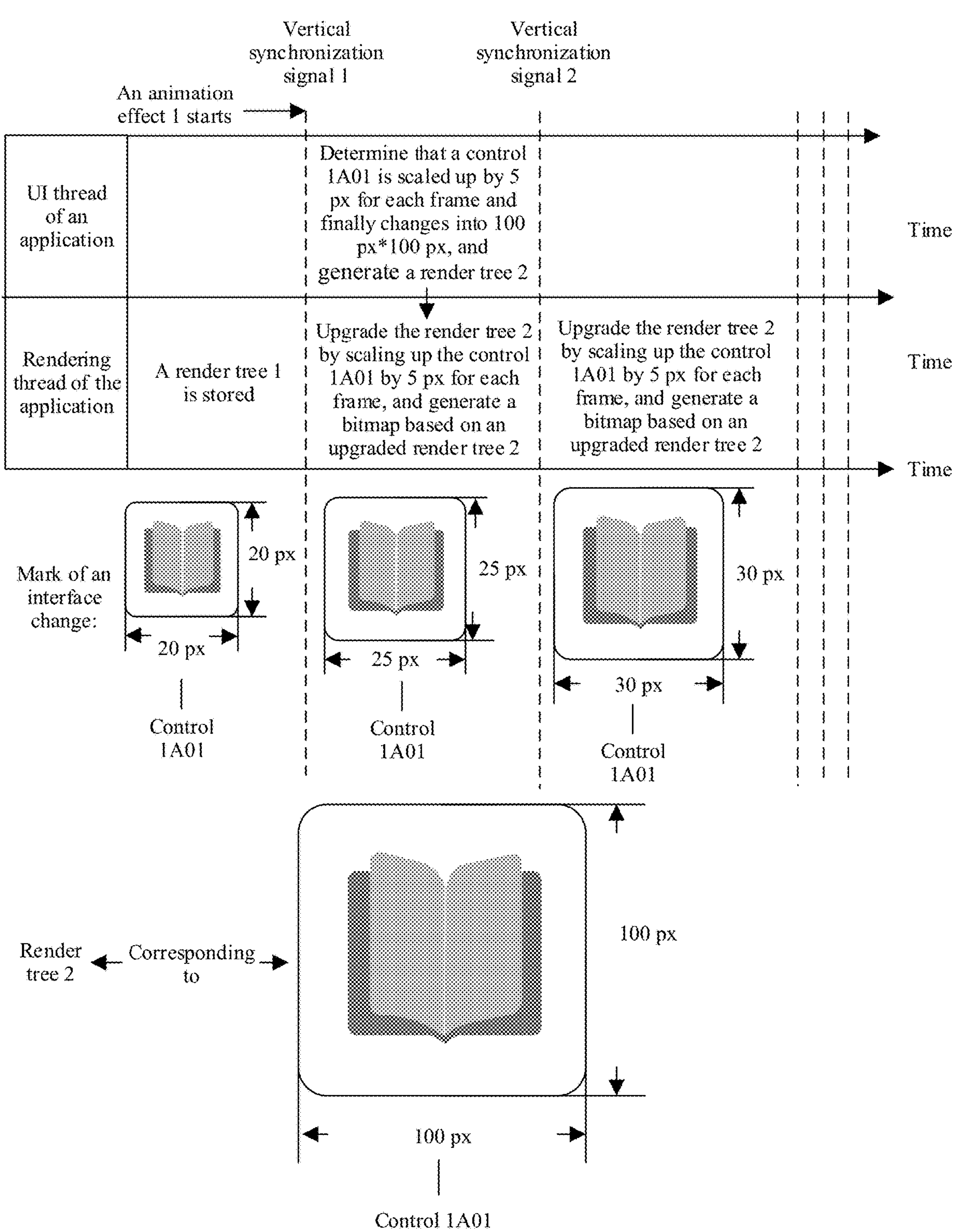
FIG. 18B and FIG. 18C are schematic diagrams of an example of a render tree change in a process of performing the method shown in FIG. 4A and FIG. 4B according to an embodiment of this application.
Figure 18C:
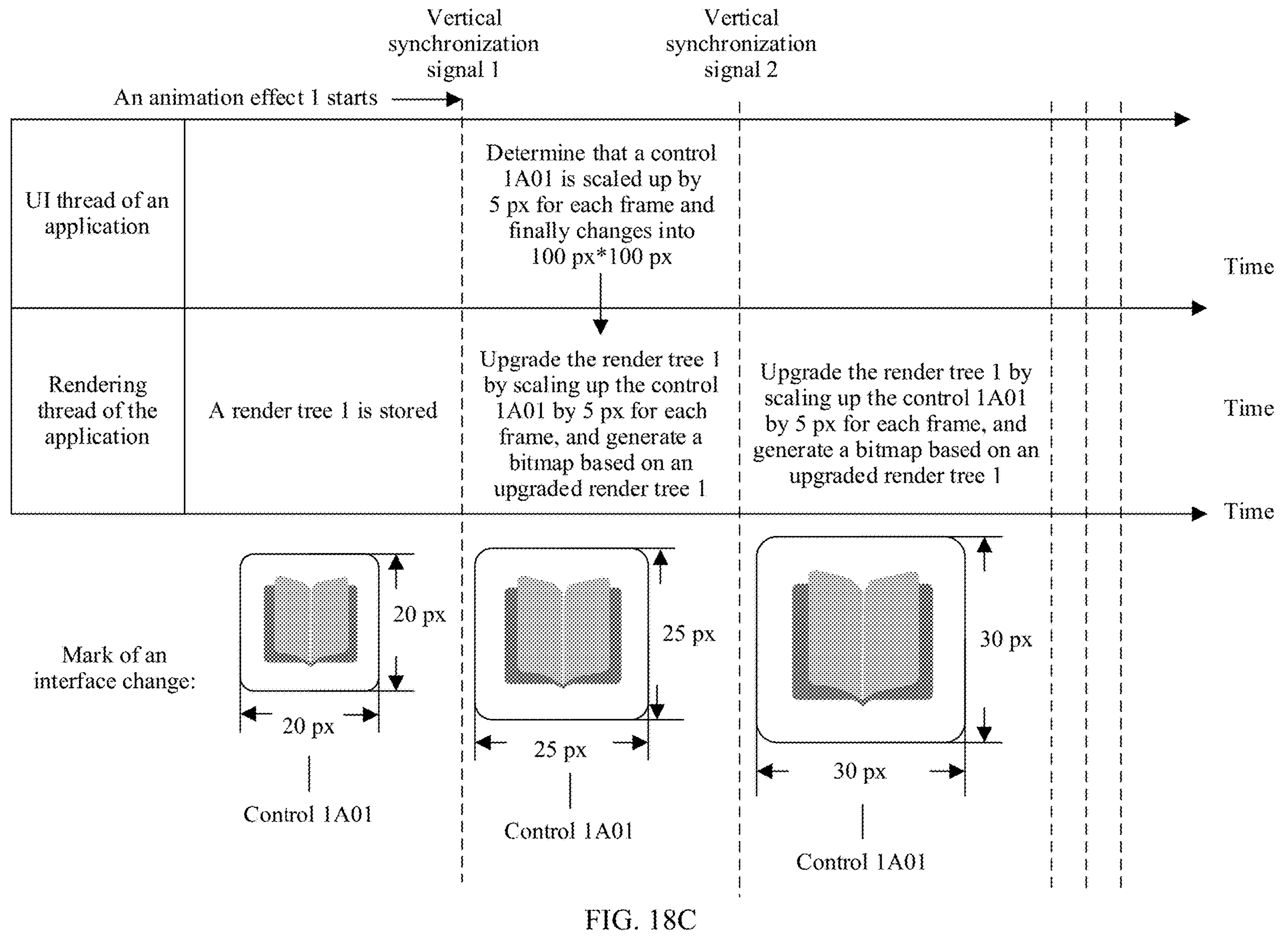

Finally, the following uses content shown in FIG. 18A, FIG. 18B, and FIG. 18C as an example to describe differences between the two animation effect display manners shown in FIG. 3, FIG. 4A, and FIG. 4B.

FIG. 18A is a schematic diagram of an example of a render tree change in a process of performing the method shown in FIG. 3 according to an embodiment of this application.

As shown in FIG. 18A, before an animation effect 1 starts, a render tree 1 is stored in a rendering thread of an application, and a control 1A01 in an application interface is a square of 20 px.

After the animation effect 1 starts, a UI thread of the application receives a vertical synchronization signal 1, determines that a size of the control 1A01 on an interface of a first frame of the animation effect 1 is 25 px*25 px, generates a render tree 2 corresponding to the interface of the first frame of the animation effect 1, and synchronizes the render tree 2 to the rendering thread of the application. The rendering thread generates a bitmap based on the render tree 2, and the size of a control 1A01 in the bitmap is 25 px*25 px.

Then, after receiving a vertical synchronization signal 2, the UI thread determines that the size of the control 1A01 on the interface of the first frame of the animation effect 1 is 30 px*30 px, generates a render tree 3 corresponding to an interface of a second frame of the animation effect 1, and synchronizes the render tree 3 to the rendering thread of the application. The rendering thread generates a bitmap based on the render tree 2, and the size of a control 1A01 in the bitmap is 30 px*30 px.

FIG. 18B and FIG. 18C are schematic diagrams of an example of a render tree change in a process of performing the method shown in FIG. 4A and FIG. 4B according to an embodiment of this application.

As shown in FIG. 18B, before an animation effect, a render tree 1 is stored in a rendering thread of an application, and a control 1A01 in an application interface is a square of 20 px.

After the animation effect 1 starts, a UI thread of the application receives a vertical synchronization signal 1, determines that logic of the animation effect 1 is the control 1A01 is scaled up by 5 px for each frame, and finally changes into 100 px*px, and a render tree 2 is generated based on an end interface of the animation effect 1. Then, the logic of the animation effect 1 and the render tree 2 are transferred to the rendering process or the rendering thread of the application. The rendering process or the rendering thread of the application updates the render tree 2 based on the logic of the animation effect 1, and generates a bitmap based on an updated render tree 2. A size of the control 1A01 in the bitmap is 25 px*25 px.

Then, after receiving the vertical synchronization signal 2, the rendering process or the rendering thread of the application updates the render tree 2 based on the logic of the animation effect 1, and generates a bitmap based on an updated render tree 2. The size of the control 1A01 in the bitmap is 30 px*30 px.

As shown in FIG. 18C, different from FIG. 18B, the rendering process or the rendering thread of the application updates the render tree 1 based on the logic of an animation effect 1. The size of the control 1A01 on an interface corresponding to the render tree 1 is 20 px*20 px.

(3) Electronic Device Provided in an Embodiment of this Application

First, a hardware architecture of the electronic device provided in this embodiment of this application is described.

Figure 19:
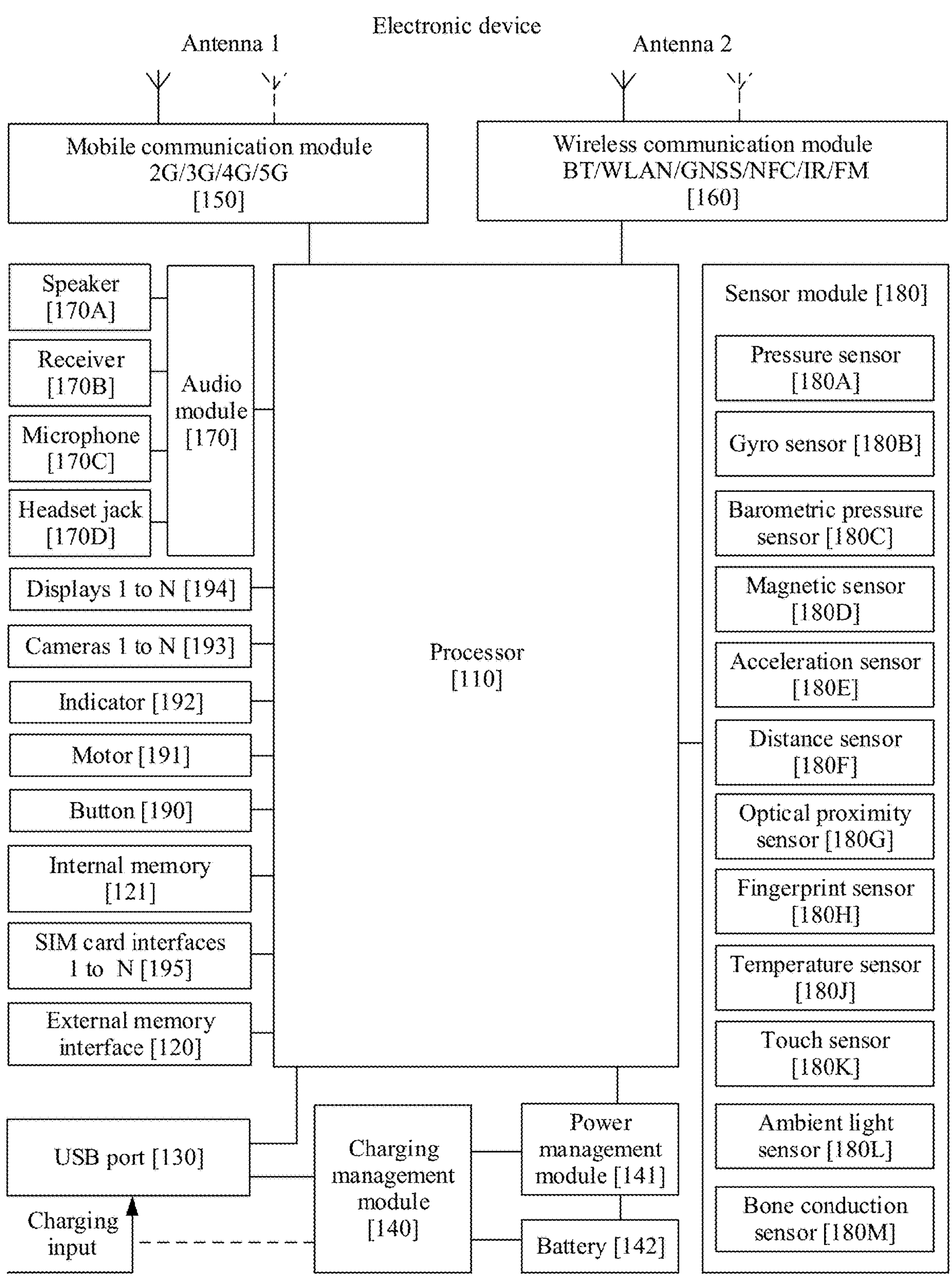
FIG. 19 is a schematic diagram of an example of a hardware architecture of an electronic device according to an embodiment of this application.

FIG. 19 is a schematic diagram of an example of a hardware architecture of an electronic device according to an embodiment of this application.

The electronic device may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart household device, and/or a smart city device. A specific type of the electronic device is not limited in this embodiment of this application.

The electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, or the like.

It may be understood that the structure illustrated in this embodiment of the present invention does not constitute a specific limitation on the electronic device. In some other embodiments of this application, the electronic device may include more or fewer components than those shown in the figure, or some components may be combined, or some components may be split, or different component arrangements may be used. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (serail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device.

The I2S interface may be configured for audio communication. In some embodiments, the processor 110 may include a plurality of groups of I2S buses. The processor 110 may be coupled to the audio module 170 through the I2S bus to implement communication between the processor 110 and the audio module 170. In some embodiments, the audio module 170 may transfer an audio signal to the wireless communication module 160 through the I2S interface to implement a function of answering calls through a Bluetooth headset.

The PCM interface may also be configured for audio communication, sampling, quantizing, and encoding an analog signal. In some embodiments, the audio module 170 and the wireless communication module 160 may be coupled through a PCM bus interface. In some embodiments, the audio module 170 may alternatively transfer an audio signal to the wireless communication module 160 through the PCM interface to implement a function of answering calls through a Bluetooth headset. Both the I2S interface and the PCM interface may be configured for audio communication.

The UART interface is a universal serial data bus configured for asynchronous communication. The bus may be a bidirectional communication bus. The bus converts to-be-transmitted data between serial communication and parallel communication. In some embodiments, the UART interface is generally configured to connect to the processor 110 and the wireless communication module 160. For example, the processor 110 communicates with a Bluetooth module in the wireless communication module 160 through the UART interface, to implement a Bluetooth function. In some embodiments, the audio module 170 may transfer an audio signal to the wireless communication module 160 through the UART interface, to implement a function of playing music through a Bluetooth headset.

The MIPI interface may be configured to connect to the processor 110 and peripheral components such as the display 194 and the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device. The processor 110 communicates with the display 194 through the DSI interface, to implement a display function of the electronic device.

The GPIO interface may be configured by software. The GPIO interface may be configured as a control signal or as a data signal. In some embodiments, the GPIO interface may be configured to connect to the processor 110 to the camera 193, the display 194, the wireless communication module 160, the audio module 170, the sensor module 180, and the like. The GPIO interface may also be configured as an I2C interface, an I2S interface, a UART interface, an MIPI interface, or the like.

The USB port 130 is an interface conforming to the USB standard specification, and specifically, may be a Mini USB port, a Micro USB port, a USB Type C interface, or the like. The USB port 130 may be configured to connect to a charger to charge the electronic device, may be configured to transmit data between the electronic device and a peripheral device, or may be configured to connect to a headset to play audio through the headset. The interface may be further configured to connect to another electronic device, such as an AR device.

It may be understood that an interface connection relationship between the modules that is shown in this embodiment of the present invention is merely an example for description, and does not constitute a limitation on a structure of the electronic device. In some other embodiments of this application, the electronic device may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of the wired charger through the USB port 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that includes wireless communication such as 2G/3G/4G/5G and that is applied to the electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to the application processor. The application processor outputs a sound signal through an audio device (not limited to the speaker 170A, the receiver 170B, and the like), or displays an image or a video through the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the electronic device, and that includes a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device implements a display function by using the GPU, the display 194, the application processor, and the like. The GPU is a microprocessor for image processing and is connected to the display 194 and the application processor. The GPU is configured to perform mathematical and geometric computation for graphic rendering. The processor 110 may include one or more GPUs that execute program instructions to generate or change display information.

The display 194 is configured to display an image, a video, and the like. The display 194 includes a display panel. The display panel can be a liquid crystal display (liquid crystal display, LCD). The display panel may be made of an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like.

The ISP may be configured to process data fed back by the camera 193. For example, during photographing, a shutter is opened, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and a color of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD), or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transformation on frequency energy.

The video codec is configured to compress or decompress a digital video. The electronic device may support one or more video codecs. Therefore, the electronic device may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transmission mode between human brain neurons, and may further continuously perform self-learning. Applications such as intelligent cognition of the electronic device may be implemented through the NPU, for example, image recognition, facial recognition, speech recognition, and text understanding.

The internal memory 121 may include one or more random access memories (random access memories, RAMs) and one or more non-volatile memories (non-volatile memories, NVMs).

The random access memory may include a static random access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM, usually referred to as a DDR5 SDRAM), and the like.

The nonvolatile memory may include a magnetic disk storage device and a flash memory (flash memory).

The flash memory may be classified into an NOR FLASH, an NAND FLASH, a 3D NAND FLASH, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (universal flash storage, UFS), an embedded multimedia card (embedded multimedia card, eMMC), and the like according to storage specifications.

The random access memory may be directly read and written by the processor 110, may be configured to store an executable program (for example, machine instructions) of an operating system or another running program, and may be further configured to store data of a user, data of an application, and the like.

The non-volatile memory may also store an executable program, data of a user, data of an application, and the like, which may be loaded into the random access memory in advance for directly reading and writing by the processor 110.

The external memory interface 120 may be used to connect to an external non-volatile memory, to extend a storage capability of the electronic device. The external non-volatile memory communicates with the processor 110 through the external memory interface 120, to implement a data storage function. For example, files such as music and videos are stored in the external non-volatile memory.

The electronic device may implement audio functions, for example, music playing and recording, by using the audio module 170, the speaker 170A, the receiver 170B, the microphone 170C, the headset jack 170D, the application processor, and the like.

The audio module 170 is configured to convert digital audio information into analog audio signal output, and is further configured to convert an analog audio input into a digital audio signal. The audio module 170 may be further configured to code and decode an audio signal. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The electronic device may be used to listen to music or answer a hands-free call by using the speaker 170A.

The receiver 170B, also referred to as an "earpiece", is configured to convert an electrical audio signal into a sound signal. When a call is answered or voice information is received by using the electronic device, the receiver 170B may be put close to a human ear to receive a voice.

The microphone 170C, also referred to as a "mike" or a "microphone", is configured to convert a sound signal into an electrical signal. When making a call or sending voice information, a user may make a sound near the microphone 170C through the mouth of the user, to input the sound signal to the microphone 170C. At least one microphone 170C may be disposed in the electronic device. In some other embodiments, two microphones 170C may be disposed in the electronic device, to implement a noise reduction function in addition to capturing a sound signal. In some other embodiments, three, four, or more microphones 170C may alternatively be disposed in the electronic device, to collect a sound signal, reduce noise, identify a sound source, implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines pressure intensity based on a capacitance change. When a touch operation is performed on the display 194, the electronic device detects intensity of the touch operation by using the pressure sensor 180A. The electronic device may also calculate a touch location based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on a messaging application icon, an instruction for viewing an SMS message is executed. When a touch operation whose touch operation intensity is greater than or equal to a first pressure threshold is performed on a messaging application icon, an instruction for creating a new SMS message is executed.

The gyro sensor 180B may be configured to determine a motion posture of the electronic device. In some embodiments, an angular velocity of the electronic device around three axes (namely, axes x, y, and z) may be determined by using the gyro sensor 180B. The gyro sensor 180B may be configured to implement image stabilization during shooting. For example, when a shutter is pressed, the gyro sensor 180B detects a jitter angle of the electronic device, calculates, based on the angle, a distance for which a lens module needs to compensate, and enables the lens to offset jitter of the electronic device through reverse motion, to implement image stabilization. The gyro sensor 180B may further be used in a navigation scenario and a somatic game scenario.

The barometric pressure sensor 180C is configured to measure barometric pressure. In some embodiments, the electronic device calculates an altitude based on a value of the barometric pressure measured by the barometric pressure sensor 180C, to assist in positioning and navigation.

The magnetic sensor 180D includes a Hall sensor. The electronic device may detect opening and closing of a leather case of a flip cover by using the magnetic sensor 180D. In some embodiments, when the electronic device is a flip phone, the electronic device may detect opening and closing of a flip cover by using the magnetic sensor 180D. Further, a feature, like automatic unlocking when the cover is flipped open, is set based on a detected opening or closing state of the leather case or a detected opening or closing state of the flip cover.

The acceleration sensor 180E may detect accelerations in various directions (usually on three axes) of the electronic device. A magnitude and direction of gravity can be detected when the electronic device is still. The acceleration sensor 180E may be further configured to identify a posture of the electronic device, and is used in an application such as switching between a landscape mode and a portrait mode or a pedometer.

The distance sensor 180F is configured to measure a distance. The electronic device may measure the distance through infrared or laser. In some embodiments, in a photographing scenario, the electronic device may measure the distance by using the distance sensor 180F, to implement quick focusing.

The optical proximity sensor 180G may include, for example, a light-emitting diode (LED) and a light detector, such as a photodiode. The light-emitting diode may be an infrared light-emitting diode. The electronic device emits infrared light by using the light-emitting diode. The electronic device detects infrared reflected light from a nearby object by using the photodiode. When detecting abundant reflected light, the electronic device may determine that there is an object near the electronic device. When detecting non-abundant reflected light, the electronic device may determine that there is no object near the electronic device. The electronic device may detect, by using the optical proximity sensor 180G, that the user holds the electronic device close to an ear for a call, to automatically turn off a display for power saving. The optical proximity sensor 180G may also be used in a leather case mode or a pocket mode to automatically unlock or lock the screen.

The ambient light sensor 180L is configured to sense luminance of ambient light. The electronic device may adaptively adjust brightness of the display 194 based on the sensed ambient light brightness. The ambient light sensor 180L may also be configured to automatically adjust white balance during shooting. The ambient light sensor 180L may further cooperate with an optical proximity sensor 180G to detect whether the electronic device is in a pocket, to avoid an unintentional touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch device". The touch sensor 180K may be disposed on the display 194, and the touch sensor 180K and the display 194 constitute a touchscreen, which is also referred to as a "touch screen". The touch sensor 180K is configured to detect a touch operation on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device, and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may further be in contact with a human pulse and receive a blood pressure beating signal. In some embodiments, the bone conduction sensor 180M may alternatively be disposed in the headset, to obtain a bone conduction headset. The audio module 170 may parse out a voice signal based on the vibration signal that is of the vibrating bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive a button input, and generate a button signal input related to user settings and function control of the electronic device.

The motor 191 may generate a vibration prompt. The motor 191 may be configured to produce an incoming call vibration prompt and a touch vibration feedback. For example, touch operations performed on different applications (for example photographing and audio play) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device. The electronic device may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or different types. The SIM card interface 195 is compatible to different types of SIM cards. The SIM card interface 195 may also be compatible with an external storage card. The electronic device interacts with a network by using the SIM card, to implement functions such as calling and data communication. In some embodiments, the electronic device uses an eSIM, that is, an embedded SIM card. The eSIM card may be embedded into the electronic device, and cannot be separated from the electronic device.

Then, a software architecture of an electronic device according to an embodiment of this application is described.

Figure 20:
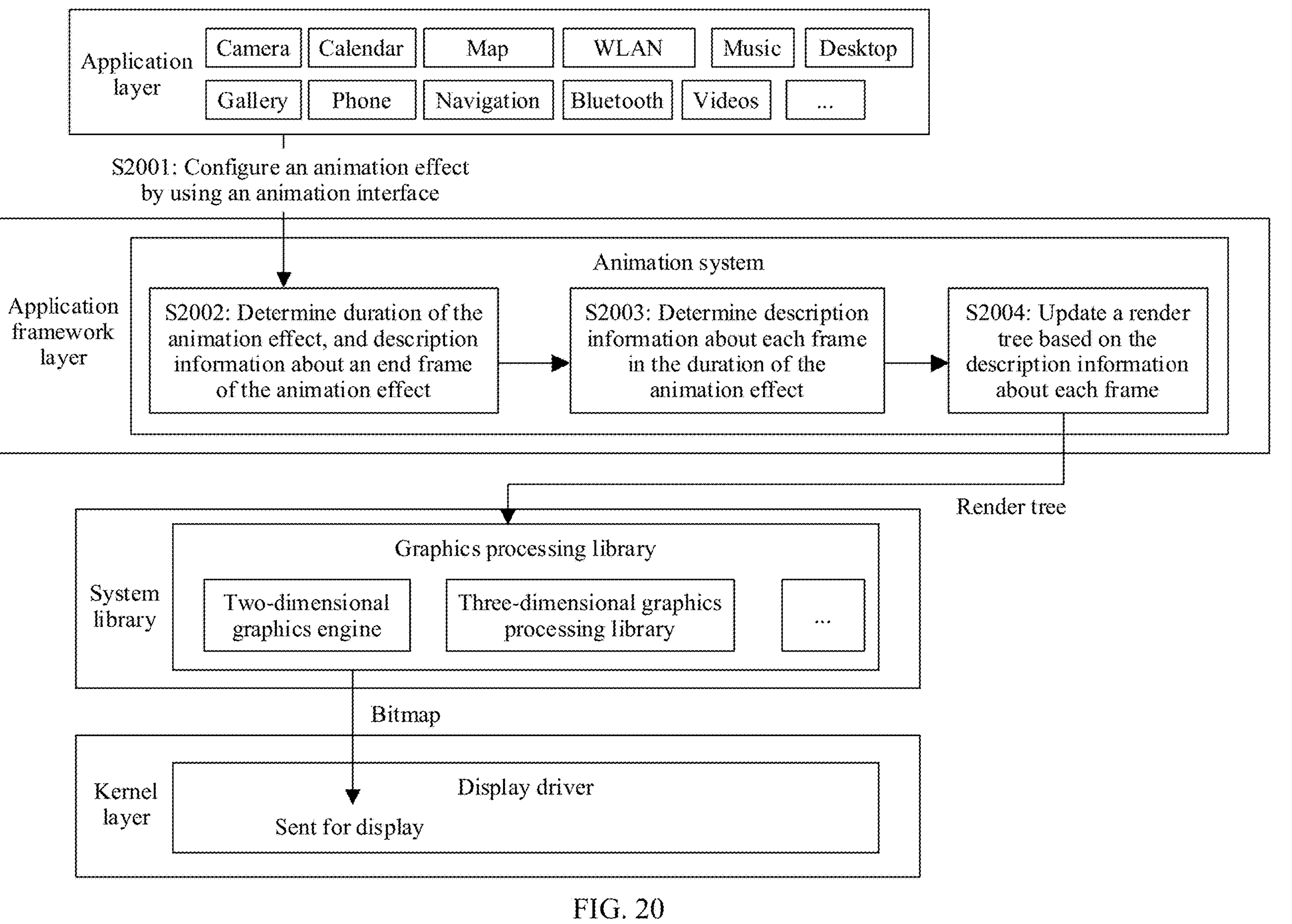
FIG. 20 is a schematic diagram of an example of a software architecture of an electronic device according to an embodiment of this application.

FIG. 20 is a schematic diagram of an example of a software architecture of an electronic device according to an embodiment of this application.

As shown in FIG. 20, software is divided into several layers by using a layered architecture, and each layer has a clear role and task. The layers communicate with each other through a software interface. In some embodiments, a system is divided into four layers: an application layer, an application framework layer, a system library, and a kernel layer from top to bottom.

The application layer may include a series of application packages. As shown in FIG. 20, the application packages may include applications (or referred to as applications) such as camera, gallery, calendar, phone, map, navigation, WLAN, Bluetooth, music, videos, and messaging.

The application framework layer provides an application programming interface (application programming interface, API) and a programming framework for an application at the application layer. The application framework layer includes some predefined functions.

As shown in FIG. 20, the application framework layer may include a window management service, a display management service, a content provider, a view system, a phone manager, a resource manager, a notification manager, a local profile management assistant (Local Profile Assistant, LPA), and the like.

The window management service is responsible for starting, adding, and deleting a window, and can determine an application displayed in the window, determine creation, destruction, a property change, and the like of an application layer, and determine whether there is a status bar, lock a screen, capture a screen, and the like.

The display management service can obtain a quantity of display areas and a size of the display area, and is responsible for starting, adding, and deleting the display area.

The content provider is configured to store and obtain data and allow the data to be accessed by the application. The data may include a video, an image, audio, calls made and answered, a browsing history and bookmarks, a phonebook, and the like.

The phone manager is configured to provide a communication function of the electronic device, for example, management of a call status (including answering, declining, or the like).

The resource manager provides, to the application, various resources such as a localized character string, an icon, a picture, a layout file, and a video file.

The notification manager enables an application to display notification information in a status bar, and may be configured to convey a notification message that may automatically disappear after a short pause without requiring user interaction. For example, the notification manager is used to notify download completion, provide a message notification, and the like. The notification manager may alternatively be a notification that appears in a top status bar of the system in a form of a graph or scroll bar text, for example, a notification of an application running on the background, or may be a notification that appears on a screen in a form of a dialog interface. For example, text information is displayed in the status bar, a prompt tone is made, the electronic device vibrates, or an indicator light blinks.

The view system includes visual controls, such as a control for displaying a text, a control for displaying a picture, and the like. The view system may be configured to build an application. A display interface may include one or more views. For example, a display interface including an SMS message notification icon may include a view for displaying a text and a view for displaying a picture.

The application framework layer may further include an animation system.

As shown in FIG. 20, that the animation system performs an animation effect display manner provided in an embodiment of this application includes the following steps.

S2001: Configure an animation effect through an animation interface.

The animation system provides the animation interface to an application developer. The application developer may configure the animation effect for any one or more controls by invoking the animation interface.

S2002: Determine duration of the animation effect, description information about an end frame of the animation effect, and the like.

After an application starts to run and receives an animation trigger event, the animation system may determine the duration of the animation effect, the description information about the end frame of the animation effect, and the like.

S2003: Determine description information about each frame in the duration of the animation effect.

Then, the animation system may determine description information about a frame for which rendering is currently performed based on the duration of the animation effect, the description information about the end frame of the animation effect, start time of the animation effect, and time of the frame for which rendering is currently performed. The description information about the frame for which rendering is currently performed includes a property of a control on the frame.

S2004: Update a render tree based on the description information about each frame.

Then, the animation system updates the render tree based on the description information about the frame for which rendering is currently performed.

Finally, an updated render tree is transferred to an underlying graphics processing library, and the underlying graphics processing library invokes a GPU or a CPU to perform a specific drawing operation, to generate a bitmap. The bitmap is received by a display driver and then sent for display.

The runtime includes a core library and a virtual machine. The runtime is responsible for scheduling and management of an operating system.

The kernel library includes two parts: a function to be invoked by a Java language, and a kernel library.

The application layer and the application framework layer run on the virtual machine. The virtual machine executes Java files at the application layer and the application framework layer as binary files. The virtual machine is used to perform functions such as object lifecycle management, stack management, thread management, security and exception management, and garbage collection.

The system library may include a plurality of functional modules, for example, a surface manager (surface manager), a media library (Media Library), and a graphics processing library, where the graphics processing library includes a three-dimensional graphics processing library (for example, OpenGL ES), a two-dimensional graphics engine (for example, SGL), and the like.

The surface manager is configured to: manage a display subsystem and provide fusion of two-dimensional (2-Dimensional, 2D) and three-dimensional (3-Dimensional, 3D) layers for a plurality of applications.

The media library supports playback and recording in a plurality of commonly used audio and video formats, as well as still image files, and the like. The media library may support a plurality of audio and video encoding formats such as MPEG-4, H.264, MP3, AAC, AMR, JPG, and PNG.

The three-dimensional graphics processing library is configured to implement 3D graphics drawing, image rendering, layer composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver.

According to the context, the term "when" used in the foregoing embodiments may be interpreted as "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or may be a data storage device, such as a server or a data center that integrates one or more usable media. The usable medium may be a magnetic medium (for example, a floppy disk, a hard disk, or a magnetic tape), an optical medium (for example, a DVD), a semiconductor medium (for example, a solid state drive), or the like.

A person of ordinary skill in the art may understand that all or some of the procedures of the methods in embodiments may be implemented by a computer program instructing related hardware. The program may be stored in a computer-readable storage medium. When the program is run, the procedures of the methods in embodiments are performed. The foregoing storage medium includes any medium that can store program code, like a ROM, a random access memory RAM, a magnetic disk, or an optical disc.

What is claimed is:

1. An animation effect display method, applied to an electronic device, wherein the method comprises:

determining, by a user interface (UI) thread of an application, and based on information about a first animation effect of a first control group that is set by the application, a duration of the first animation effect, a start time of the first animation effect, and description information about an end frame of the first animation effect, wherein the first control group comprises one or more controls, and an animation trigger event triggers display of the first animation effect;

after the determining, by the UI thread of the application, and based on information about the first animation effect of the first control group that is set by the application, the duration of the first animation effect, the start time of the first animation effect, and the description information about the end frame of the first animation effect, the method further comprises deregistering, by the UI thread, an animation callback of the first animation effect, wherein the animation callback triggers the UI thread to modify a property of the control in the first control group;

determining description information about a target frame of the first animation effect based on the start time of the first animation effect, the duration of the first animation effect, a time corresponding to the target frame, and the description information about the end frame of the first animation effect, when generating display data of the target frame; and generating, by a rendering thread of the application or a rendering process, the display data of the target frame based on the description information about the target frame.

2. The method according to claim 1, wherein the information about the first animation effect is configured by the application through an animation interface provided by a system.

3. The method according to claim 1, wherein the determining description information about a target frame based on the start time of the first animation effect, the duration of the first animation effect, the time corresponding to the target frame, and the description information about the end frame of the first animation effect when generating display data of the target frame in the duration of the first animation effect is performed by the UI thread, the rendering thread, or the rendering process.

4. The method according to claim 1, wherein the method further comprises:

determining, by the UI thread, properties of controls in the end frame of the first animation effect based on the description information about the end frame of the first animation effect; and comparing, by the UI thread, the properties of the controls in the end frame of the first animation effect with properties of controls shown before the first animation effect starts, to determine a second control group, wherein the second control group is controls whose properties change in the duration of the first animation effect, and the second control group comprises the first control group; and the first control group is displayed through the first animation effect, a control in the second control group but not in the first control group is displayed through a second animation effect, and the animation trigger event further triggers display of the second animation effect.

5. The method according to claim 4, further comprising using the description information about the target frame to determine properties of the controls in the second control group in the target frame, wherein the property of the controls comprises at least one of a size of the control, a location of the control, and a transparency of the control.

6. The method according to claim 1, wherein the generating, by the rendering thread or the rendering process, the display data of the target frame based on the description information about the target frame specifically comprises:

updating, by the rendering thread or the rendering process, a first render tree based on the description information about the target frame, and generating, by the rendering thread or the rendering process, the display data of the target frame based on the updated first render tree.

7. The method according to claim 6, wherein the updating, by the rendering thread or the rendering process, the first render tree based on the description information about the target frame specifically comprises:

updating, by the rendering thread or the rendering process, the first render tree based on the properties of controls in a second control group in the target frame.

8. The method according to claim 7, wherein the second control group comprises a third control, and the method further comprises:

adjusting, by the rendering thread or the rendering process based on a size of the third control and a preconfigured policy, a size of content carried in the third control, wherein the carried content comprises at least one of an image and a text.

9. The method according to claim 8, wherein the third control is an image control ImageView, and the content carried in the third control is a first image; and the policy comprises: comparing the size of the third control with a size of the first image, and cropping or scaling the first image.

10. The method according to claim 8, wherein the third control is a text control TextView, and the content carried in the third control is a first text; and the policy comprises: comparing a width of the third control with a width of the first text, and performing line division or line combination on the first text.

11. The method according to claim 6, wherein the first render tree is a render tree corresponding to the end frame of the first animation effect; or the first render tree is a render tree corresponding to an interface shown before the first animation effect starts.

12. The method according to claim 1, wherein the method further comprises:

during the duration of the first animation effect, receiving, by the UI thread, a vertical synchronization signal at a first moment, and generating, by the rendering thread or the rendering process, the display data of the target frame at a second moment based on the description information about the target frame, wherein the second moment is after first duration of the first moment, and the first duration is preset.

13. The method according to claim 1, wherein the method further comprises:

determining, by the rendering thread or the rendering process, a second parameter in the duration of the first animation effect, wherein the second parameter comprises both a size and a location of the controls in the first control group;

sending, by the rendering thread or the rendering process, the second parameter to the UI thread; and determining, by the UI thread, the size and the location of the control in the first control group based on the second parameter.

14. The method according to claim 1, wherein the animation trigger event comprises at least one of a user interaction, a network status change, and a message sent by another application on the electronic device to the application.

15. An electronic device, wherein the electronic device comprises one or more processors and a memory, wherein the memory is coupled to the one or more processors, the memory is configured to store computer program code, the computer program code comprises computer instructions, and the one or more processors invoke the computer instructions, to enable the electronic device to:

determine, by a user interface (UI) thread of an application that is running on the electronic device, and based on information about a first animation effect of a first control group that is set by the application, a duration of the first animation effect, a start time of the first animation effect, and description information about an end frame of the first animation effect, wherein the first control group comprises one or more controls, and an animation trigger event triggers display of the first animation effect;

after the determining, by the UI thread of the application, and based on information about the first animation effect of the first control group that is set by the application, the duration of the first animation effect, the start time of the first animation effect, and the description information about the end frame of the first animation effect, deregister, by the UI thread, an animation callback of the first animation effect, wherein the animation callback triggers the UI thread to modify a property of the control in the first control group;

determine description information about a target frame of the first animation effect based on the start time of the first animation effect, the duration of the first animation effect, a time corresponding to the target frame, and the description information about the end frame of the first animation effect, when generating display data of the target frame; and generate, by a rendering thread of the application or a rendering process, the display data of the target frame based on the description information about the target frame.

16. The method according to claim 15, wherein the information about the first animation effect is configured by the application through an animation interface provided by a system.

17. The method according to claim 15, wherein the determining description information about a target frame based on the start time of the first animation effect, the duration of the first animation effect, the time corresponding to the target frame, and the description information about the end frame of the first animation effect when generating display data of the target frame in the duration of the first animation effect is performed by the UI thread, the rendering thread, or the rendering process.

18. An electronic device, wherein the electronic device comprises one or more processors and a memory, wherein the memory is coupled to the one or more processors, the memory is configured to store computer program code, the computer program code comprises computer instructions, and the one or more processors invoke the computer instructions, to enable the electronic device to:

determine, by a user interface (UI) thread of an application that is running on the electronic device, and based on information about a first animation effect of a first control group that is set by the application, a duration of the first animation effect, a start time of the first animation effect, and description information about an end frame of the first animation effect, wherein the first control group comprises one or more controls, and an animation trigger event triggers display of the first animation effect;

determine, by the UI thread, properties of controls in the end frame of the first animation effect based on the description information about the end frame of the first animation effect; and compare, by the UI thread, the properties of the controls in the end frame of the first animation effect with properties of controls shown before the first animation effect starts, to determine a second control group, wherein the second control group is controls whose properties change in the duration of the first animation effect, and the second control group comprises the first control group;

determine description information about a target frame of the first animation effect based on the start time of the first animation effect, the duration of the first animation effect, a time corresponding to the target frame, and the description information about the end frame of the first animation effect, when generating display data of the target frame; and generate, by a rendering thread of the application or a rendering process, the display data of the target frame based on the description information about the target frame, wherein the first control group is configured to be displayed through the first animation effect, a control in the second control group but not in the first control group is configured to be displayed through a second animation effect, and the animation trigger event further is further configured to trigger display of the second animation effect.

19. The method according to claim 18, wherein the information about the first animation effect is configured by the application through an animation interface provided by a system.

20. The method according to claim 18, wherein the determining description information about a target frame based on the start time of the first animation effect, the duration of the first animation effect, the time corresponding to the target frame, and the description information about the end frame of the first animation effect when generating display data of the target frame in the duration of the first animation effect is performed by the UI thread, the rendering thread, or the rendering process.

* * * * *